(12) United States Patent
Hibata et al.

(10) Patent No.: US 6,412,875 B1
(45) Date of Patent: Jul. 2, 2002

(54) SEATBELT SYSTEM

(75) Inventors: Ganta Hibata; Yoshito Hashimoto; Takashi Arima, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/473,063

(22) Filed: Dec. 28, 1999

(30) Foreign Application Priority Data

| Dec. 28, 1998 | (JP) | 10-373690 |
| Jan. 14, 1999 | (JP) | 11-008105 |
| Jan. 26, 1999 | (JP) | 11-017336 |
| Mar. 1, 1999 | (JP) | 11-052914 |

(51) Int. Cl.$^7$ .................................................. B60R 21/00
(52) U.S. Cl. ...................................................... 297/478
(58) Field of Search ................................ 297/478, 476, 297/479, 480; 242/379.1; 280/806

(56) References Cited

U.S. PATENT DOCUMENTS

| 3,741,494 A | 6/1973 | Fiala ........................ 242/107.4 |
| 3,929,300 A | 12/1975 | Lindqvist ................. 242/107.4 |
| 4,366,934 A | 1/1983 | Seifert et al. ......... 242/107.4 A |
| 4,422,594 A | * 12/1983 | Honl |
| 5,772,144 A | 6/1998 | Tanabe et al. ............ 242/379.1 |
| 5,794,877 A | 8/1998 | Ono et al. ................ 242/379.1 |
| 6,105,893 A | * 8/2000 | Schmidt et al. |

FOREIGN PATENT DOCUMENTS

| JP | 57-6948 | 2/1982 |
| JP | 2-45088 | 11/1990 |
| JP | 10-310026 | 11/1998 |
| WO | 9704996 | 2/1997 |

* cited by examiner

Primary Examiner—Milton Nelson, Jr.
(74) Attorney, Agent, or Firm—Crowell & Moring LLP

(57) ABSTRACT

A seatbelt system is provided with a retractor, which has a retractor base provided with side plates, a bobbin, a locking member prevented from rotation in a webbing-withdrawing direction in an event of an emergency, a shaft integrally connected at an end thereof with the bobbin and at an opposite end thereof with the locking member, and a bobbin locking mechanism for preventing rotation of the bobbin in the webbing-withdrawing direction when relative rotation between the bobbin and the locking member has reached a predetermined extent. The locking member is brought into engagement with one of the side plates of the retractor base so that any further rotation of the locking member is prevented. At the same time, the bobbin is brought into engagement with the other side plate via the bobbin locking mechanism so that any further rotation of the bobbin is prevented.

34 Claims, 43 Drawing Sheets

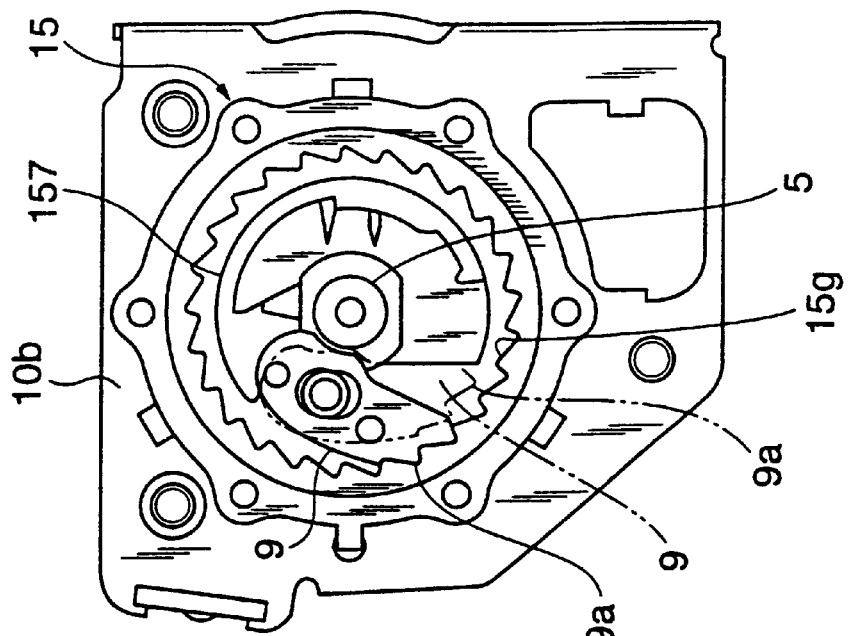
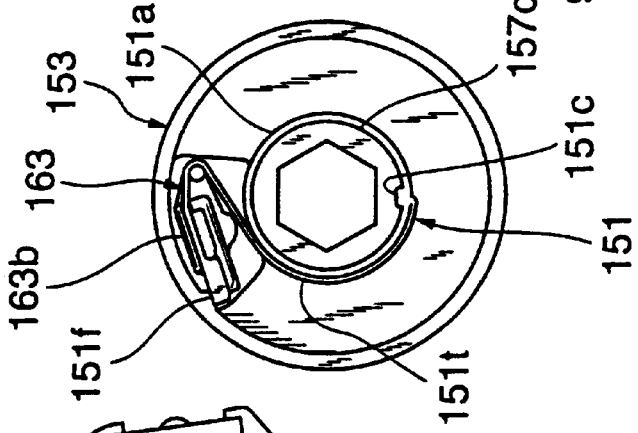
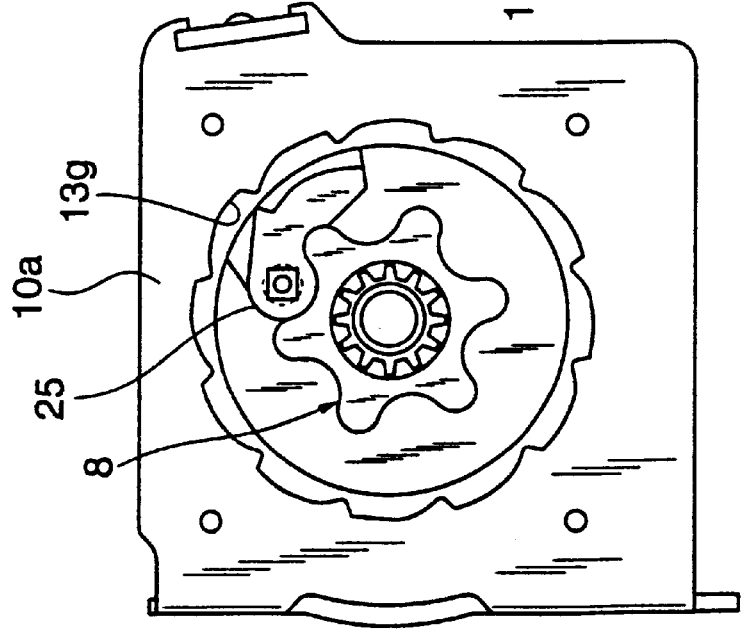

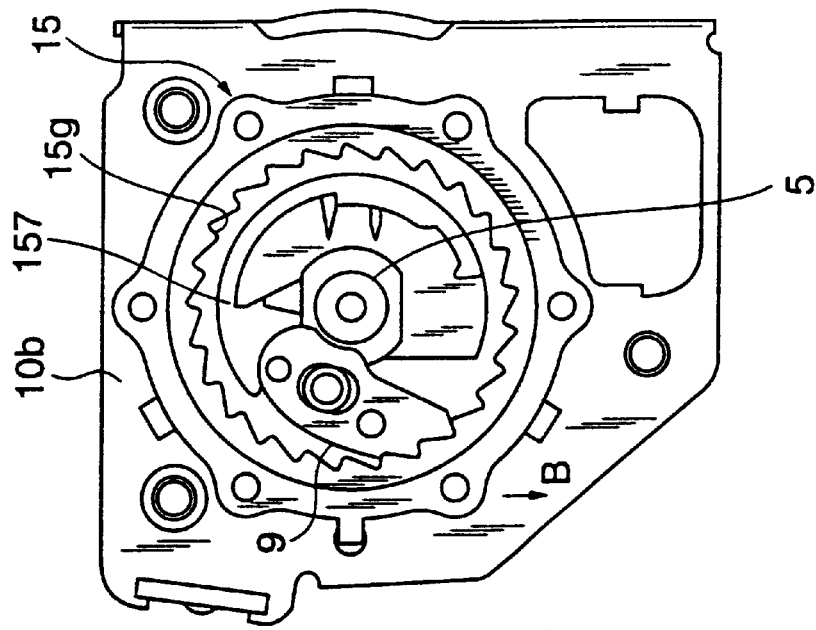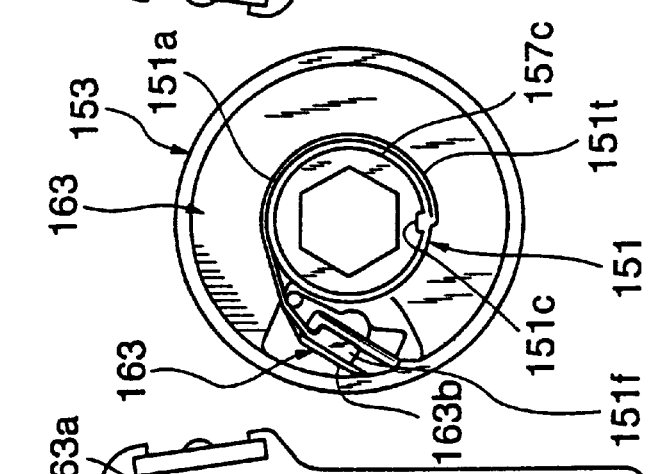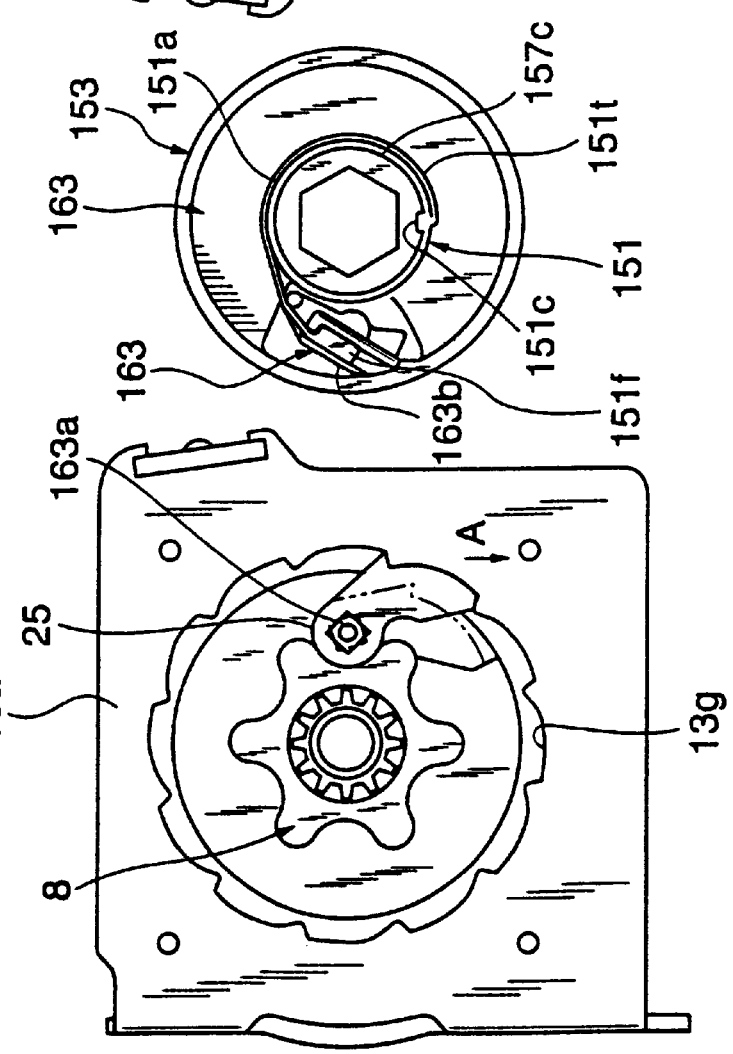

SEATBELT SYSTEM

BACKGROUND OF THE INVENTION a) Field of the Invention

This invention relates to a seatbelt system provided with a retractor.

b) Description of the Related Art

As a retractor in a seatbelt system for safely holding an occupant of a vehicle or the like in a seat, an emergency locking retractor has been used conventionally. This emergency locking retractor is equipped with an emergency locking mechanism for physically locking the retractor by an inertia sensing member in response to a sudden acceleration, collision or deceleration, thereby effectively and safely restraining the occupant.

Such emergency locking retractors include—like seatbelt retractors disclosed, for example, in U.S. Pat. Nos. 3,929,300, 4,366,934 and JU 2-45088 B—those equipped with a locking member that a locking member arranged on an end of a retracting spindle, on which a webbing is wound, is brought into meshing engagement with a locked portion of a retractor base in the event of a vehicular emergency to prevent any further rotation of retracting spindle in a webbing-withdrawing direction.

In the above-described locking member, teeth formed on an edge of a retracting spindle through-hole in the retractor base, through which the retracting spindle extends, or teeth formed on a latch plate arranged in association with the retracting spindle through-hole are used as a locked portion, while a locking plate or pawl rotatable together with the retracting spindle is used as a locking member. In the event of a vehicular emergency, these locking member and locked member mesh with each other to prevent any further rotation of the retracting spindle in the webbing-withdrawing direction.

When an impact force resulting from a collision is extremely large, on the other hand, the tension on the webbing progressively increases as time goes on subsequent to the collision. This causes a sudden deceleration on the occupant's body, so that the load applied to the occupant from the webbing becomes extremely large. With a view to coping with this problem, various seatbelt retractors have also been proposed. These seatbelt retractors are each equipped with an energy-absorbing mechanism that, when the load acting on the webbing becomes equal or greater than a preset value, the webbing is withdrawn over a predetermined length to absorb a substantial portion of an impact which would otherwise occur on the occupant's body, so that the occupant's body can be protected more positively. As a seatbelt retractor of such a construction, the "energy absorbing mechanism especially for use in a safety belt system" disclosed in U.S. Pat. No. 3,741,494 is known.

The above-described energy absorbing mechanism is provided with a retracting member (bobbin) as an element through which a force is transmitted and also with a holder (retractor base) rotatably arranged relative to the retracting member. A torsion bar is also arranged as an energy absorbing member between the retracting member and the holder. In the event of a vehicular emergency, a gear (locking member) arranged on an end portion of the torsion bar is locked by a locking lever, whereby the torsion bar is connected with the holder such that the torsion bar cannot rotate in a webbing-withdrawing direction. On the other hand, an opposite end of the torsion bar has been unrotatably connected with the retracting member in advance. When a torque acts on the retracting member in the webbing-withdrawing direction, the torsion bar itself is twisted about an axis thereof and hence undergoes a plastic deformation. As a consequence, a substantial portion of impact energy which would otherwise act on the occupant's body is absorbed as deforming work for the torsion bar as the energy absorbing member.

In this case, however, no limitation is imposed on the extent of torsion of the torsion bar (energy absorbing stroke). It may, however, be desired to limit the extent of torsion in some instances. As an example of a seatbelt retractor having an energy absorbing mechanism which is equipped with a stop member for limiting an energy absorbing stroke, there is the "retractor for safety belt system" proposed in JP 57-6948 (hereinafter referred to as "Conventional Art 1").

According to the energy absorbing mechanism in the above-described retractor, a latch plate (locking member) mounted on a webbing-retracting spindle is fixedly provided with a first member such that the first member is coaxial with the webbing-retracting spindle. Further, the webbing-retracting spindle is fixedly provided with a second member such that the second member is located opposite the first member. Over a groove formed on at least one of the first member and the second member, a roller is arranged as an energy absorbing member such that the roller is interposed between the first member and the second member. When the roller rolls over the groove, it undergoes a plastic deformation. As a consequence, a substantial portion of impact energy which would otherwise act on the occupant's body is absorbed as deforming work for the groove. In addition, a key is planted as a stopping member at a point close to a final end of the groove to prevent any further advancement of the roller, thereby imposing a limitation on an energy absorbing stroke.

Further, an emergency locking retractor for a seatbelt system, said retractor being equipped with an energy absorbing mechanism, is disclosed, for example, in U.S. Pat. No. 5,772,144.

U.S. Pat. No. 5,772,144 (hereinafter referred to as "Conventional Art 2") also discloses, as conventional art, a construction in which a pawl (stopping member) mounted on a side wall of a reel shaft (bobbin), on which a webbing is wound, is brought into engagement with one of teeth (internal teeth) formed on a circumferential edge of a reel-shaft supporting opening in a base frame (retractor base) (an opening formed in a side plate of the retractor base) to prevent any further rotation of the bobbin in a webbing-withdrawing direction.

In the case of the stopping member making use of the key as disclosed in Conventional Art 1, a large load acts on the key upon actuation of the second pawl. The key is therefore required to retain strength sufficient to withstand a load from the second pawl. Further, at the end of the absorption of energy, the rotation of the webbing-retracting spindle is prevented by a latch plate locked by a retractor base. Accordingly, the roller, the first and second members and the like, all of which are arranged between the latch plate and the webbing-retracting spindle, are also required to have strength sufficient to withstand a load applied until the rotation of the webbing-retracting spindle is finally prevented. To ensure restraint of an occupant in the event of a vehicular emergency, the parts arranged between the latch plate and the webbing-retracting spindle are all required to have sufficient strength. This however requires use of costly materials and/or complex machining, leading to a problem that higher manufacturing cost is unavoidable.

In the case of the seatbelt retractor disclosed as its conventional art in Convectional Art 2, on the other hand, adoption of such a design that the stopping member is brought into contact with a wall portion formed on the side wall of the bobbin upon engagement of the stopping member with the internal teeth formed in the side wall of the retractor base in the event of a vehicular emergency such as a vehicular collision results in application of a considerable load to the wall portion of the bobbin because a preventing force produced upon prevention of rotation of the bobbin acts on the bobbin via the stopping member. When a load applied from the stopping member acts directly on a particular portion of the bobbin as described above, the bobbin itself must have sufficient strength. To provide the bobbin with such sufficient strength, it is necessary to reinforce the bobbin at the particular portion to which loads are applied, to use a costly material for the bobbin itself and/or to use one or more complex machining methods. This has led to a problem that higher manufacturing cost is unavoidable.

SUMMARY OF THE INVENTION

With the foregoing circumstances in view, the present invention has as an object thereof the provision of a seatbelt system provided with a retractor which is economical despite its possession of sufficient strength.

The above-described object of the present invention can be achieved by A seatbelt system provided with a retractor, wherein the retractor comprises:

a retractor base having a pair of side plates;

a shaft rotatably mounted on the retractor base;

a bobbin fixed on an end of the shaft and carrying a webbing withdrawably wound thereon;

a locking member fixed on an opposite end of the shaft;

an emergency locking mechanism for connecting the locking member and one of the side plates of the retractor base in an event of a vehicular emergency such that the locking member is prevented from rotation in a webbing-withdrawing direction; and a bobbin locking mechanism arranged between the retractor base and the bobbin such that, when rotation of the locking member is prevented by the emergency locking mechanism, torsion of the shaft is limited to a predetermined extent and the bobbin is connected to the other side plate of the retractor base.

According to the above-described construction of the present invention, the bobbin is prevented from rotation in the webbing-withdrawing direction in the event of a vehicular emergency by the engagement of the locking member with the one side plate of the retractor base. Further, when a rotational torque of a predetermined value or greater is applied between the bobbin and the locking member by a load acting on the webbing, a substantial portion of impact energy is absorbed owing to a deformation of an energy absorbing member (shaft). When relative rotation between the bobbin and the locking member reaches a predetermined extent, the bobbin locking mechanism is actuated such that the rotation of the bobbin is prevented by the other side plate of the retractor base. This makes it possible to adequately control the extent to which the energy absorbing member undergoes a deformation for the absorption of energy.

Upon completion of the absorption of the energy, any further rotation of the bobbin is prevented directly by the retractor base via the bobbin locking mechanism. It is therefore sufficient for parts such as the locking member if they can withstand only a force applied to deform the energy absorbing member arranged between the bobbin and the locking member. Concerning the retractor base, it is possible to reduce its reinforcement by separately assigning the function to engage the locking member and the function to engage the bobbin via the bobbin locking mechanism to the respective side plates. This has made it possible to provide a seatbelt system equipped with a retractor which is economical despite its possession of sufficient strength.

The above-described object of the present invention can also be achieved by a seatbelt system provided with a retractor, wherein the retractor comprises:

a retractor base, a shaft rotatably mounted on the retractor base, a bobbin fixed on an end of the shaft and carrying a webbing withdrawably wound thereon, a locking member fixed on an opposite end of the shaft, an emergency locking mechanism for connecting the locking member and the retractor base in an event of a vehicular emergency such that the locking member is prevented from rotation in a webbing-withdrawing direction, and a bobbin locking mechanism arranged between the retractor base and the bobbin such that, when rotation of the locking member is prevented by the emergency locking mechanism, torsion of the shaft is limited to a predetermined extent and the bobbin is connected to the retractor base;

wherein the bobbin locking mechanism has an engaging member and a control member, the engaging member is supported on the bobbin and is movable between a first position, where the engaging member is out of engagement with the retractor base, and a second position, where the engaging member is in engagement with the retractor base, and the control member has flexibility, connects the locking member and the engaging member with each other, and, when torsion of the shaft has reached a predetermined extent, brings the engaging member from the first position to the second position.

According to the above-described construction of the present invention, the bobbin is prevented from rotation in the webbing-withdrawing direction in the event of a vehicular emergency by the engagement of the locking member with the retractor base. Further, when a rotational torque of a predetermined value or greater is applied between the bobbin and the locking member by a load acting on the webbing, a substantial portion of impact energy is absorbed owing to a deformation of an energy absorbing member (shaft). When relative rotation between the bobbin and the locking member reaches a predetermined extent, the rotation of the bobbin is prevented by the bobbin locking mechanism provided with the flexible control member. This makes it possible to adequately control the extent to which the shaft undergoes a deformation for the absorption of energy.

Upon completion of the absorption of the energy, any further rotation of the bobbin is prevented directly by the retractor base via the bobbin locking mechanism. It is therefore sufficient for parts such as the locking member if they can withstand only a force applied to deform the energy absorbing member arranged between the bobbin and the locking member.

It is therefore possible to provide a seatbelt system equipped with a retractor which is economical despite its possession of sufficient strength.

The above-described object of the present invention can also be achieved by a seatbelt system provided with a retractor, wherein the retractor comprises:

a retractor base with an engaged portion formed thereon;

a bobbin rotatably supported on the base and having fitted recesses;

a sleeve having fitting faces, which are maintained in engagement with the fitted recesses, and a shaft portion forming a spindle for the bobbin; and a pawl supported in contact with the sleeve and engageable with the engaged portion of the base.

According to the above-described construction of the present invention, the pawl is supported in contact with the sleeve when the pawl is actuated in the event of a vehicular emergency and the bobbin is prevented from any further rotation in a webbing-withdrawing direction relative to the retractor base.

An impactive load received from the pawl is therefore applied to the bobbin via the sleeve in such a way that it is spread to fitted portions between the sleeve and the bobbin. As a consequence, it has become no longer necessary to reinforce the bobbin, for example, to use a costly material for the bobbin, thereby making it possible to provide a seatbelt system equipped with a retractor which is economical despite its possession of sufficient strength.

The shaft portion for the bobbin can be formed integrally with the sleeve.

BRIEF DESCRIPTION OF THE DRAWINGS

FIG. 31A is a side view of certain elements in their initial positions (in a state that a torsion bar has not been twisted yet for the absorption of energy, in other words, a bobbin has not rotated yet relative to a locking base) on a side of one of side plates in the seatbelt retractor according to the fourth embodiment of the present invention as illustrated in FIG. 27;

FIG. 31B is a diagram showing relative positions of a tape member and a lever in their initial positions in the seatbelt retractor according to the fourth embodiment of the present invention as illustrated in FIG. 27;

FIG. 31C is a side view of certain elements in their initial positions on a side of the other side plate in the seatbelt retractor according to the fourth embodiment of the present invention as illustrated in FIG. 27;

FIGS. 34A, 34B and 34C are operation diagrams showing the corresponding elements operated from their respective positions in FIGS. 32A, 32B and 32C;

DETAILED DESCRIPTION OF THE PREFERRED EMBODIMENTS

The first embodiment of the present invention will hereinafter be described with reference to FIG. 1 through FIG. 11 of the accompanying drawings.

Figure 1:
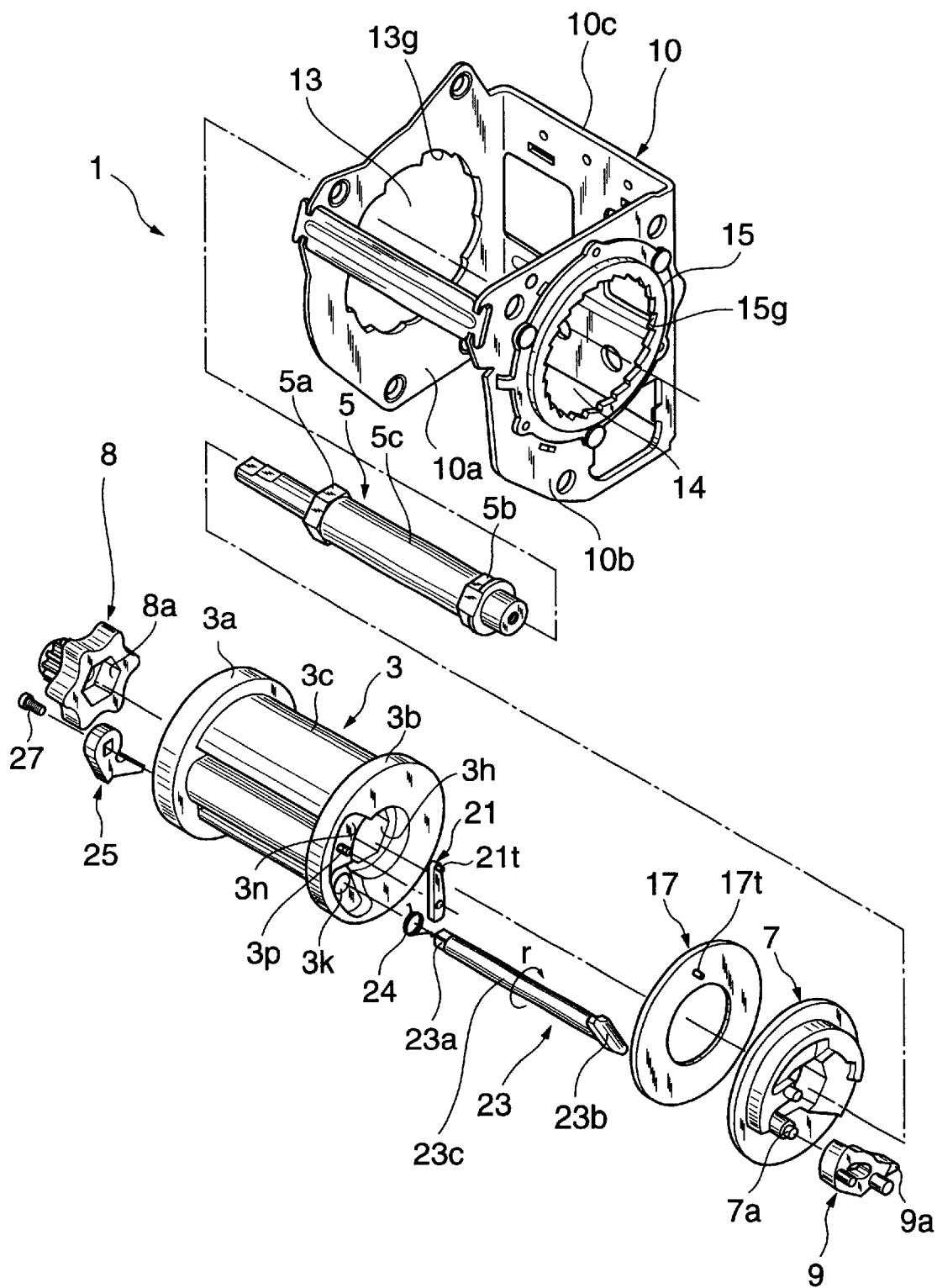
FIG. 1 is an exploded fragmentary perspective view of a seatbelt retractor according to a first embodiment of the present invention.
Figure 2:
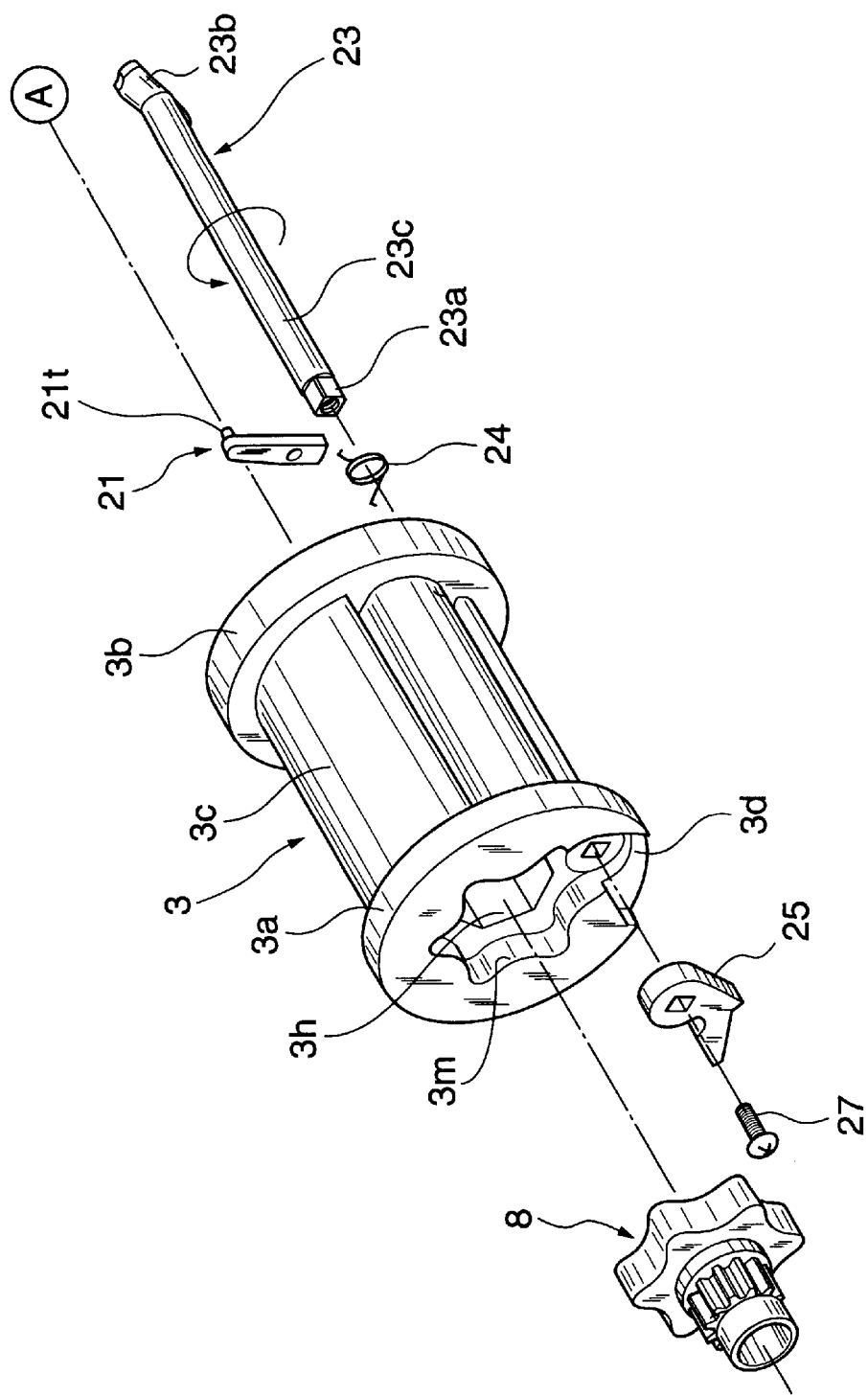
FIG. 2 is another exploded fragmentary perspective view of the seatbelt retractor as viewed from a side opposite to the exploded perspective view of FIG. 1.
Figure 3:
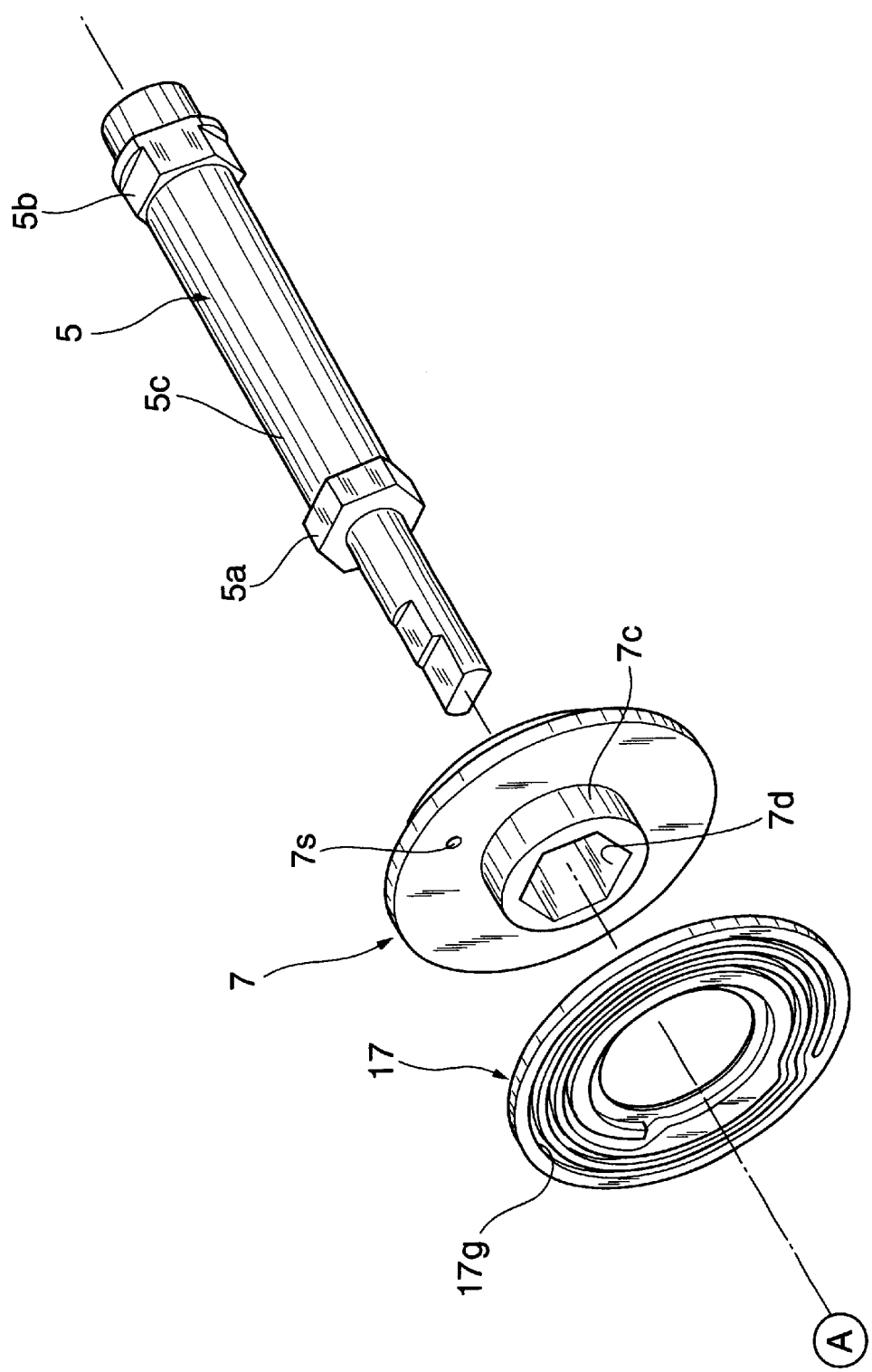
FIG. 3 is a further exploded fragmentary perspective view of the seatbelt retractor as viewed from the side opposite to the exploded perspective view of FIG. 1.

As is illustrated in FIG. 1 to FIG. 3, the seatbelt retractor according to this embodiment is provided with a substantially cylindrical bobbin 3, on which a webbing is wound, and a torsion bar 5 as a substantially cylindrical energy absorbing member. The torsion bar 5 extends through the bobbin 3 and is rotatably supported on the retractor base 10. The torsion bar 5 is integrally connected on a side of an end thereof (on a left side as viewed in FIG. 1 and FIG. 3) with the bobbin 3 via a sleeve 8 as a connecting member. Further, the torsion bar 5 is integrally connected on a side of an opposite end thereof (on a right side as viewed in FIG. 1 and FIG. 3) with a disk-shaped locking base 7 as a locking member.

The retractor base 10 has been obtained by pressing a metal plate such that from opposite sides of a rear plate 10c to be fixed on a vehicle body, left and right side plates 10a,10b extend upright to have a substantially turned square U-shape in cross-section. The torsion bar 5 with the bobbin 3 assembled thereon is rotatably supported extending between the left and right side plates 10a,10b at mutually opposing positions thereof. The torsion bar 5 inserted through the side plate 10a of the retractor base 10 is provided on the side of the one end thereof (on a left end in FIG. 1) with a known retracting spring device (not shown) which normally biases the bobbin 3 in a webbing-retracting direction via the torsion bar 5.

The torsion bar 5 has, on the side of the one end thereof (on the left end in FIG. 1 and FIG. 3), a bobbin-connected portion 5a which serves to establish integrally rotatable connection with the bobbin 3 via the sleeve, and on the side of the opposite end thereof (on the right end in FIG. 1 and FIG. 3), a locking-base-connected portion 5b which serves to establish integrally rotatable connection with the locking base 7. These connected portions 5a, 5b are each formed in a hexagonal shape in cross-section.

The connected portion 5a is fitted in a through-hole 8a having a hexagonal shape in cross-section and formed in the sleeve 8 (see FIG. 1). This sleeve 8 is in turn fitted as a connecting member in a hole 3m having a substantially hexagonal shape in cross-section and formed on the side of the one end of the bobbin 3 (see FIG. 2). As a consequence, the connected portion 5a is connected with the bobbin 3 such that they can rotate integrally. On the other hand, the connected portion 5b is fitted in a hexagonal through-hole 7d formed in a boss portion 7c (see FIG. 3) of the locking base 7 and as a consequence, the connected portion 5b is connected with the locking base 7 such that they can rotate integrally.

The torsion bar 5 is an energy absorbing member constructed such that, when a rotational torque of a predetermined value or greater acts between the connected portions 5a and 5b, a deformable portion 5c between these connected portions 5a and 5b undergoes a torsional deformation to absorb a substantial portion of impact energy which would otherwise act on the occupant's body.

In this first embodiment, the emergency locking mechanism connects the locking base 7 with the retractor base 10 in the event of an emergency (for example, when a sudden deceleration takes place or the webbing is abruptly wound out by an accident or the like). The locking base 7 is therefore prevented from any further rotation in the webbing-withdrawing direction. As a consequence, the emergency locking mechanism prevents any further rotation of the bobbin 3 in the webbing-withdrawing direction.

As a specific construction for the emergency locking mechanism, a variety of known constructions can be adopted. As is illustrated in FIG. 1, a first pawl 9 equipped at a free end thereof with an edge 9a is rotatably supported as a locking member on a pin 7a of the locking base 7 in the first embodiment. Further, a latch plate 15 is arranged in association with a through-hole 14 of the side plate 10b. Internal teeth 15g, with which the edge 9a of the first pawl 9 can be brought into meshing engagement, are formed on the latch plate 15.

The emergency locking mechanism is constructed such that in the event of a vehicular emergency, the edge 9a of the first pawl 9 is brought into meshing engagement with the internal teeth 15g of the latch plate 15 fixed on the side plate 10b, thereby connecting the locking base 7 and the retractor base with each other and hence preventing any further rotation of the locking base in the webbing-withdrawing direction.

The bobbin 3 is provided with a substantially cylindrical barrel portion 3c, on which the webbing is wound, and also with flange portions 3a,3b for preventing the webbing from being retracted out of place. Through the bobbin 3, a torsion bar through-hole 3h through which the torsion bar 5 extends is centrally formed in an axial direction.

Arranged between the flange portion 3b and the locking base 7 is a disk-shaped control plate 17 made of a resin. The control plate 17 is provided with a pin 17t (see FIG. 1), which is inserted in a small hole 7s (see FIG. 3) of the locking base 7. Accordingly, the control plate 17 rotates integrally with the locking base 7. The control plate 17 is also provided with a volute groove 17g as a volute guide path as shown in FIG. 3.

In the flange portion 3b of the bobbin 3, a recess 3n is formed as a space which accommodates therein a control lever 21 and an arm portion 23b of a lever 23 and also permits operations of the control lever 21 and the arm portion 23b therein. A pin 3p is arranged in the recess 3n. A control lever 21 is rotatably supported as a resin-made controller on the pin 3p. The control lever 21 is provided with a leg portion 21t such that the leg portion 21t is guided by the volute groove 17g of the control plate 17.

A lever through-hole 3k through which the lever 23 extends as a transmitting member is formed through the bobbin 3. The lever 23 is provided with a connecting portion 23a having a square shape in cross-section, the arm portion 23b as a control portion, and a shaft portion 23c which extends through the lever through-hole 3k, and is biased in a direction r by a spring 24. The connecting portion 23a of the lever 23, said connecting portion having the square shape in cross-section, is fitted in a square hole of a second pawl 25 as a locking member, and is fixed by a screw 27. Further, the flange portion 3a of the bobbin 3 is provided with a recess 3d within which the second pawl 25 is accommodated (see FIG. 2, FIG. 10 and FIG. 11). The second pawl 25 is arranged such that it can be brought into meshing engagement with internal teeth 13g (FIG. 1) formed on a circumferential edge of a through-hole 13 of the side plate 10a. Further, rotation of the arm portion 23b in the direction r is limited by virtue of its contact with the control lever 21.

A description will next be made about operation of the seatbelt retractor 1 according to the first embodiment of the present invention. In the event of a vehicular emergency, a detection member (not shown) guides the edge 9a of the first pawl 9 outwardly in the radial direction of the locking base 7 so that the edge 9a is brought into meshing engagement with the internal teeth 15g of the side plate 10b. As a consequence, any further rotation of the locking base 7 in the webbing-withdrawing direction is prevented. When a load of a predetermined value or greater is then applied in the webbing-withdrawing direction, the deformable portion 5c of the torsion bar 5 is twisted and, while absorbing energy through a plastic deformation, the deformable portion 5c allows the webbing to extend out. As a result of this twisting of the deformable portion 5c, relative rotation takes place between the bobbin 3 and the locking base 7. Further, the control lever 21 supported on the bobbin 3 is caused to move relative to the control plate 17 supported on the locking base 7.

Figure 4:
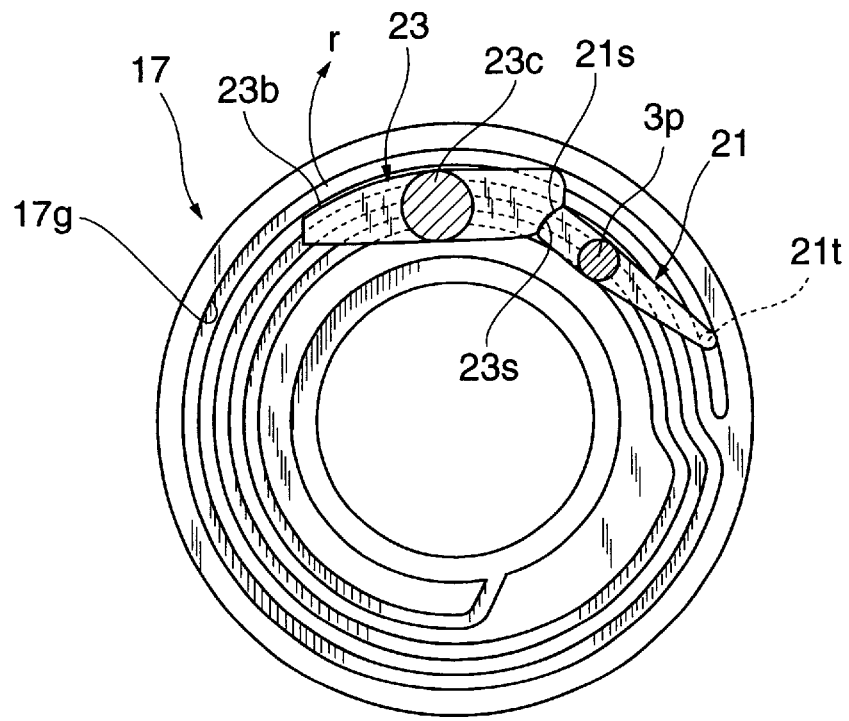
FIG. 4 is a diagram showing a control plate, a control lever and a lever in their initial positions (in a state that a bobbin has not rotated yet relative to a locking base) in the seatbelt retractor according to the first embodiment of the present invention as illustrated in FIGS. 1 through 3.
Figure 5:
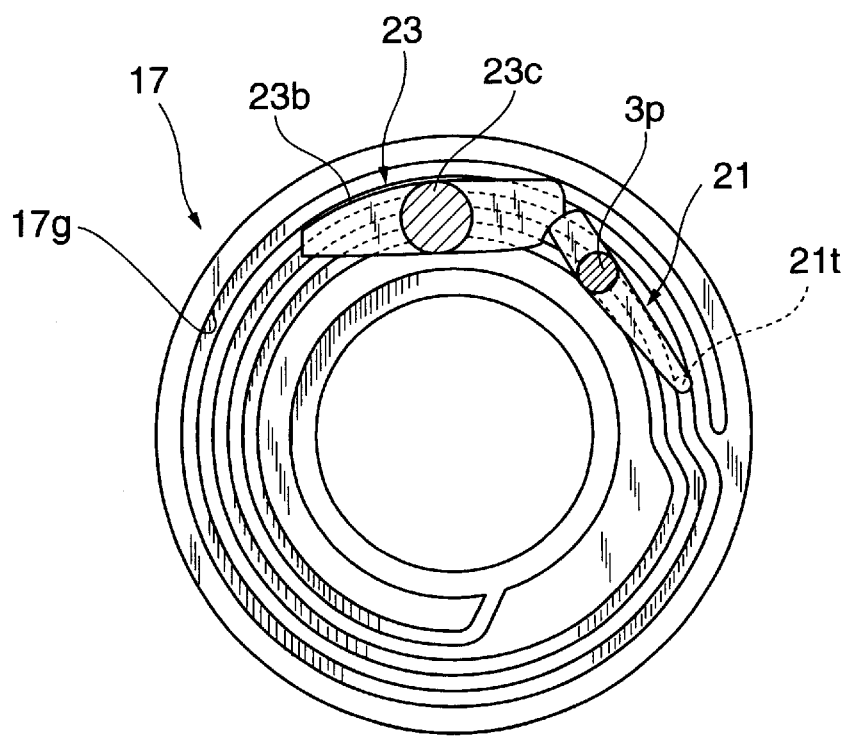
FIG. 5 is an operation diagram showing the control plate, control lever and lever operated from their respective positions in FIG. 4.
Figure 6:
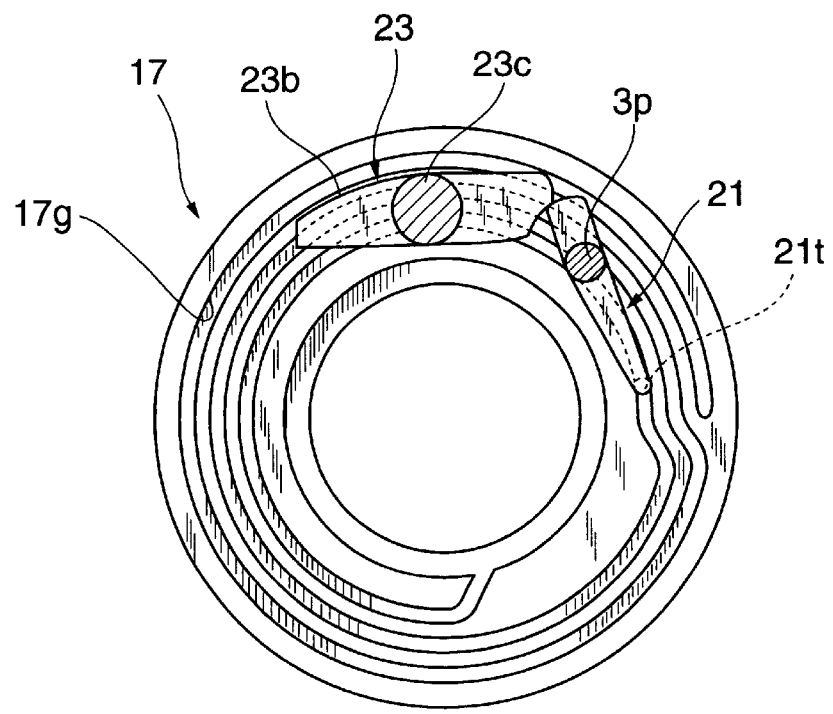
FIG. 6 is an operation diagram showing the control plate, control lever and lever operated from their respective positions in FIG. 5.

Reference is next had to FIG. 4. In the state shown in FIG. 4, the leg portion 21t of the control lever 21 is located in the vicinity of an end portion of the outermost turn of the volute groove 17g of the control plate 17. Although the lever 23 is under a biasing force in the direction r by the spring 24 shown in FIG. 1, the lever 23 is prevented from turning as an end portion 23s of the arm portion 23b is in contact with an end portion 21s of the control lever 21.

As the relative rotation between the control plate 17 and the control lever 21 proceeds further, the leg portion 21t of the control lever 21, said leg portion being under guidance by the volute groove 17g, is progressively guided toward an inner groove 17h (see FIG. 9) which is located at a final end portion of the volute groove 17g and has a constant radius. When the control plate 17 and the control lever 21 rotate further relative to each other to a predetermined extent, the leg portion 21t of the control lever 21 is guided further toward the inner groove 17h of the volute groove 17g so that the end portion 23s of the lever 23 and the end portion 21s of the control lever 21 become out of contact.

Figure 7:
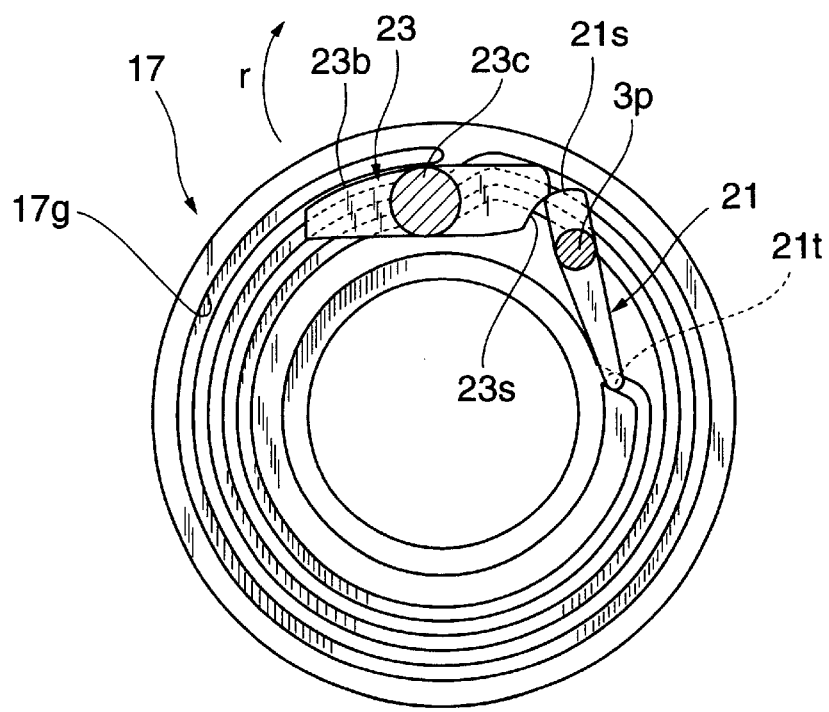
FIG. 7 is an operation diagram showing the control plate, control lever and lever operated from their respective positions in FIG. 6.
Figure 8:
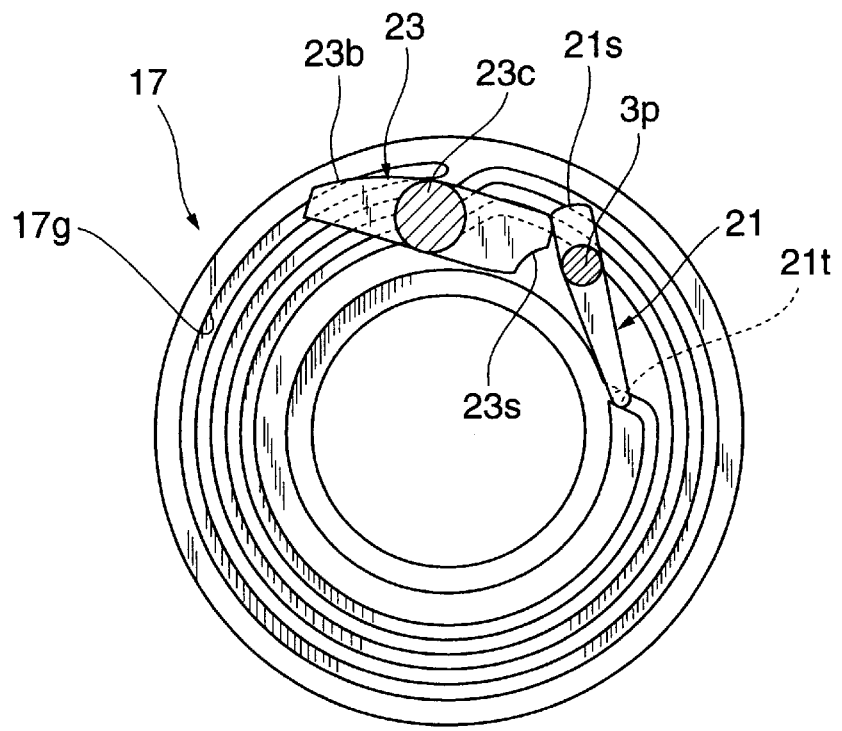
FIG. 8 is an operation diagram showing the control plate, control lever and lever operated from their respective positions in FIG. 7.
Figure 9:
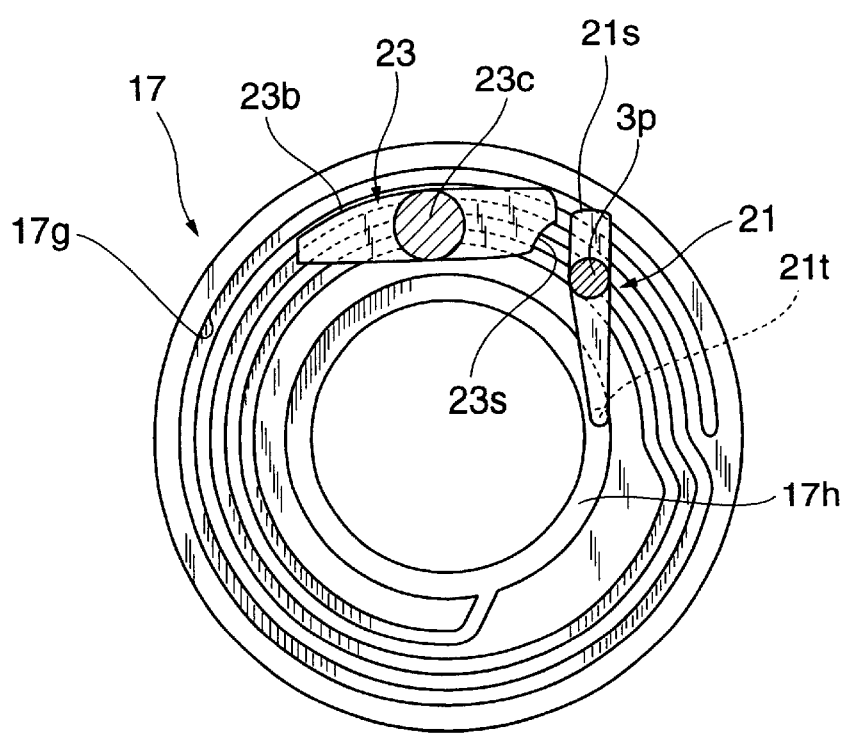
FIG. 9 is an operation diagram showing the control plate, control lever and lever operated from their respective positions in FIG. 8.
Figure 10A:
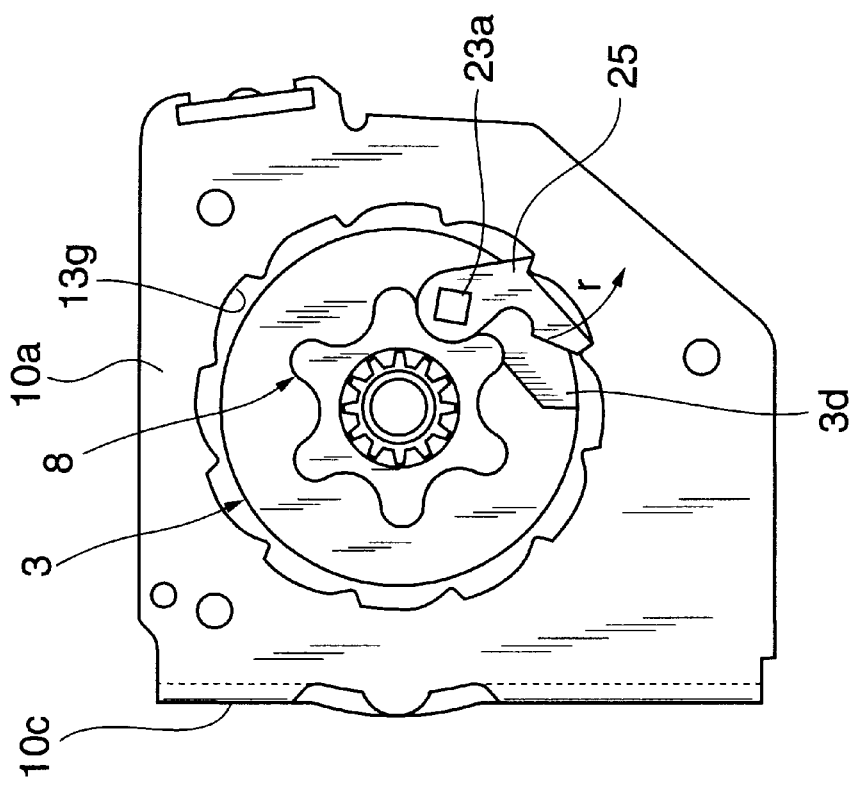
FIG. 10A is a schematic side view of the seatbelt retractor according to the first embodiment of the present invention in which a second pawl is in an un-actuated position.
Figure 10B:
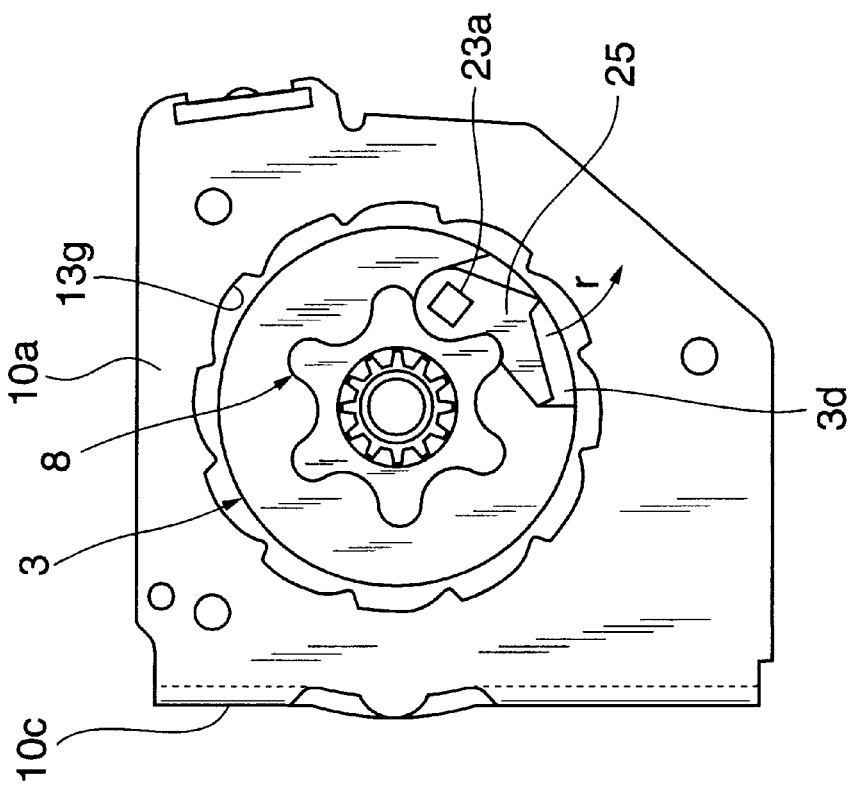
FIG. 10B is a schematic side view of the seatbelt retractor according to the first embodiment of the present invention in which the second pawl is in an actuated position.

By the biasing force of the spring 24, the lever 23 is then caused to turn in the direction r from its position shown in FIG. 7 so that the lever 23 takes the position in FIG. 8. As a result of this turning of the lever 23, the second pawl 25 connected to the connecting portion 23a of the lever 23 pivots in the direction r from its position shown in FIG. 10A. As is illustrated in FIG. 10B, the second pawl 25 supported at an end thereof in contact with the sleeve 8 is brought into engagement with the internal teeth 13g of the side plate 10a, whereby any further withdrawal of the webbing is prevented. Therefore, the prevention of rotation of the locking base 7 by the first pawl 9 and the prevention of rotation of the bobbin 3 by the second pawl 25 at the end of an energy absorbing operation are separately assigned to the side plates 10b, 10a of the retractor base 10. This has made it possible to avoid concentration of a load and hence to obviate the need for reinforcement. It is to be noted that the direction (the direction r) in which the spring 24 biases the lever 23 is a direction in which the pawl 25 moves outwardly in the radial direction of the flange portion 3a. This direction is the same as the direction in which a centrifugal force acts on the second pawl 25 during rotation of the bobbin 3. The second pawl 25 can be actuated by the centrifugal force as soon as the lever 23 and the control lever 21 become out of contact. It is therefore unnecessary to use a strong spring as the spring 24 the biasing force of which acts on the lever 23.

Figure 11:
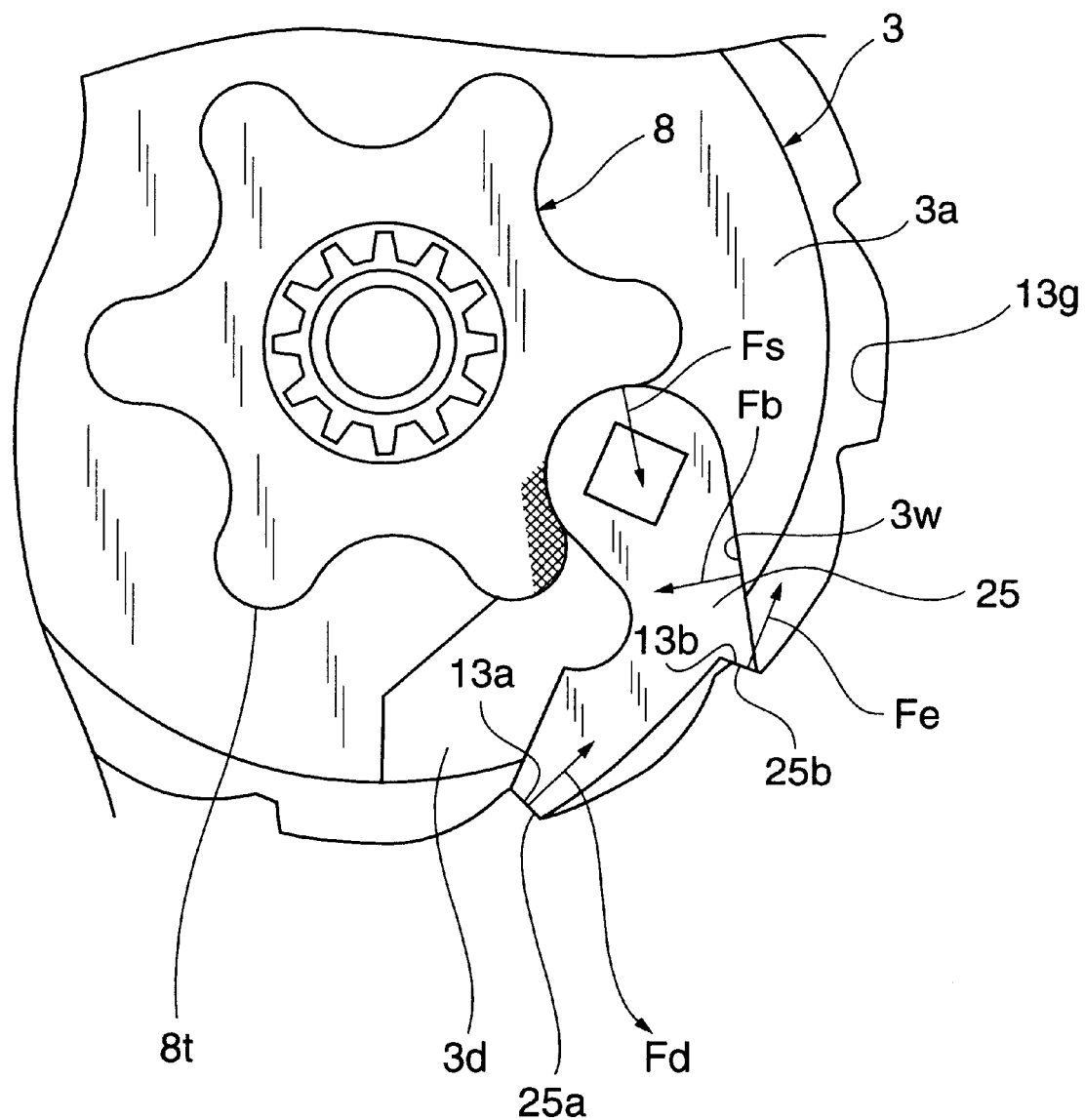
FIG. 11 is an enlarged fragmentary view of FIG. 10B.

As is shown on an enlarged scale in FIG. 11, the second pawl 25 is designed to prevent any further rotation of the bobbin 3 in the webbing-withdrawing direction by relying upon meshing engagement of a tooth 25a, which is formed on a free end portion of the second pawl 25, with one 13a of the internal teeth 13g and similar meshing engagement of a tooth 13b, which is formed on an intermediate portion of the second pawl 25, with another one 13b of the internal teeth 13g. At this time, the second pawl 25 is subjected to forces Fd,Fe from the teeth 13a,13b of the internal teeth 13g. In addition, the second pawl 25 is subjected to a force Fb from a wall portion 3w formed at the recess 3d of the bobbin 3 and also to a force Fs from the sleeve 8. A load, which occurs as a reaction on the sleeve 8, is distributed to five convexities 8t of the sleeve 8 other than a crosshatched convexity shown in FIG. 11 and is applied to the bobbin 3. Namely, a load which is applied to the bobbin 3 is partly borne and is also divided by the sleeve 8. It is therefore possible to avoid concentration of the load on a particular part of the bobbin 3, thereby making it possible to simplify reinforcement to the bobbin 3.

Even when in the state of FIG. 8, the second pawl 25 does not promptly engage the internal teeth 13g and the bobbin 3 continues to rotate, the end portion 23s of the lever 23 and the end portion 21s of the control lever 21 always remain out of contact because the leg portion 21t of the control lever 21 can remain guided by the inner groove 17h of the volute groove 17g. The second pawl 25 can therefore remain in the operated state thereof until it is brought into meshing engagement with the next one of the internal teeth 13g under the biasing force of the spring 24 and also under a centrifugal force. In the seatbelt retractor 1 according to the first embodiment, the position where any further rotation of the bobbin 3 is prevented can be easily changed by modifying the shape of the volute groove 17g, the initial position of the leg portion 21t of the control lever 21, and/or the like. Incidentally, the control plate 17 can be omitted by arranging a volute groove on the locking base 7 itself.

Referring next to FIG. 12A through FIG. 24, the seatbelt retractor according to the second embodiment of the present invention will be described. Elements of structure, which are common to the above-described first embodiment, will be identified by like reference numerals, and their description will be simplified or omitted.

Figure 12A:
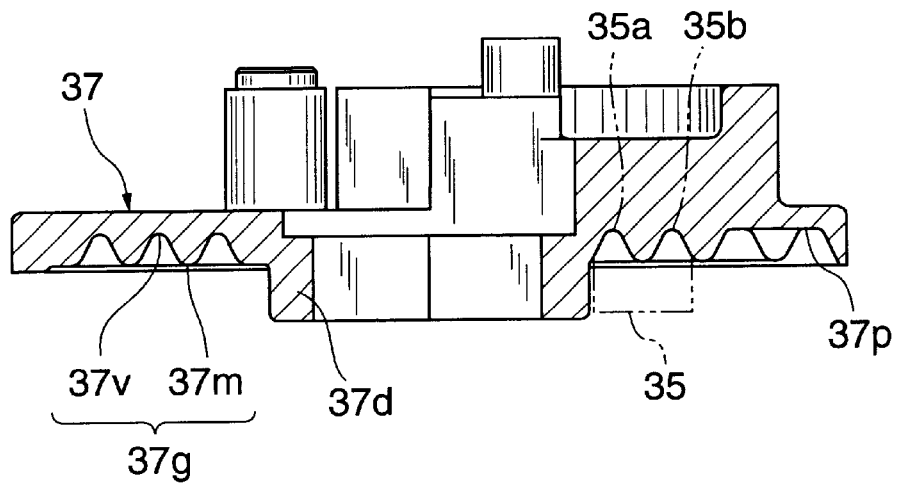
FIG. 12A is a cross-sectional view of a locking base in a seatbelt retractor according to a second embodiment of the present invention.
Figure 12B:
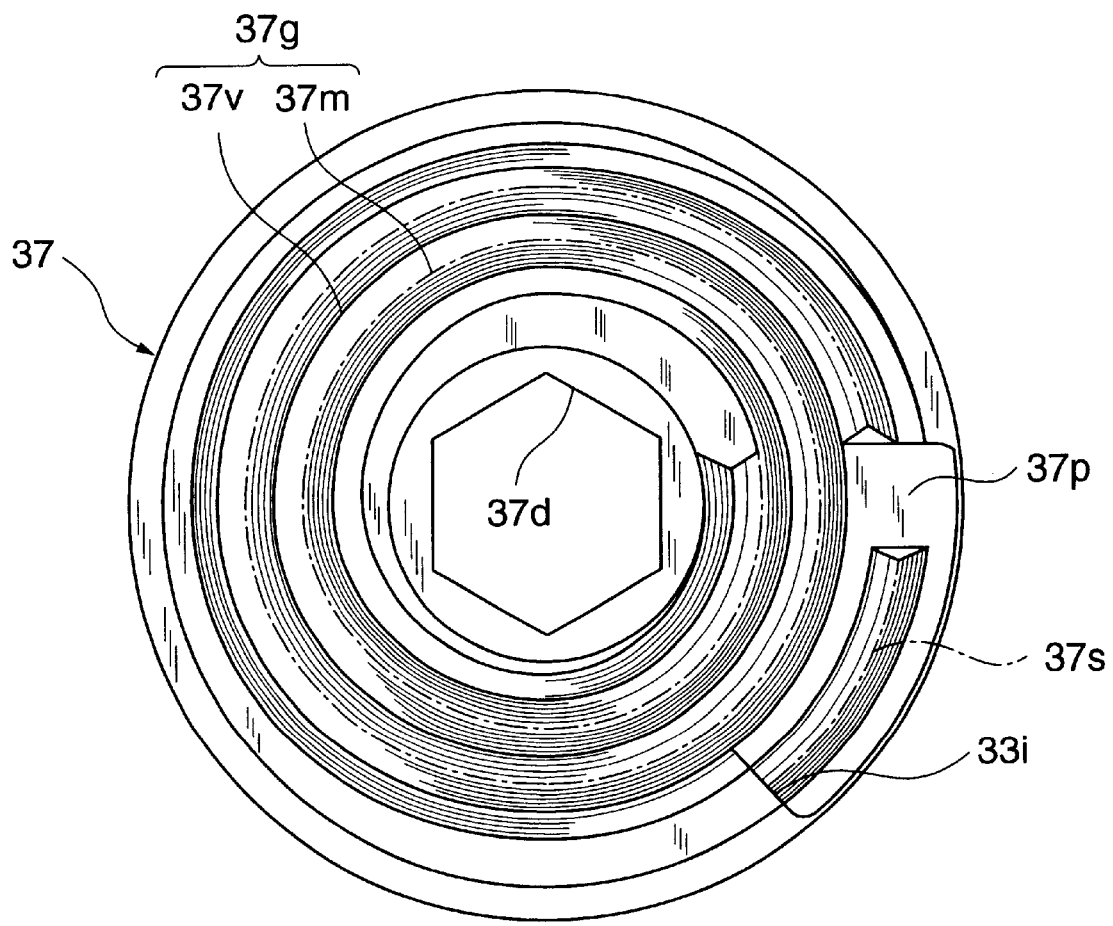
FIG. 12B is a bottom view of the locking base of FIG. 12A.

As is illustrated in FIGS. 12A and 12B, a locking base 37 defines therethrough 2 through-hole 37d in which the connected portion 5b of the torsion bar 5 is fitted. The locking base 37 is provided on a side wall thereof with a V-shaped volute groove 37g which is formed by a ridge portion 37m and a valley portion 37v. A slider 35, which is indicated by a phantom, is arranged such that the slider 35 lies astride two turns of the V-shaped groove 37g and are supported on the bobbin 33. The slider 35 is provided with ridge portions 35a,35b which are movable along the V-shaped groove 37g. In an outermost turn of the V-shaped groove 37g, an ungrooved flat portion 37p is formed. At a location further apart from the flat portion 37p toward a circumferential end portion, a wall portion 33i adapted to finally prevent the movement of the slider 35 is formed with an auxiliary ridge 37s of triangular shape in cross-section interposed between the wall portion 33i and the flat portion 37p.

Figure 13:
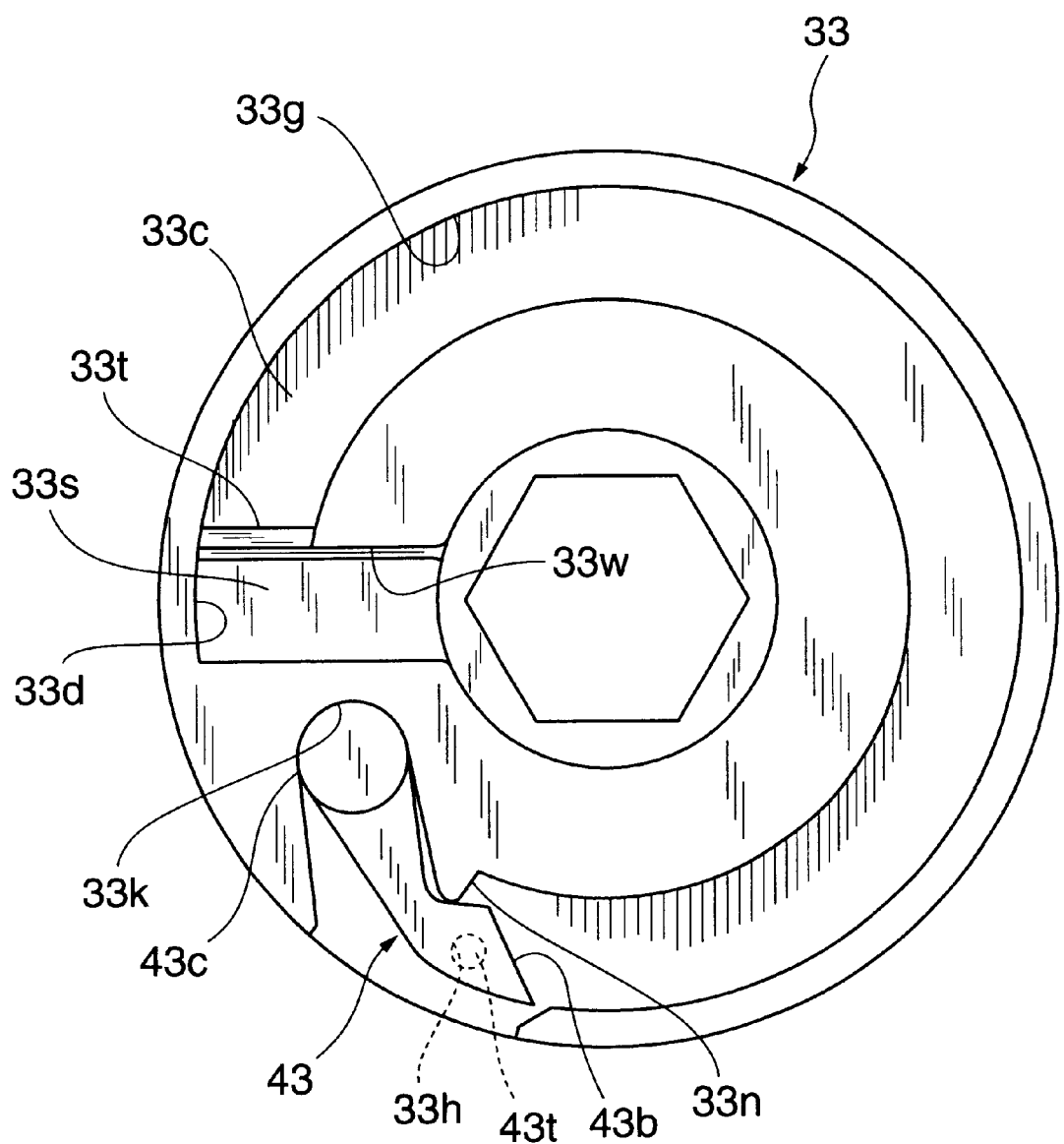
FIG. 13 is a plan view of a bobbin with a lever supported thereon in the seatbelt retractor according to a second embodiment of the present invention.
Figure 14:
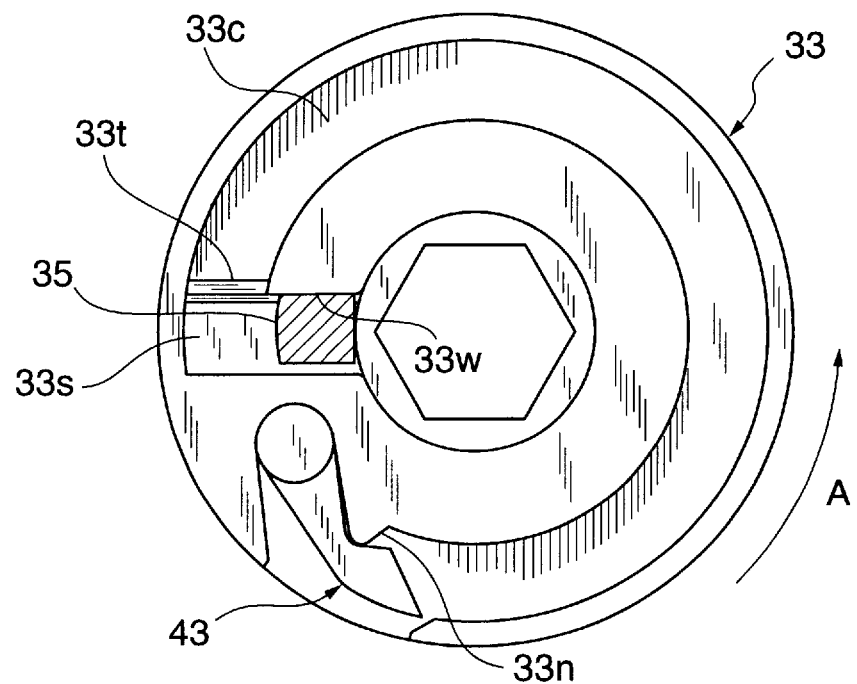
FIG. 14 is a diagram showing a bobbin, the locking base, a lever and a slider in their initial positions (in a state that the bobbin has not rotated yet relative to the locking base) of in the seatbelt retractor according to the second embodiment of the present invention as illustrated in FIGS. 12A through 13.

As is shown in FIG. 13, a G-patterned groove 33g is arranged as a guide portion on a bobbin 3 on which a webbing is wound. This G-patterned groove 33g is provided with a curved portion 33c, which extends in a circumferential direction of the bobbin, and also with a linear portion 33s. In a through-hole 33k formed at an end portion of the curved portion 33c of the G-patterned groove 33g, a lever 43 as a transmitting member is supported turnably about a shaft portion 43c. The lever 43 is provided with a pin 43t, which is fitted in a hole 33h formed in the vicinity of the end portion of the curved portion 33c of the G-patterned groove 33g. In this fitted state, the lever 43 is therefore prevented from any turning motion. Further, the lever 43 is provided with an arm portion 43b, which is in contact with a nose portion 33n formed at a part of the curved portion 33c. Incidentally, the lever 43 is also provided at an axially opposite end portion thereof with a connecting portion in which the second pawl 25 is fitted as in the above-described first embodiment.

Further, the linear portion 33s of the G-patterned groove 33g is provided with a planar wall portion 33w. The slider 35 can be slidably supported in contact with the wall portion 33w. Between the curved portion 33c and the linear portion 33s, a raised portion 33t is arranged to guide the slider 35 along a predetermined path.

A description will next be made about operation of the seatbelt retractor according to the second embodiment of the present invention. When a load of a predetermined value or greater is applied in the webbing-withdrawing direction in the event of a vehicular emergency and the deformable portion 5c of the torsion bar 5 is twisted, relative rotation takes place between the bobbin 33 and the locking base 37. The slider 35 supported on the bobbin 33 therefore moves relative to the locking base 37.

With reference to FIG. 14 through FIG. 23, a description will next be made about operation of the seatbelt retractor according to the second embodiment of the present invention. In the state depicted in FIG. 14, the slider 35 is located in the innermost turn of the V-shaped groove 37g on the locking base 37 while being supported on the wall portion 33w of the bobbin 33.

Figure 15:
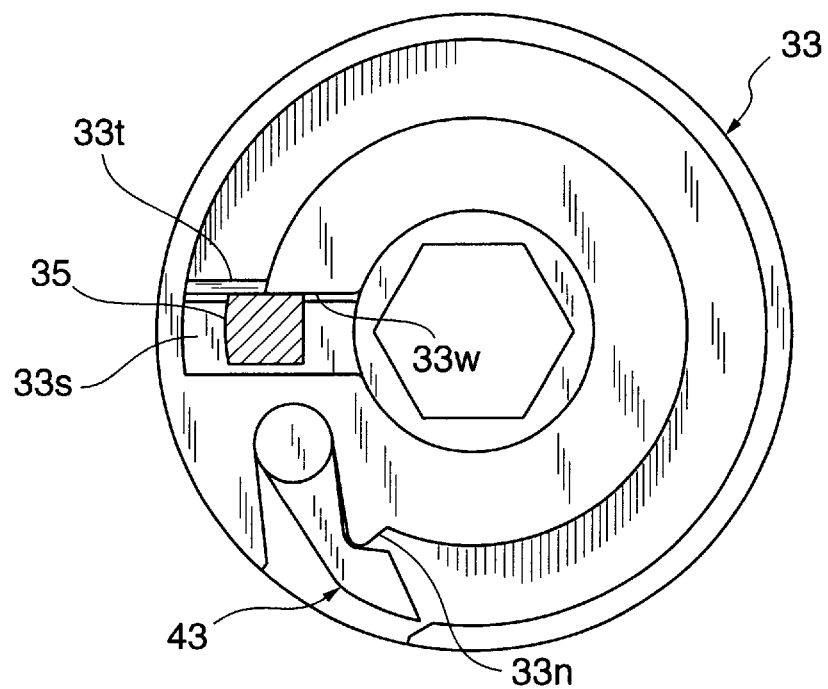
FIG. 15 is an operation diagram showing the bobbin, locking base, lever and slider operated from their respective positions in FIG. 14.
Figure 16:
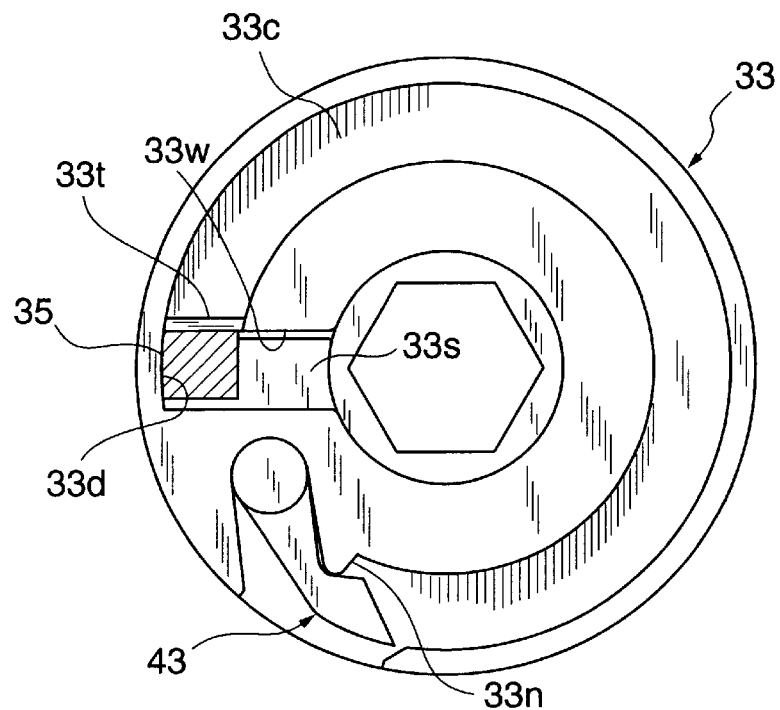
FIG. 16 is an operation diagram showing the bobbin, locking base, lever and slider operated from their respective positions in FIG. 15.

As the relative rotation between the bobbin 33 and the locking base 37 proceeds (in a direction A in FIG. 14) the slider 35 which is under the guidance of the V-shaped groove 37g is guided toward the outer turn of the V-shaped groove 37g as shown in FIG. 15 so that the slider 35 moves in the linear portion 33s while being positionally limited by the wall portion 33w of the G-patterned groove 37g and also being prevented by the raised portion 33t from falling onto the curved portion 33c. When the relative rotation between the bobbin 33 and the locking base 37 proceeds further, the slider 35 comes into contact with an end portion 33d of the linear portion 33s of the G-patterned groove 35g as depicted in FIG. 16.

Figure 17:
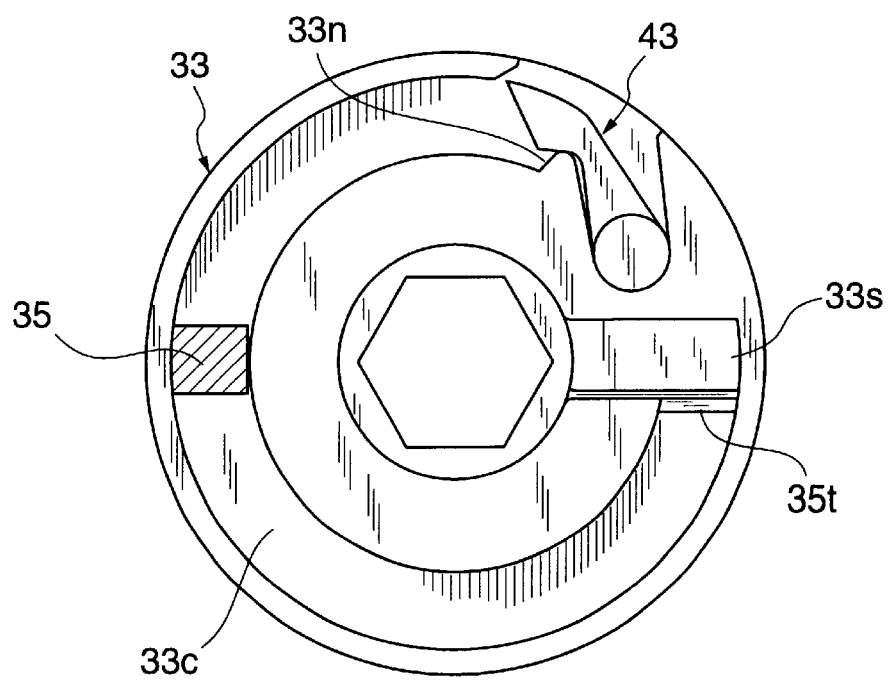
FIG. 17 is an operation diagram showing the bobbin, locking base, lever and slider operated from their respective positions in FIG. 16.
Figure 18:
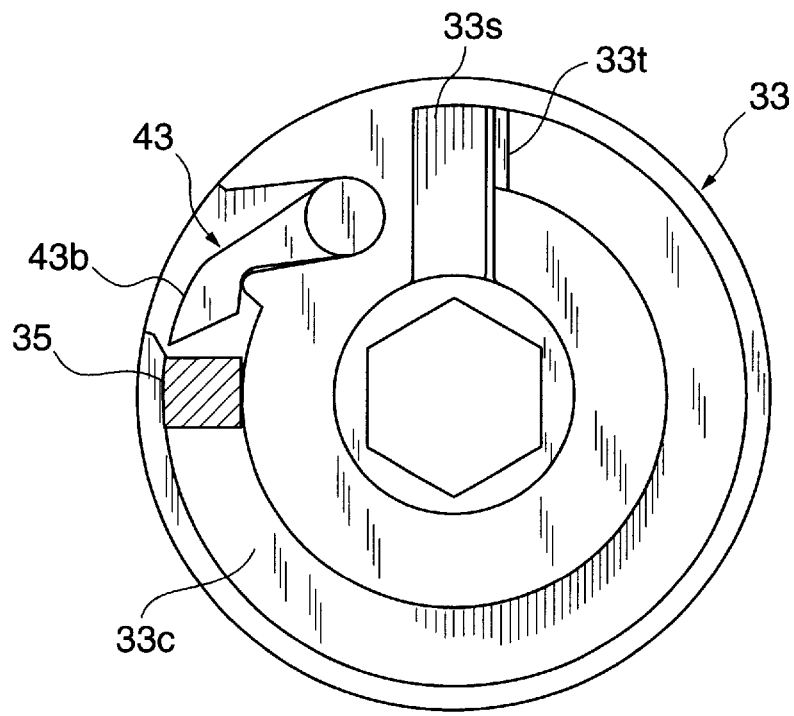
FIG. 18 is an operation diagram showing the bobbin, locking base, lever and slider operated from their respective positions in FIG. 17.

The slider 35, which is no longer positionally limited by the wall portion 33w of the bobbin 33, then rides over the raised portion 33t and moves into the curved portion 33c of the G-patterned groove 33g as shown in FIG. 17 and FIG. 18.

Figure 19:
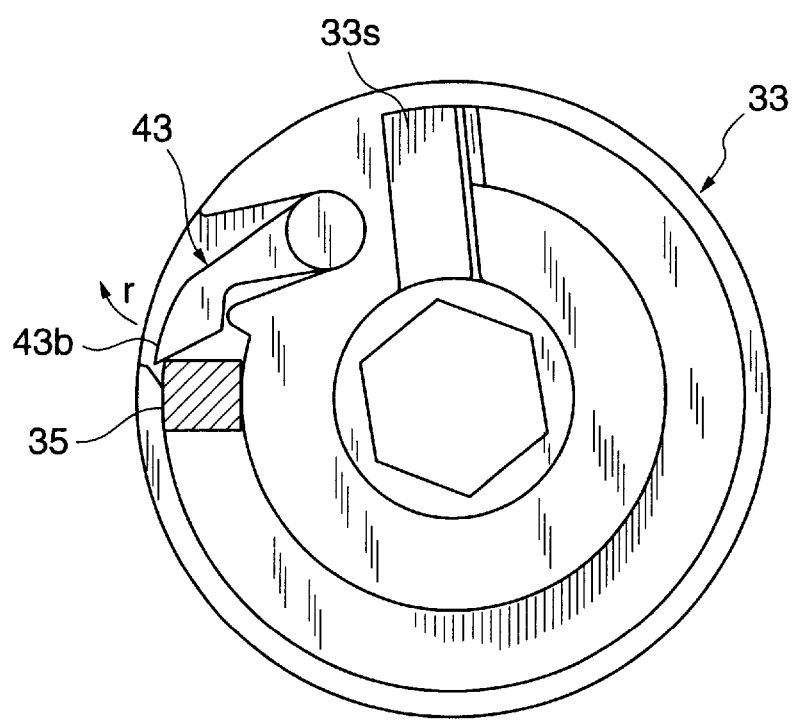
FIG. 19 is an operation diagram showing the bobbin, locking base, lever and slider operated from their respective positions in FIG. 18.
Figure 20:
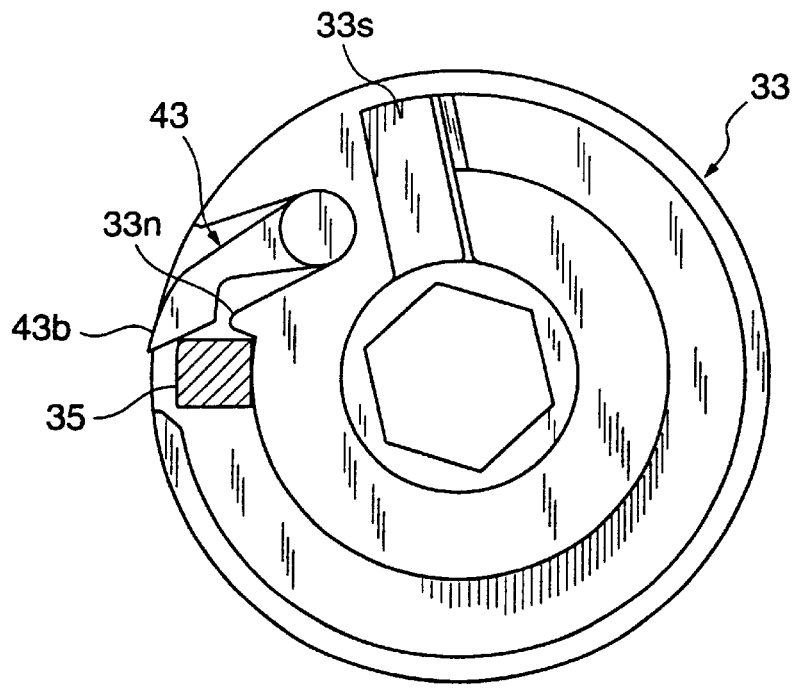
FIG. 20 is an operation diagram showing the bobbin, locking base, lever and slider operated from their respective positions in FIG. 19.

When the bobbin 33 slightly rotates relative to the locking base 37 from the position shown in FIG. 18, the arm portion 43b of the lever 43 is brought into contact with the slider 35 as shown in FIG. 19. As the relative rotation proceeds further, the pin 43t (see FIG. 13) of the lever 43 is cut off so that the lever 43 turns clockwise (in the direction of arrow r) from the position shown in FIG. 19 to the position illustrated in FIG. 20.

By this turning motion of the lever 43, the second pawl 25 which is fitted in the connecting portion arranged on the opposite end portion of the lever 43 as in the first embodiment pivots. As is illustrated in FIG. 11, the tooth 25a of the second pawl 25 supported at an end thereof by the sleeve 8 is then brought into engagement with the internal teeth 13g formed on the side plate 10a of the retractor base 10 so that any further rotation of the bobbin 33 is prevented.

Figure 21:
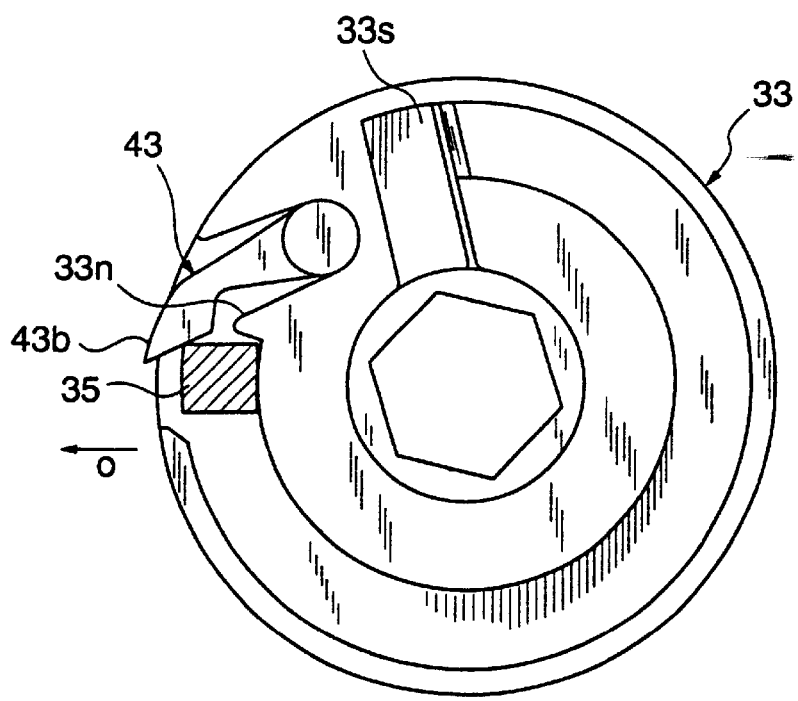
FIG. 21 is an operation diagram showing the bobbin, locking base, lever and slider operated from their respective positions in FIG. 20.
Figure 22:
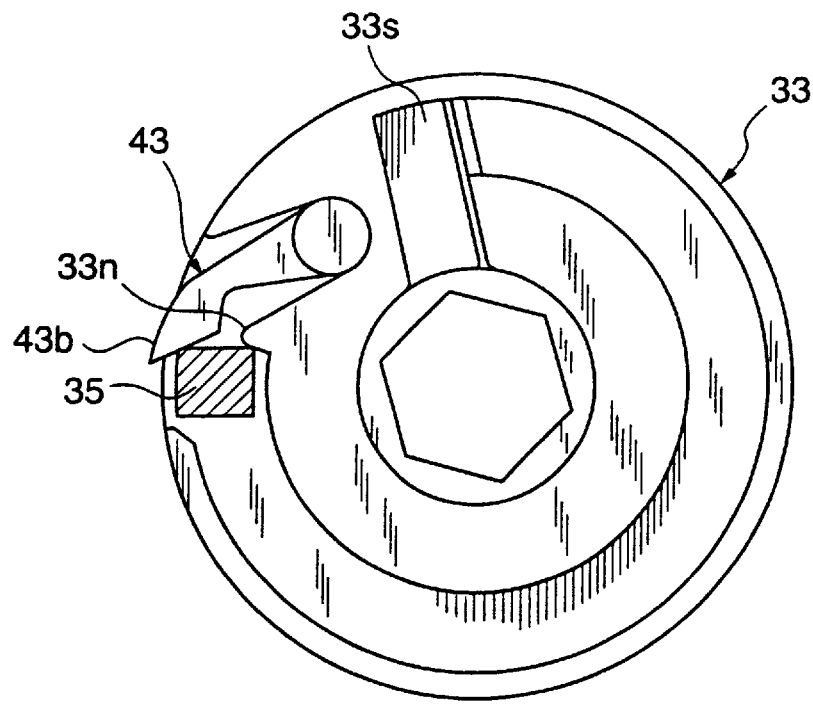
FIG. 22 is an operation diagram showing the bobbin, locking base, lever and slider operated from their respective positions in FIG. 21.

When the second pawl 25 does not engage the internal teeth 13g promptly after the pin 43t is cut off, the slider 35 further pushes the arm portion 43b of the lever 43. Concurrently with this pushing motion, the slider 35 itself is pushed by the nose portion 33n of the still rotating bobbin 33 as shown in FIG. 21. As a consequence, the slider 35 is caused to move on the flat portion 37p (see FIG. 12B) of the locking base 37 outwardly of the bobbin (in the direction of arrow O). The slider 35 which has moved onto the flat portion 37p is pushed by the arm portion 43b of the lever 43 and the nose portion 33n as illustrated in FIG. 22, so that the slider 35 moves counterclockwise on the auxiliary ridge 37s (see FIG. 12B).

Figure 23:
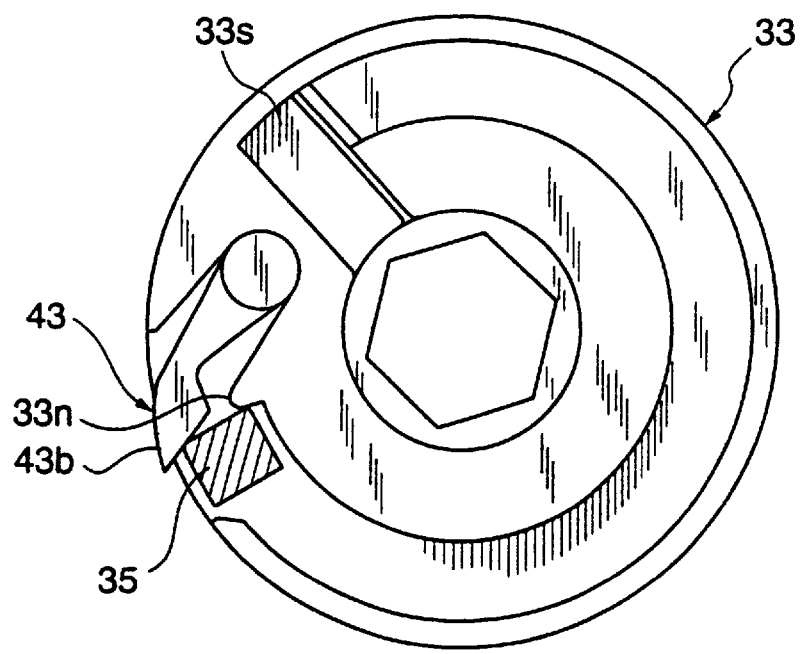
FIG. 23 is an operation diagram showing the bobbin, locking base, lever and slider operated from their respective positions in FIG. 22.

As is depicted in FIG. 23, the slider 35 rotates counterclockwise for a while, and can move up to the wall portion 33i (see FIG. 12B) formed as a final rotation preventing member at the end portion of the auxiliary ridge 37s. While the slider 33 is moving on the auxiliary ridge 37s, the slider 33 remains pushed by the arm portion 43b of the lever 43 and also by the nose portion 33n. The second pawl 25 fitted in the connecting portion of the lever 43 is therefore allowed to remain at its operated position. Even if the phase of the internal teeth 13g with which the second pawl 25 is engageable is shifted, the operated position of the second pawl 25 can be maintained owing to the existence of the auxialiry ridge 37s until the second pawl 25 engages the next one of the internal teeth 13g.

In the seatbelt retractor according to the second embodiment, the position where any further rotation of the bobbin 3 is prevented can be easily changed by modifying the shape of the volute groove 37g and/or the like.

Figure 24:
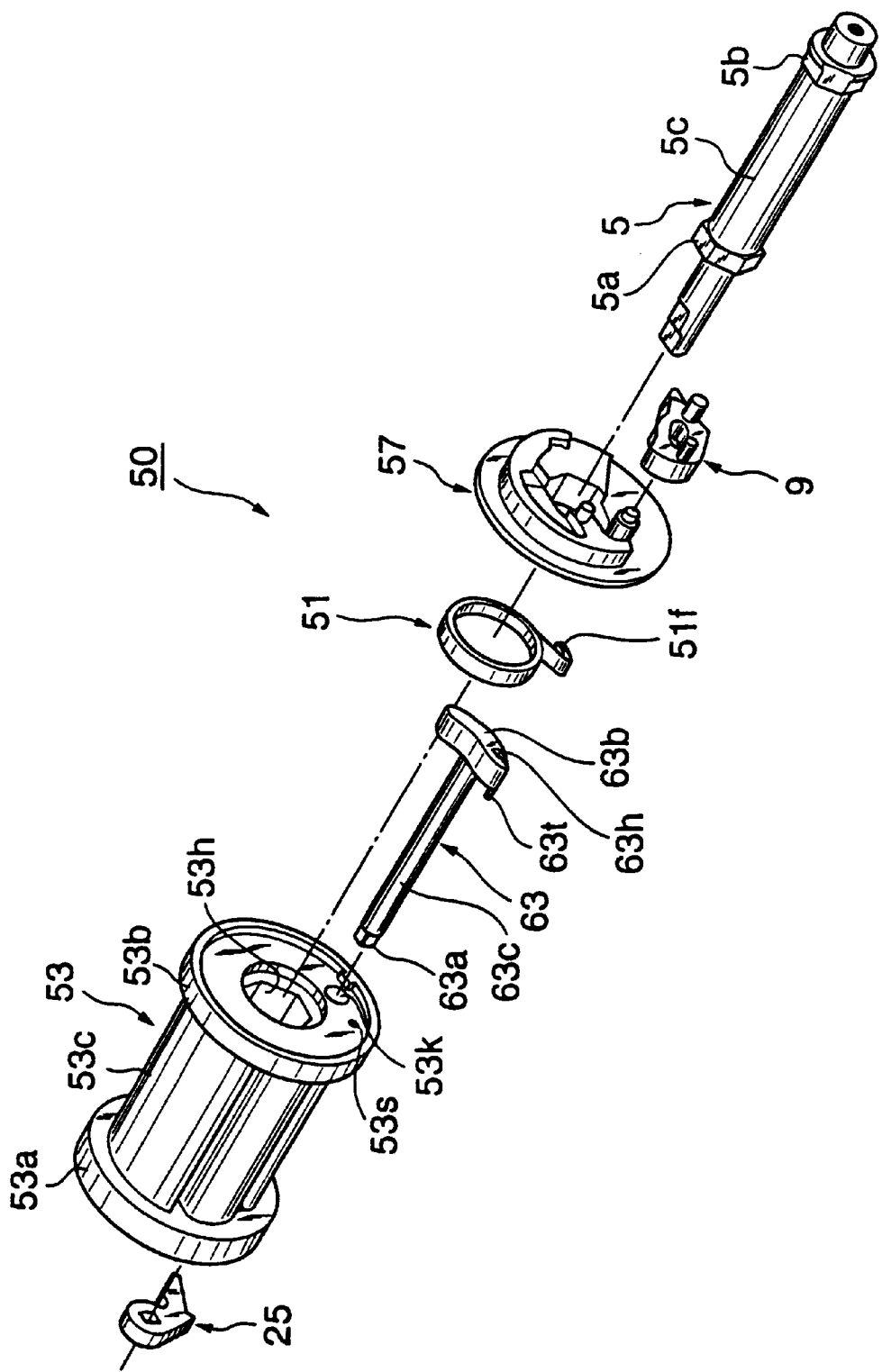
FIG. 24 is an exploded perspective view of a seatbelt retractor according to a third embodiment of the present invention.
Figure 25:
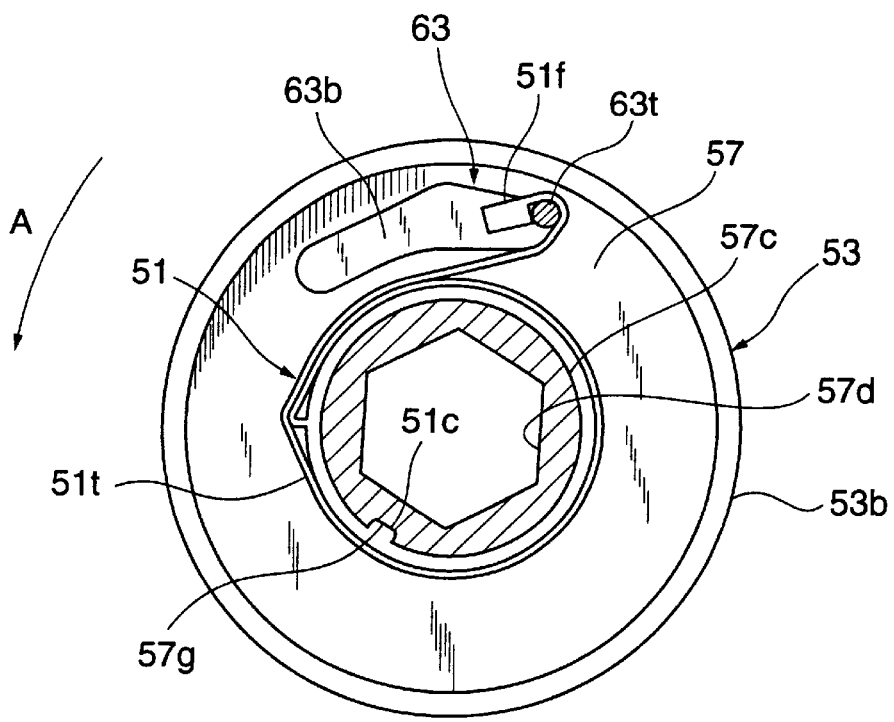
FIG. 25 is a diagram showing a locking base, a tape member and a lever in their initial positions (in a state that a bobbin has not rotated yet relative to a locking base) in the seatbelt retractor according to the third embodiment of the present invention as illustrated in FIG. 24.
Figure 26:
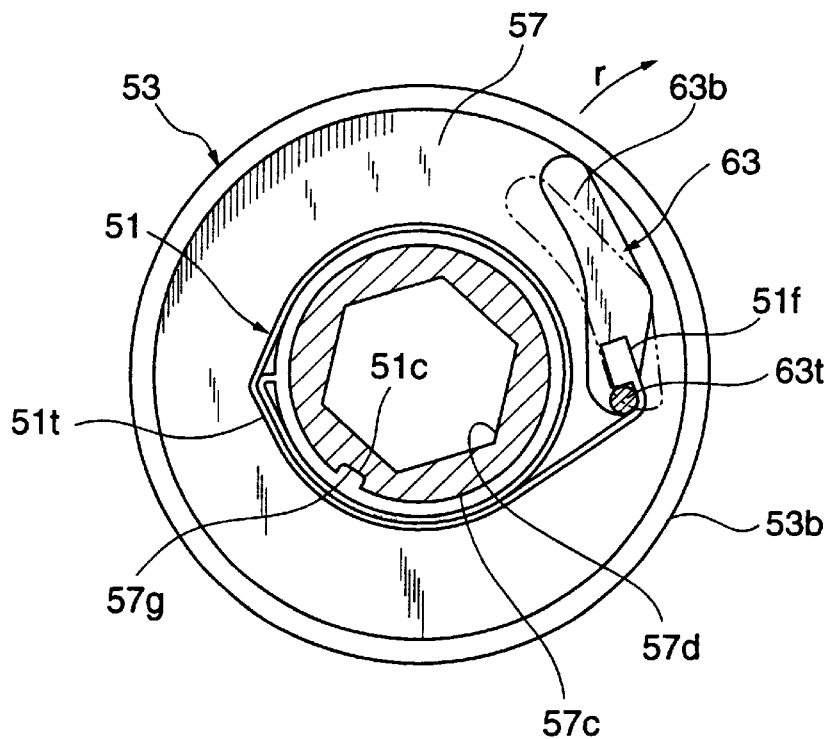
FIG. 26 is an operation diagram showing the locking base, tape member and lever operated from their respective positions in FIG. 25.

Referring next to FIG. 24 through FIG. 26, the seatbelt retractor according to the third embodiment of the present invention will be described.

As is illustrated in FIG. 24, the seatbelt retractor 50 according to the third embodiment is provided, as in the above-described first and second embodiments, with a substantially cylindrical bobbin 53, on which a webbing is wound, and a torsion bar 5 as an energy absorbing member. The connected portion 5b of the torsion bar 5, said connected portion 5b being located on the side of a locking base 57 as a locking member, is fitted in a hexagonal through-hole 57d formed in a boss portion 57c (see FIG. 25 and FIG. 26) of the locking base 57, so that integrally rotatable connection is established between the torsion bar 5 and the locking base 57.

The bobbin 53 is provided with a substantially cylindrical barrel portion 53c, on which the webbing is wound, and also with flange portions 53a,53b for preventing the webbing from being retracted out of place. Through the bobbin 53, a torsion bar through-hole 53h through which the torsion bar 5 extends is centrally formed in an axial direction. Arranged between the flange portion 53b and the locking base 57 is a tape member 51 integrally molded or otherwise formed with a resin and having flexibility. The tape member 51 is provided with a convex portion 51c which extends out from an inner circumferential surface (see FIG. 25 and FIG. 26). The convex portion 51c is fitted in a concave portion 57g formed in an outer circumference of a boss portion 57c of the locking base 57, whereby the tape member 51 is fixed in place. A hook portion 51f formed at an end portion of the tape member 51 is held in a hole 63h formed in an arm portion 63b of a lever 63 to be described subsequently herein. Incidentally, the tape member 51 may be formed by adhesion, welding or insert molding instead of integral molding.

A lever through-hole 53k through which the lever 63 extends as a transmitting member is formed through the bobbin 53. The lever 63 is provided with a connecting portion 63a having a square shape in cross-section, the arm portion 63b, and a shaft portion 63c which extends through the lever through-hole 53k. The connecting portion 63a is fitted in the second pawl 25. Further, the arm portion 63b is provided with a pin 63t which fits in a small hole 53s formed in the flange portion 53b of the bobbin 53.

With reference to FIG. 25 and FIG. 26, a description will next be made about operation of the seatbelt retractor according to the third embodiment of the present invention.

When the deformable portion 5c of the torsion bar 5 is twisted, relative rotation takes place between the bobbin 53 and the locking base 57. As the lever 63 then rotates integrally with the bobbin 53 in the direction A, the tape member 51 with the hook portion 51*f* thereof held on the arm portion 63*b* of the lever 63 is unwound at a tape portion 51*t* thereof, and the tape portion 51*t* is wound up in an opposite direction (clockwise) about the boss portion 57*c* of the locking base 57 so that the tape portion 51*t* is tightened.

When further relative rotation takes place between the bobbin 53 and the locking base 57, the pin 63*t* of the lever 63 is cut off by a tensile force of the tape portion 51*t*, and the lever 63 turns clockwise (in the direction r in FIG. 26) from the position indicated by a phantom to the position indicated by a solid line. As a result of turning of the lever 63, the second pawl 25 fitted in the connecting portion 63*a* of the lever 63 is pivoted into engagement with the internal teeth 13*g* of the side plate 10*a*, whereby any further withdrawal of the webbing is prevented.

When the second pawl 25 does not engage the internal teeth 13*g* promptly after the pin 63*t* is cut off, the lever 63 turns further together with the bobbin 53. As the tape portion 51*t* itself is caused to extend at this time, the second pawl 25 fitted in the connecting portion 63*a* of the lever 63 is allowed to remain at its operated position. Even if the phase of the internal teeth 13*g* in which the second pawl 25 is in engagement is shifted, the operated position of the second pawl 25 can be maintained by the tape member 51 until the second pawl 25 engages the next one of the internal teeth 13*g*.

In the seatbelt retractor according to the third embodiment, the position where any further rotation of the bobbin 3 is prevented can be easily changed by modifying the length of the tape portion 51*t* and/or the like.

Referring next to FIGS. 27, 28, and 30 through 34, the seatbelt retractor according to the fourth embodiment of the present invention will be described.

Figure 27:
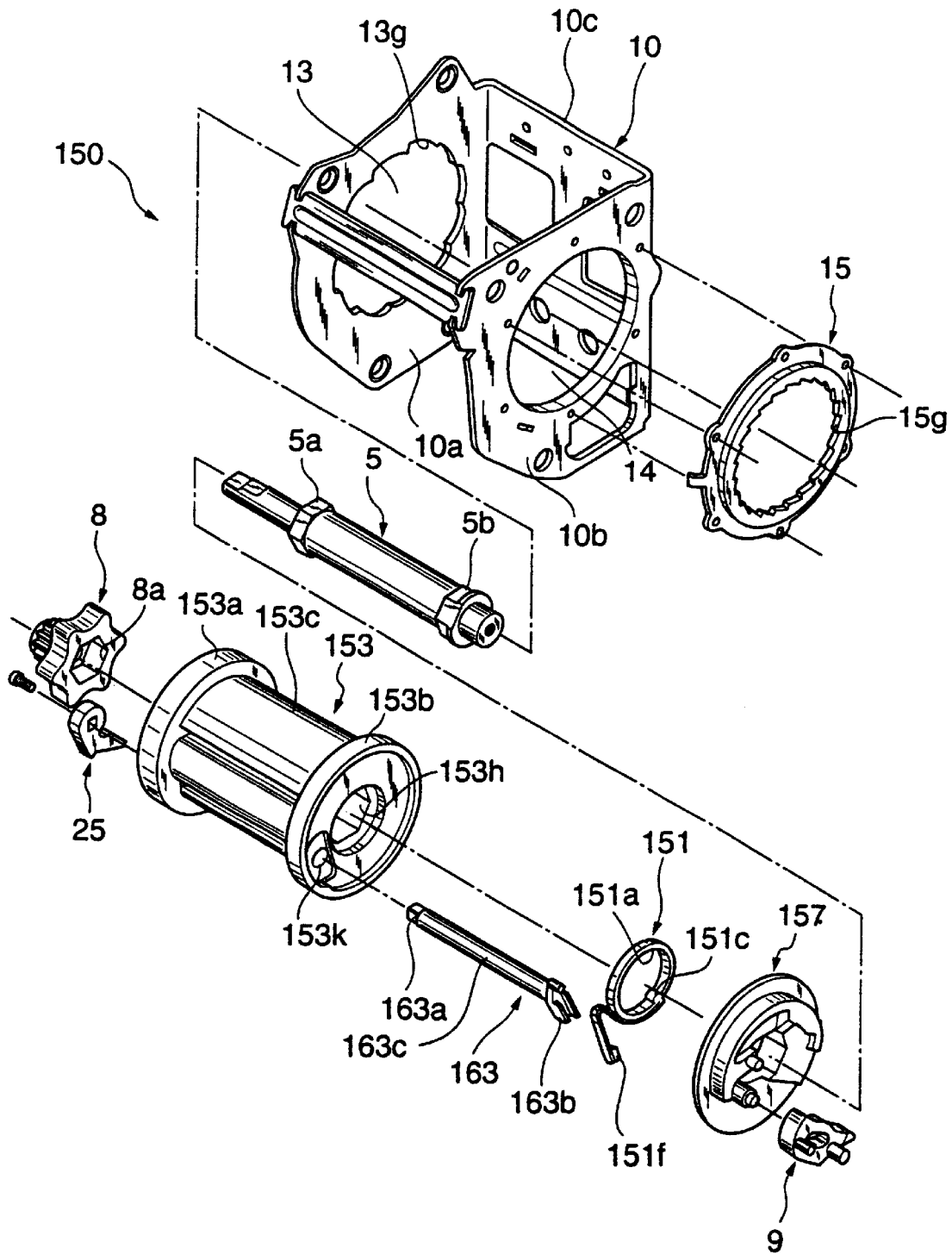
FIG. 27 is an exploded perspective view of a seatbelt retractor according to a fourth embodiment of the present invention.

As is illustrated in FIG. 27, the seatbelt retractor 150 according to the fourth embodiment is also provided, as in the above-described first to third embodiments, with a substantially cylindrical bobbin 153, on which a webbing is wound, and the torsion bar 5 as a substantially cylindrical energy absorbing member. The torsion bar 5 extends through the bobbin 153 and is rotatably supported on the retractor base 10. On the side of the one end of the torsion bar 5 (on the left side as viewed in FIG. 27), the connected portion 5*a* is integrally connected with the bobbin 153. On the side of the opposite end of the torsion bar 4 (on the right side as viewed in FIG. 27), the connected portion 5*b* is integrally connected with a disk-shaped locking base 157 as a locking member.

The bobbin 153 is provided with a substantially cylindrical barrel portion 153*c*, on which the webbing is wound, and also with flange portions 153*a*,153*b* for preventing the webbing from being retracted out of place. Through the bobbin 153, a torsion bar through-hole 153*h* through which the torsion bar 5 extends is centrally formed in an axial direction. Arranged between the flange portion 153*b* and the locking base 157 is a tape member 151.

Figure 28:
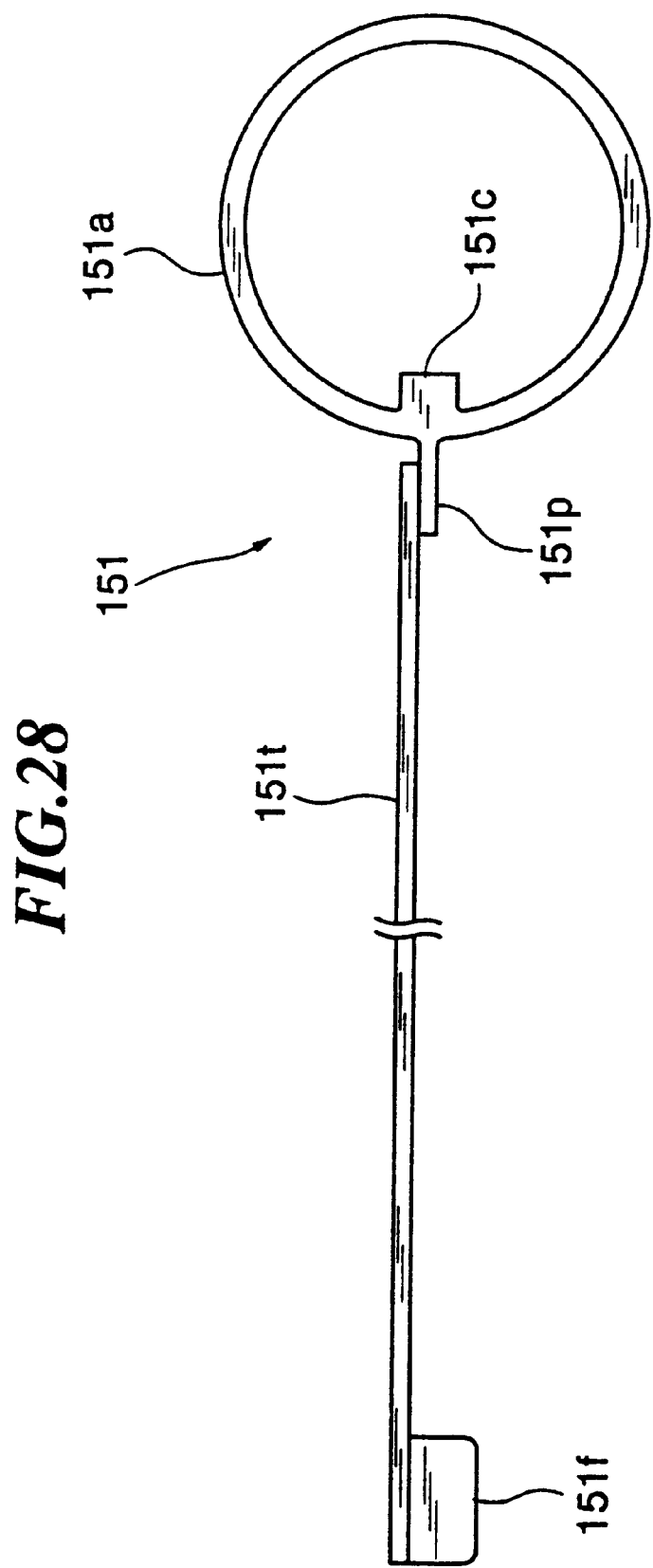
FIG. 28 is a plan view of a tape member in the seatbelt retractor according to the fourth embodiment of the present invention as illustrated in FIG. 27.

Referring to FIG. 28, the tape member 151 will next be described. This tape member 151 is provided with a ring portion 151*a* made of a resin, a tape portion 151*t* welded or adhered to a projecting portion 151*p* formed on an outer circumference of the ring portion, and a hook portion 151*f* made of a resin and welded or bonded to a free end of the tape portion. A tab portion 151*c* is formed on an inner circumference of the ring portion 151*a*. As in the third embodiment, this tab portion 151*c* is fitted in the concave portion formed in the outer circumference of the boss portion of the locking base 157, whereby the tape member 151 is fixed in place. The tape portion 151*t* is formed of a band-shaped resin product, which has been oriented in the direction of the length of the tape and has flexibility. An oriented resin is characterized in that its strength in the direction of the orientation has been increased. The tape portion 151*t* can therefore be formed still thinner, thereby making it possible to achieve both weight reduction and size reduction. Incidentally, the tape portion 151*t* may be in the form of a cord having a circular shape in cross-section instead of a band. Further, the hook portion 151*f* formed at the free end portion of the tape portion 151*t* is held on an arm portion 163*b* of a lever 163 to be described subsequently herein.

Figure 29A:
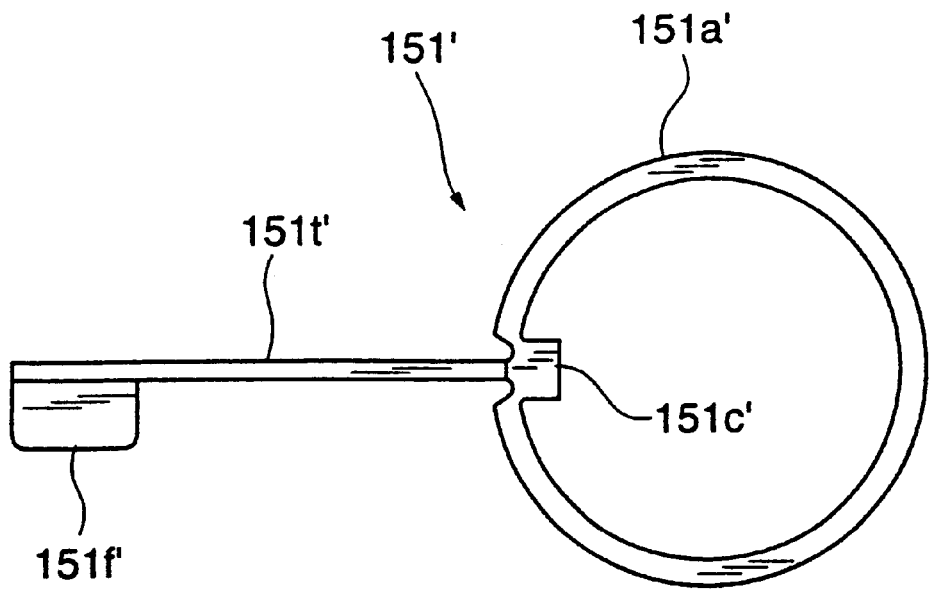
FIG. 29A is a plan view of a modification of the tape member before orientation.
Figure 29B:
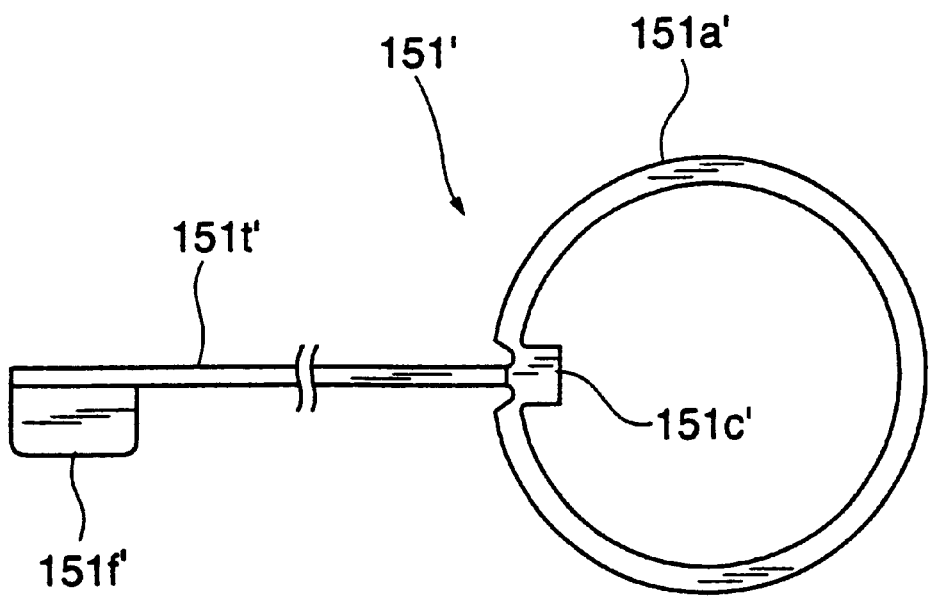
FIG. 29B is a plan view of the modification of the tape member after orientation.

Instead of welding or adhering the ring portion 151*a*, tape portion 151*t* and hook portion 151*f* together, a ring portion 151*a*', tape portion 151*t*' and hook portion 151*f*' may be molded or otherwise formed as illustrated as a modification in FIG. 29A, and as is shown in FIG. 29B, the tape portion 151*t*' may then be subjected to orientation to a desired length. As an alternative, a tape member may also be obtained by insert molding, that is, by inserting the tape portion 15*t*' in a mold and forming the ring portion 151*a*' and hook portion 15l*f*' in the mold by injection molding.

As is illustrated in FIG. 27, a lever through-hole 153*k* through which the lever 163 extends as a transmitting member is formed through the bobbin 153. The lever 163 is provided with a connecting portion 163*a* having a square shape in cross-section, the arm portion 163*b*, and a shaft portion 163*c* which extends through the lever through-hole 153*k*. The connecting portion 163*a* is fitted in the second pawl 25.

Figure 30:
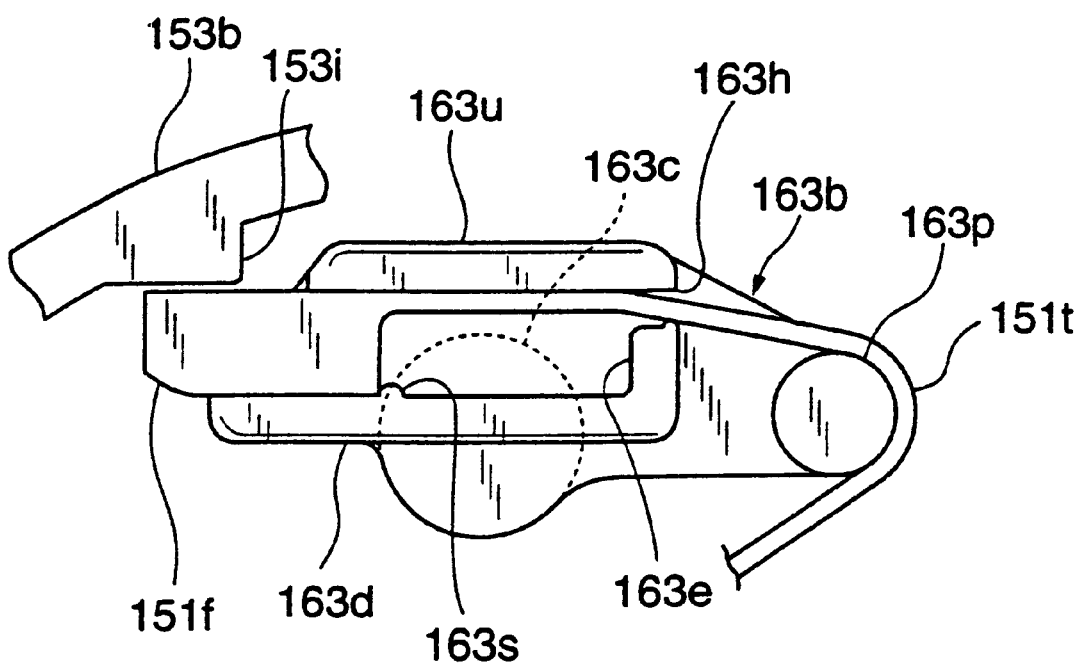
FIG. 30 is an enlarged view of an arm portion and its vicinity area in the seatbelt retractor according to the fourth embodiment of the present invention as illustrated in FIG. 27.
Figure 32C:
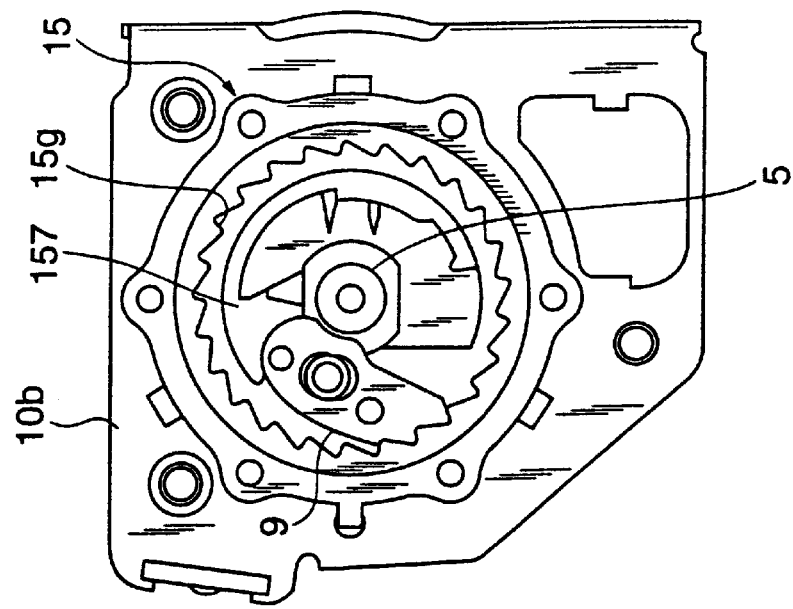
FIGS. 32A, 32B and 32C are operation diagrams showing the corresponding elements operated from their respective positions in FIGS. 31A, 31B and 31C.
Figure 32B:
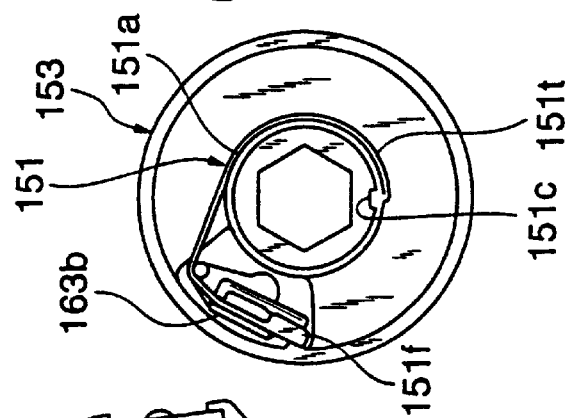
Figure 32A:
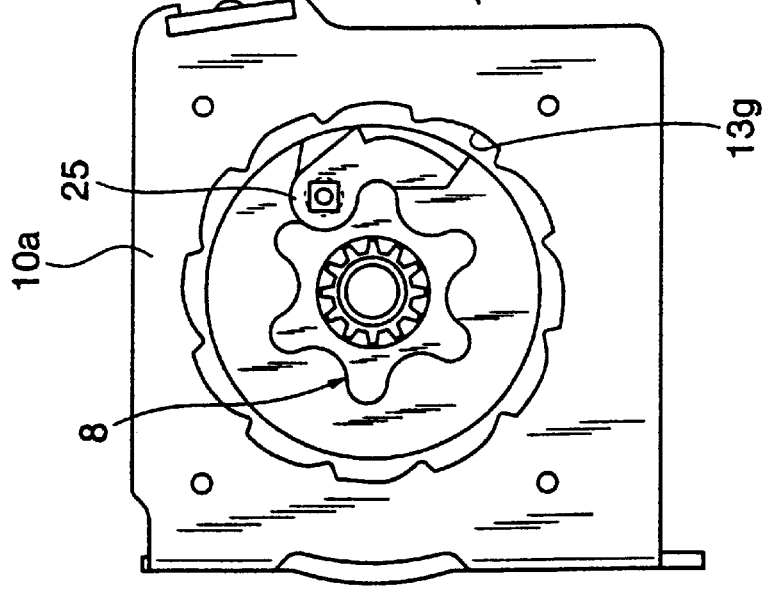

Referring next to FIG. 30, the arm portion 163*b* is provided with an upper guide portion 163*u*, a lower guide portion 163*d* and a pin 163*p*. The upper and lower guide portions 163*u*,163*d* are in the form of lugs and serve to guide the hook portion 151*f* of the tape member 151. The pin 163*p* supports the tape portion 151*t*. The tape portion 151*t* of the tape member 151 extends through a slit 163*h* formed between the upper guide portion 163*u* and the lower guide portion 163*d*. Further, the lower guide portion 163*d* is provided with a small projection 163*s* which positionally limits the hook portion 151*f*. When a predetermined tensile force is applied, the interval between the upper guide portion 163*u* and the lower guide portion 163*d* is widened as a result of a deformation or the small projection 163*s* is caused to collapse or is cut off such that the hook portion 151*f* is allowed to move. Because of the positional limitation by the small projection 163*s*, the hook portion 151*f* normally remains in contact with a projection 153*i* formed on an inner wall of the flange portion 153*b* so that clockwise rotation of the lever 163 is normally prevented. As the arm portion 163*b* normally remains stationary, the lever 163 does not turn accordingly.

Referring next to FIG. 31 through FIG. 34, a description will be made about operation of the seatbelt retractor 150 according to the fourth embodiment of the present invention. As is illustrated in FIG. 31C, in the event of a vehicular emergency, a detection member (not shown) guides the first pawl 9 from the position indicated by a phantom outwardly in the radial direction of the locking base 157 so that as shown by a solid line, the edge 9*a* of the first pawl 9 is brought into meshing engagement with the internal teeth 15*g* of the latch plate 15 fixed on the side plate 10*b*. As a consequence, any further rotation of the locking base 157 in the webbing-withdrawing direction is prevented. When a load of a predetermined value or greater is then applied in the webbing-withdrawing direction and the deformable portion 5c of the torsion bar 5 is twisted, relative rotation takes place between the bobbin 153 and the locking base 157. As the lever 163 turns integrally with the bobbin 153, the tape member 151 with the hook portion 151f thereof held on the arm portion 163b of the lever 163 is unwound at the tape portion 151t thereof, and as is depicted in FIG. 32B, the tape portion 151t is wound up in an opposite direction (clockwise) about the ring portion 151a so that the tape portion 151t is tightened.

Figure 33A:
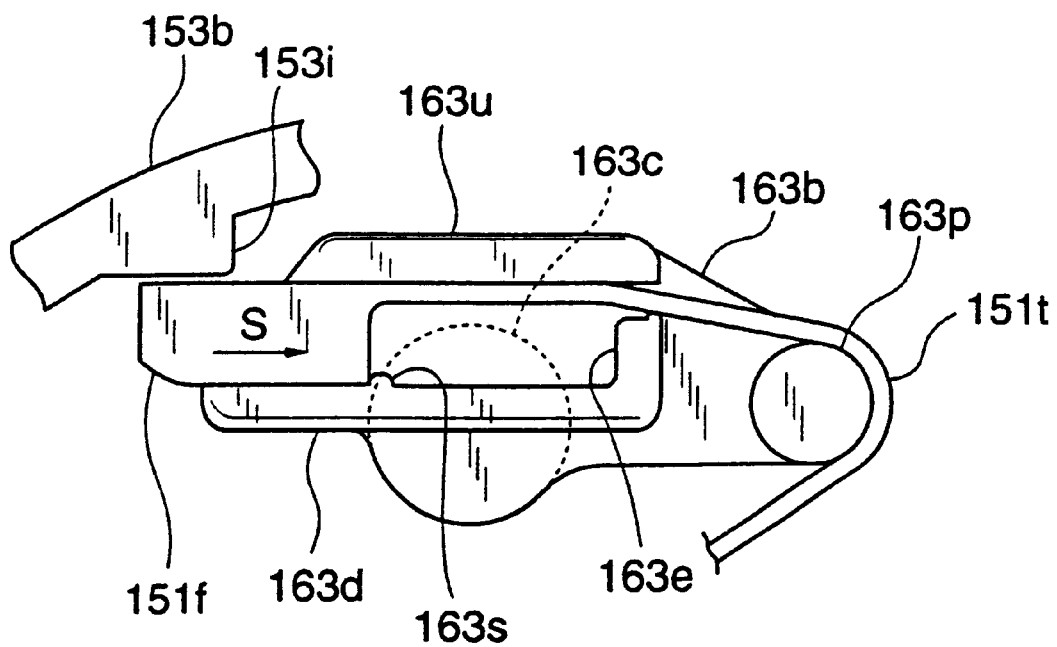
FIG. 33A is a diagram showing a hook portion in its initial state in the seatbelt retractor according to the fourth embodiment of the present invention as illustrated in FIG. 27.
Figure 33B:
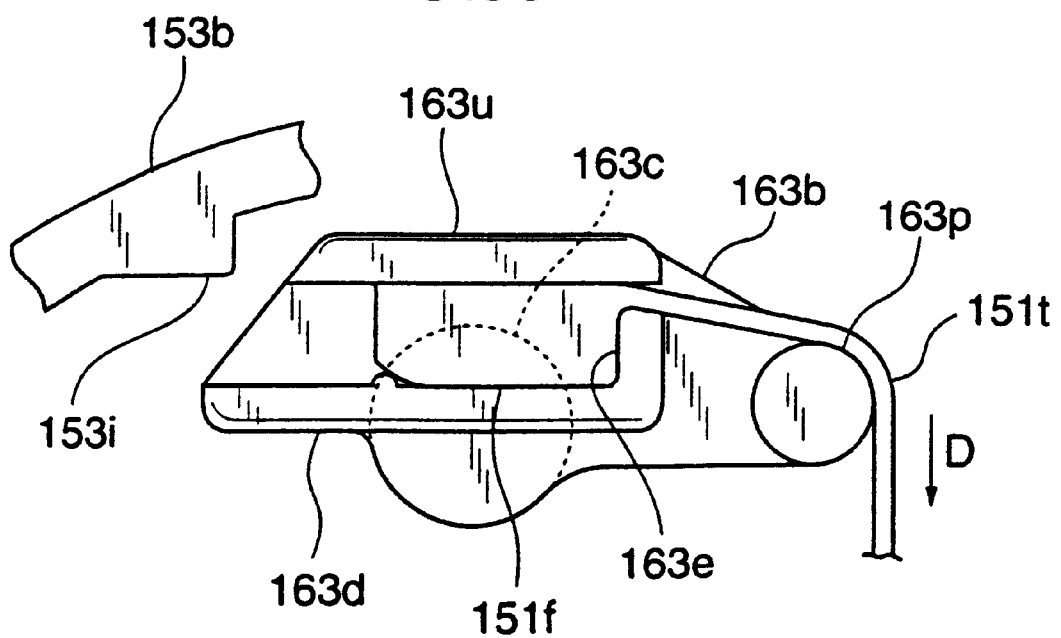
FIG. 33B is an operation diagram of the hook portion operated from the state in FIG. 33A.

When further relative rotation takes place between the bobbin 153 and the locking base 157, the hook portion 151f moves from the position shown in FIG. 33A in the direction of arrow S under a tensile force of the tape portion 151t. As a consequence, the hook portion 151f becomes no longer held by the projection 153i formed on the flange portion 153b of the bobbin 153. When the hook portion 151f moves further in the direction of arrow S, the hook portion 151f is brought into contact with a stop wall 163e of the lower guide portion 163d as illustrated in FIG. 33B. Under a tensile force of the tape portion 151t in the direction of arrow D, the lever 163 turns clockwise as shown in FIG. 34B. By this turning motion of the lever 163, the second pawl 25 fitted in the connecting portion 163a of the lever 163 is caused to pivot into engagement with the internal teeth 13g of the side plate b10a. Any further rotation of the bobbin 153 is therefore inhibited, thereby preventing any further withdrawal of the webbing.

As is illustrated in FIG. 34A and 34C, a phase in which the second pawl 25 pivots out and meshes with the internal teeth 13g formed on the side plate 10a of the retractor base 10 substantially coincides with a phase in which the first pawl 9 meshes with the internal teeth 15g (see FIG. 27) formed on the latch plate 15 arranged in association with the other side plate 10b. Owing to this coincidence in phase, the direction A of a load under which the second pawl 25 is brought into meshing engagement with the internal teeth 13g also substantially coincides with the direction B of a load under which the first pawl 9 is brought into engagement with the internal teeth 15g. As a result, no loads are applied in opposite directions to the side plates 10a,10b of the retractor base 10. Accordingly, no loads are applied to both the side plates of the retractor 10 in such a way that the side plates would be twisted. It is to be noted that designs permitting assurance of such substantial coincidence in phase as mentioned above can be applied to the other embodiments.

When the second pawl 25 does not engage the internal teeth 13g promptly after the hook portion 151f comes into contact with the stop wall 163e, the lever 163 turns and the second pawl pivots out, the lever 163 turns further together with the bobbin 153. As the tape portion 151t itself is caused to extend at this time, the second pawl 25 fitted in the connecting portion 163a of the lever 163 is allowed to remain at its operated position. Even if the phase of the internal teeth 13g in which the second pawl 25 is in engagement is shifted, the operated position of the second pawl 25 can be maintained by the tape member 151 until the second pawl 25 engages the next one of the internal teeth 13g.

Referring next to FIG. 35 through FIG. 39, the seatbelt retractor according to the fifth embodiment of the present invention will be described.

Figure 35:
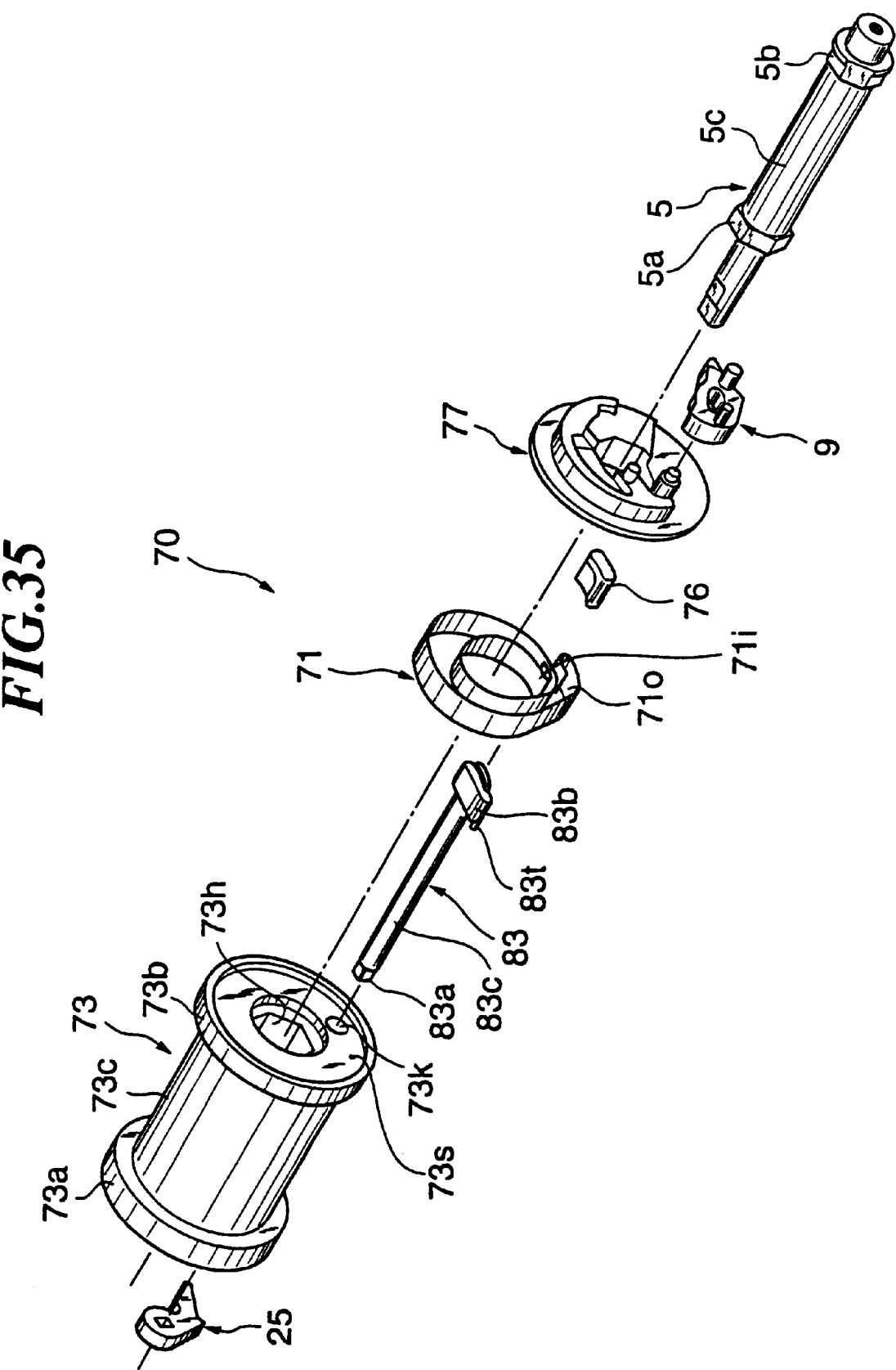
FIG. 35 is an exploded perspective view of a seatbelt retractor according to a fifth embodiment of the present invention.

As is illustrated in FIG. 35, the seatbelt retractor 70 according to the fifth embodiment is also provided, as in the above-described first to fourth embodiments, with a bobbin 73, on which a webbing is wound, and also with the torsion bar 5 as an energy absorbing member. The connected portion 5b of the torsion bar 5 is fitted in a hexagonal through-hole 77d formed in a boss portion 77c (see FIGS. 36 through 38) of a locking base 77 as a locking member. The torsion bar 5 is therefore connected with the locking base 77 such that they can rotate integrally.

The bobbin 73 is provided with a substantially cylindrical barrel portion 73c, on which the webbing is wound, and also with flange portions 73a,73b for preventing the webbing from being retracted out of place. Through the bobbin 73, a torsion bar through-hole 73h through which the torsion bar 5 extends is centrally formed in an axial direction. Arranged between the flange portion 73b and the locking base 77 is a metal-made leaf spring member 71. The leaf spring member 71 is fixed at an inner end 71i thereof on the locking base 77 by a leaf spring anchor member 76. Further, the leaf spring member 71 is held at an outer end 71o thereof on an arm portion 83b of a lever 83 as a transmitting member.

A lever through-hole 73k through which the lever 83 extends is formed through the bobbin 73. The lever 83 is provided with a connecting portion 83a having a square shape in cross-section, the arm portion 83b, and a shaft portion 83c which extends through the lever through-hole 73k. The connecting portion 83a is fitted in the second pawl 25. Further, the arm portion 83b is provided with a pin 83t which fits in a small hole 73s formed in the flange portion 73b of the bobbin 73.

Figure 36:
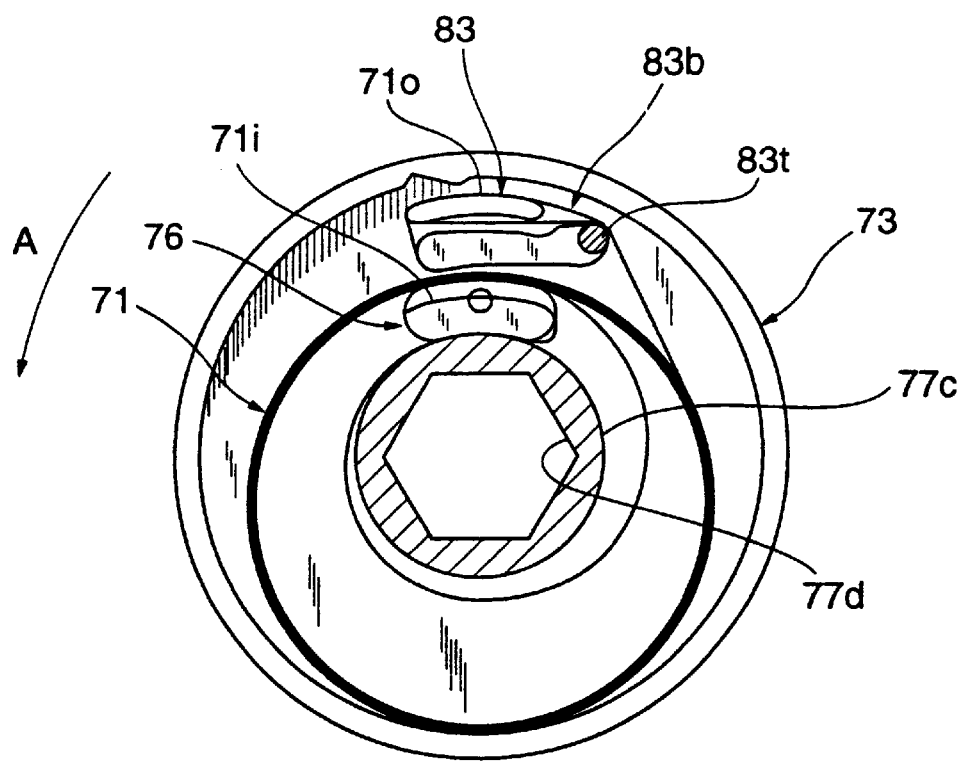
FIG. 36 is a view illustrating a bobbin, a locking base, a leaf spring member and a lever in their initial positions (in a state that the bobbin has not rotated yet relative to the locking base) in the seatbelt retractor according to the fifth embodiment of the present invention.
Figure 38:
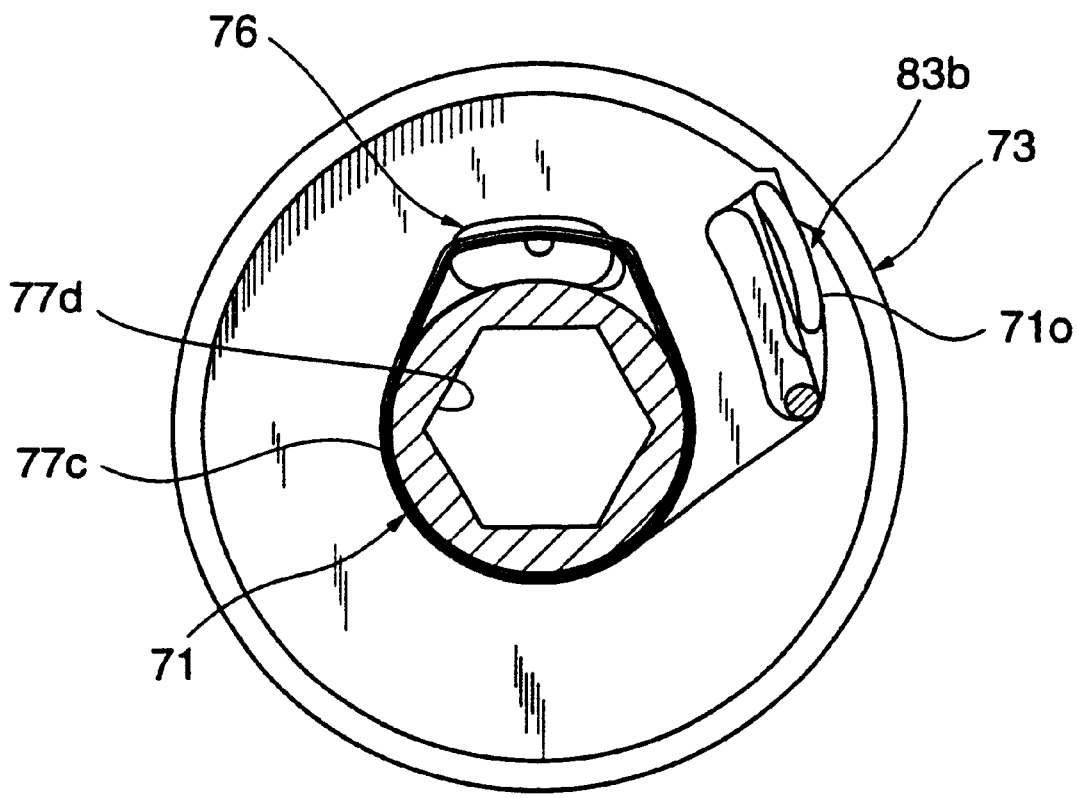
FIG. 38 is an operation diagram showing the bobbin, locking base, leaf spring member and lever operated from their respective positions in FIG. 37.
Figure 39:
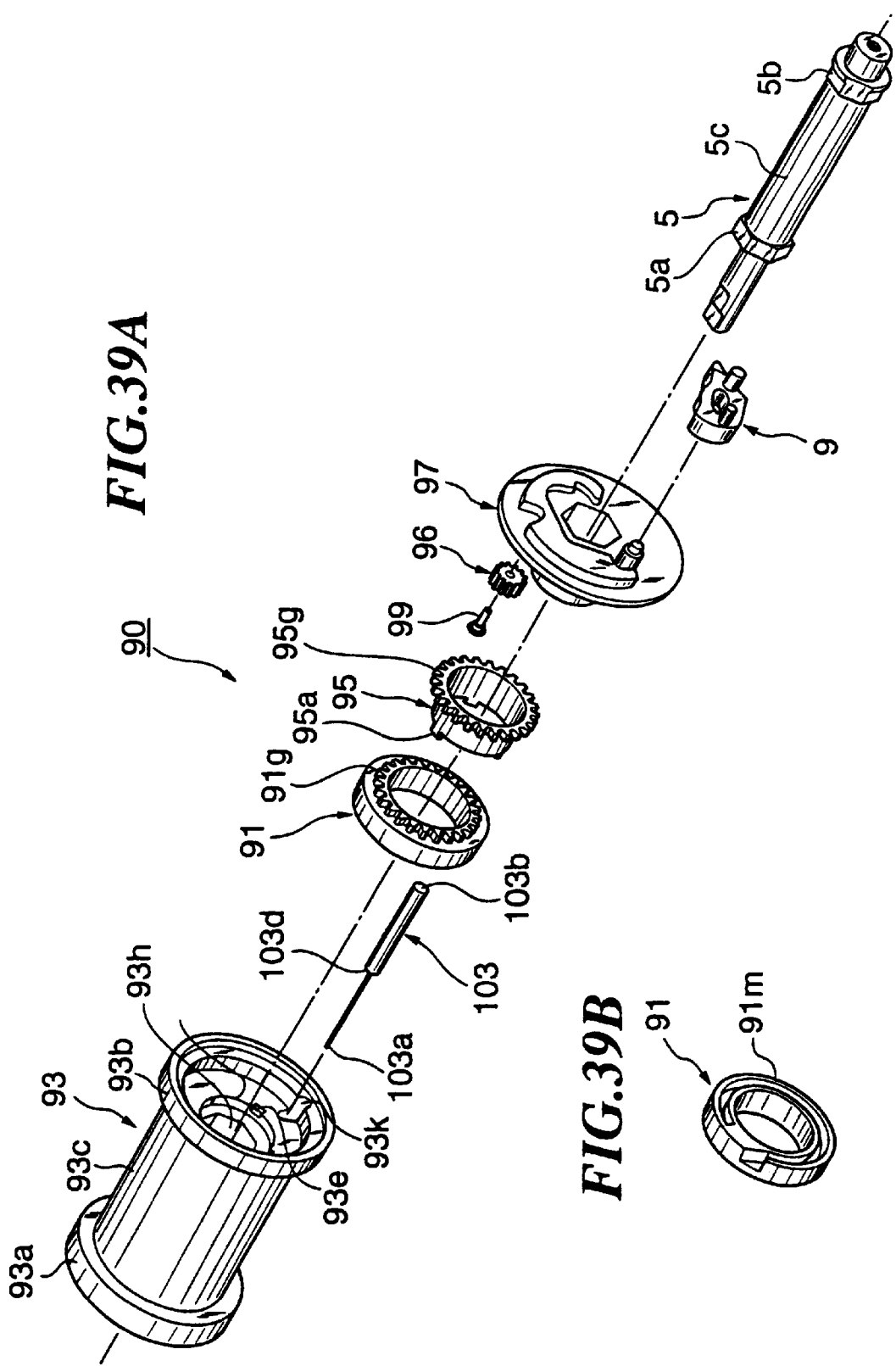
FIG. 39A is an exploded perspective view of a seatbelt retractor according to a sixth embodiment of the present invention.
FIG. 39B is a rear view of a control gear in the seatbelt retractor according to the sixth embodiment of the present invention.

With reference to FIG. 36 and FIG. 38, a description will next be made about operation of the seatbelt retractor 70 according to the fifth embodiment of the present invention.

When the deformable portion 5c of the torsion bar 5 is twisted, relative rotation takes place between the bobbin 73 and the locking base 77. As the lever 83 then rotates integrally with the bobbin 73 in the direction A, the leaf spring member 71 held at the outer end 71o thereof on the arm portion 83b of the lever 83 is tightened.

Figure 37:
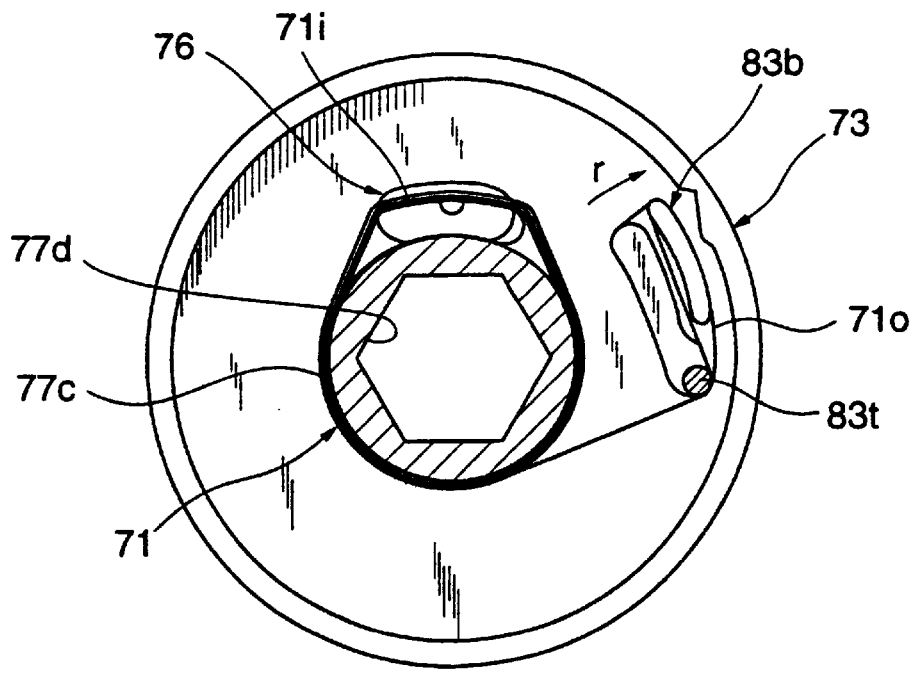
FIG. 37 is an operation diagram showing the bobbin, locking base, leaf spring member and lever operated from their respective positions in FIG. 36.

When further relative rotation takes place between the bobbin 73 and the locking base 77, the pin 83t of the lever 83 is cut off by a tensile force of the leaf spring member 71, and the lever 83 turns clockwise (in the direction r in FIG. 37). As a result of the turning of the lever 83, the second pawl 25 fitted in the connecting portion 83a of the lever 83 is pivoted into engagement with the internal teeth 13g of the side plate 10a, whereby any further withdrawal of the webbing is prevented.

In the seatbelt retractor according to the fifth embodiment, the position where any further rotation of the bobbin 73 is prevented can be easily changed by modifying the number of turns of the leaf spring member 71.

Referring next to FIG. 39A through FIG. 45, the seatbelt retractor according to the six embodiment of the present invention will be described.

Figure 40:
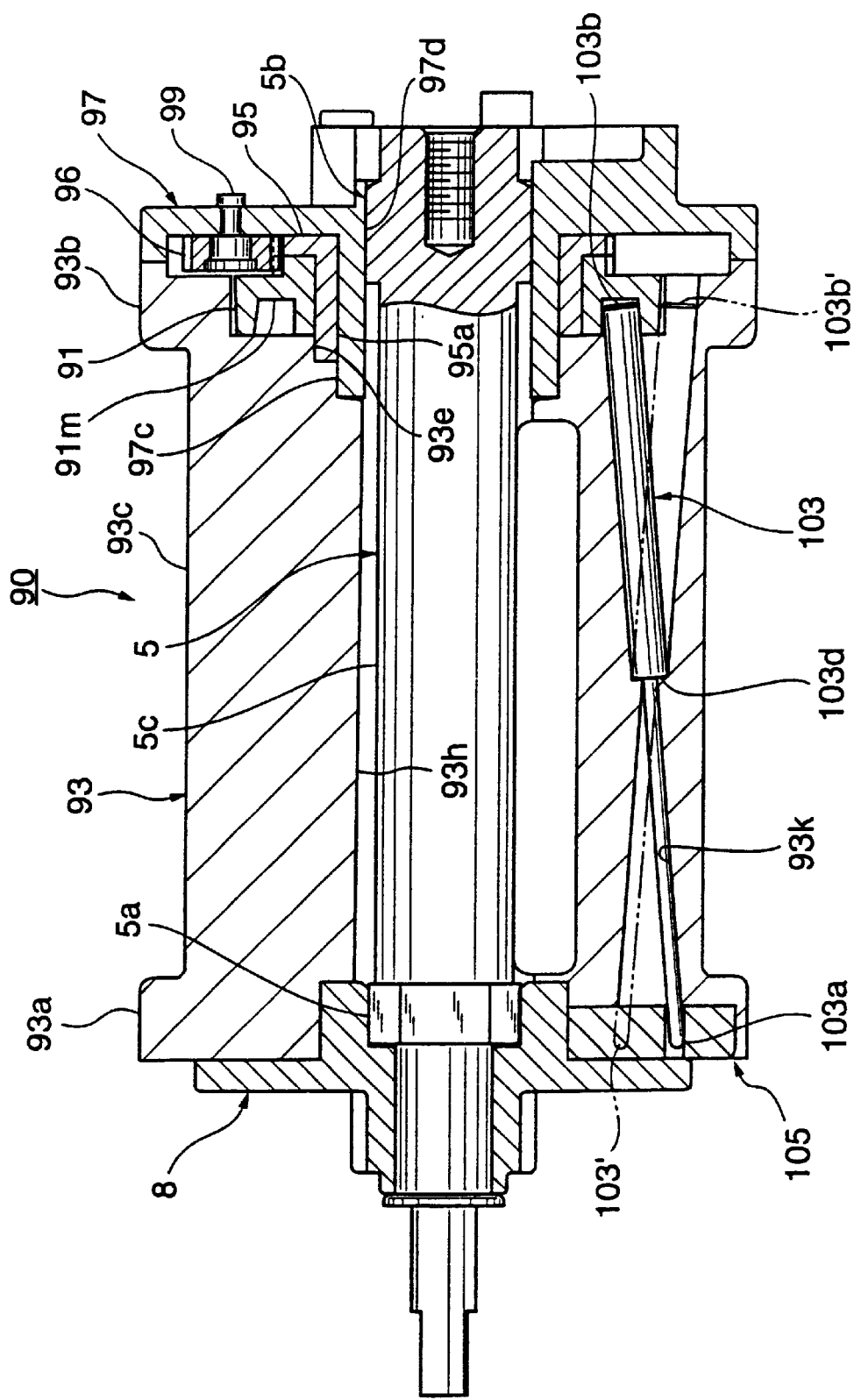
FIG. 40 is a cross-sectional view of the seatbelt retractor according to the sixth embodiment of the present invention.

As is illustrated in FIG. 39A and FIG. 40, the seatbelt retractor 90 according to the sixth embodiment is provided, as in the above-described first to fifth embodiments, with a bobbin 93, on which a webbing is wound, a torsion bar 5 as an energy absorbing member and a locking base 97 as a locking member. The locking base 97 is fitted on the connected portion 5b of the torsion bar 5.

The bobbin 93 is provided with a barrel portion 93c, on which the webbing is wound, and also with flange portions 93a,93b for preventing the webbing from being retracted out of place. Through the bobbin 93, a torsion bar through-hole 93h through which the torsion bar 5 extends is centrally formed in an axial direction. Arranged between the flange portion 93b and the locking base 97 are a main gear 95 with a leg portion 95a thereof held in a small hole 93e formed in the flange portion 93b, a control gear 91 arranged between the main gear 95 and the flange portion 93b of the bobbin 93, and a planetary gear 96 rotatably supported on the locking base 97 by a pin 99. The planetary gear 96 is arranged in meshing engagement with external teeth 95g of the main gear 95 and also with external teeth 91g of the control gear 91.

A lever through-hole 93k through which the lever 103 extends is formed through the bobbin 93. As is shown in FIG. 40, the through-hole 93k is formed as a hole tapered such that the lever 103 is allowed to tilt there. Further, the lever 103 is provided with a stepped portion 103d, and is supported at an end portion 103b thereof in a groove 91m of the control gear 91 and is in engagement at an opposite end 103a thereof with a second pawl 105 as a locking member.

Figure 41:
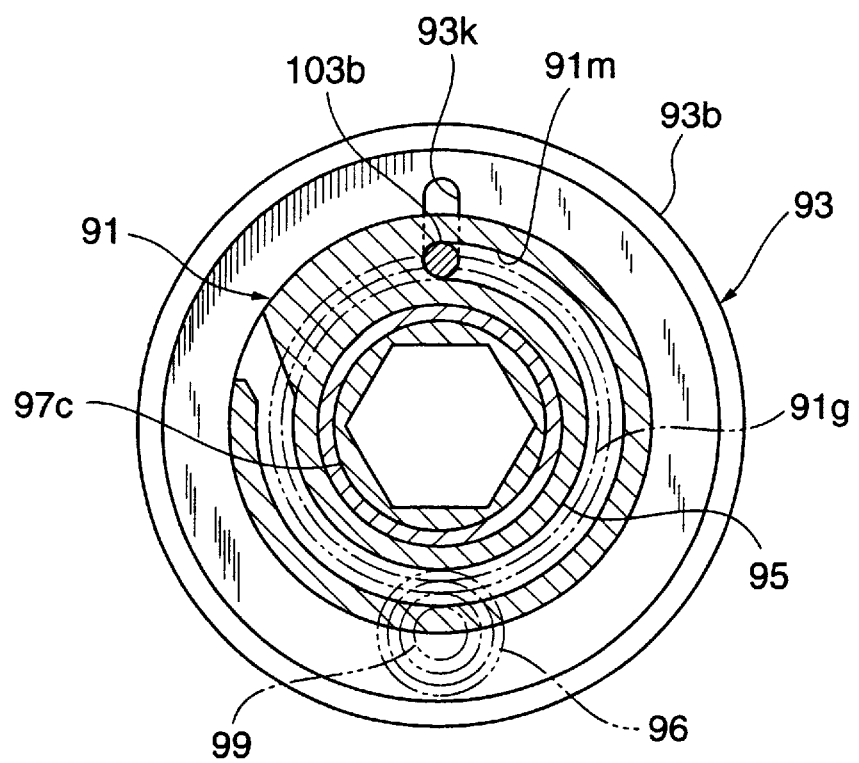
FIG. 41 is a diagram showing a bobbin, the control gear, a lever and a planetary gear in their initial positions (in a state that the bobbin has not rotated yet relative to a locking base) in the seatbelt retractor according to the sixth embodiment of the present invention.
Figure 45:
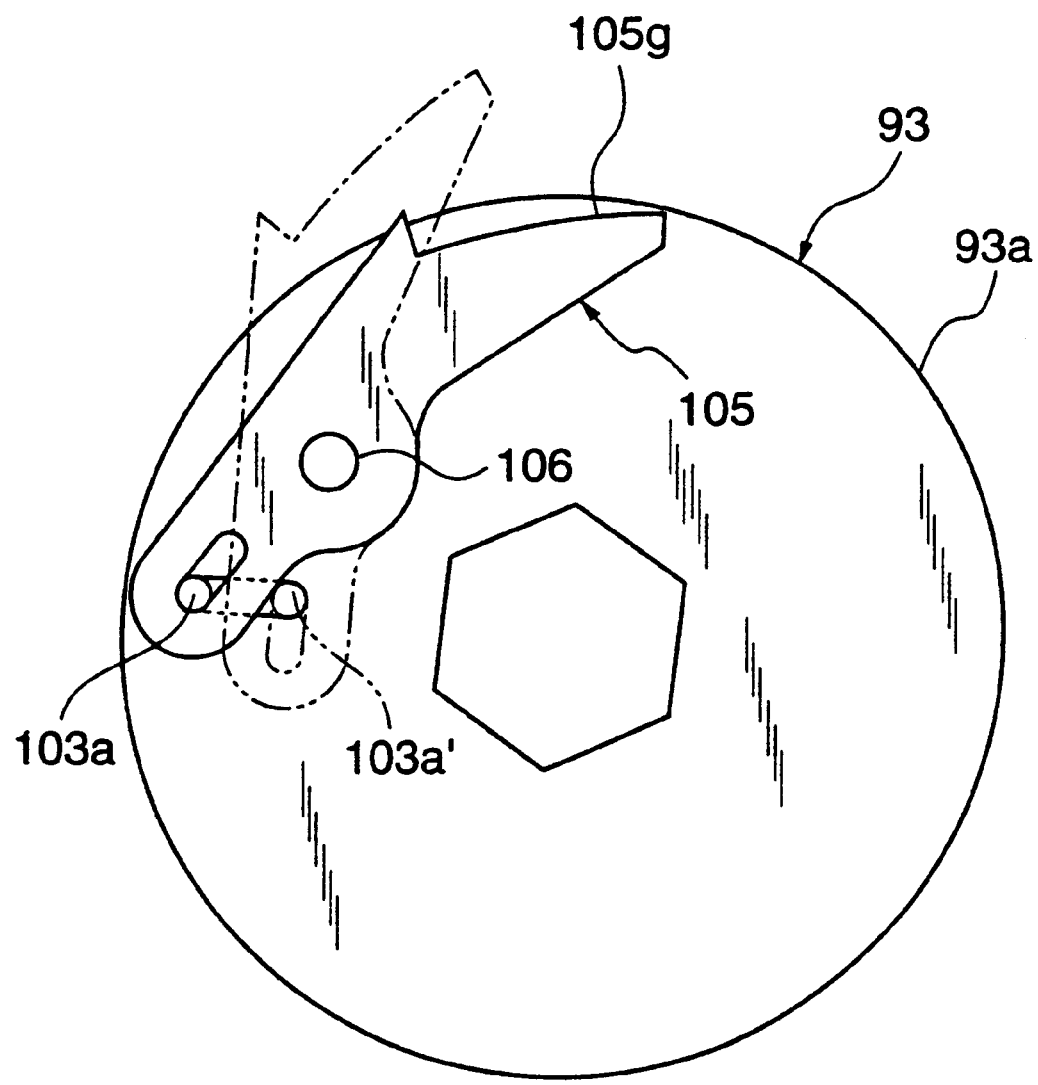
FIG. 45 is a simplified schematic diagram showing a second pawl in an actuated position in the seatbelt retractor according to the sixth embodiment of the present invention.

With reference to FIG. 41 and FIG. 45, a description will next be made about operation of the seatbelt retractor 90 according to the sixth embodiment of the present invention.

Figure 42:
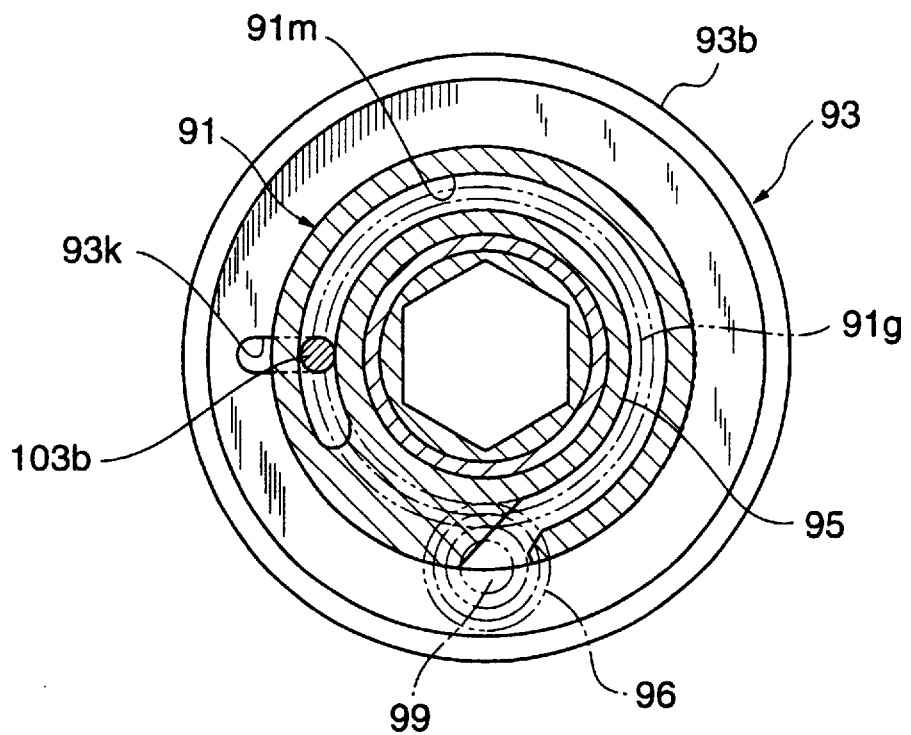
FIG. 42 is an operation diagram showing the bobbin, control gear, lever and planetary gear operated from their respective positions in FIG. 41.
Figure 43:
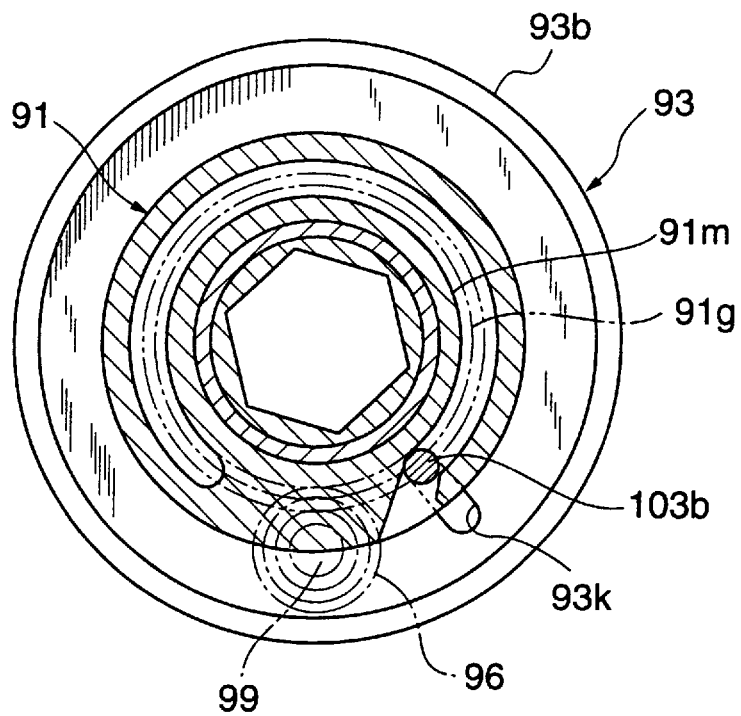
FIG. 43 is an operation diagram showing the bobbin, control gear, lever and planetary gear operated from their respective positions in FIG. 42.

When the deformable portion 5c of the torsion bar 5 is twisted, relative rotation takes place between the bobbin 93 and the locking base 97. The main gear 95 fixed on the bobbin 93 then rotates together with the bobbin 93, resulting in rotation of the planetary gear 96 meshed with the external teeth 95g of the main gear 95. The external teeth 95g of the main gear 95 and the external gear 91g of the control gear 91 are set at different numbers. As relative rotation progressively takes place between the bobbin 93 and the locking base 97, a difference therefore arises in phase angle between the main gear 95, which rotates integrally with the bobbin 93, and the control gear 91 as shown in FIG. 42 and FIG. 43.

Figure 44:
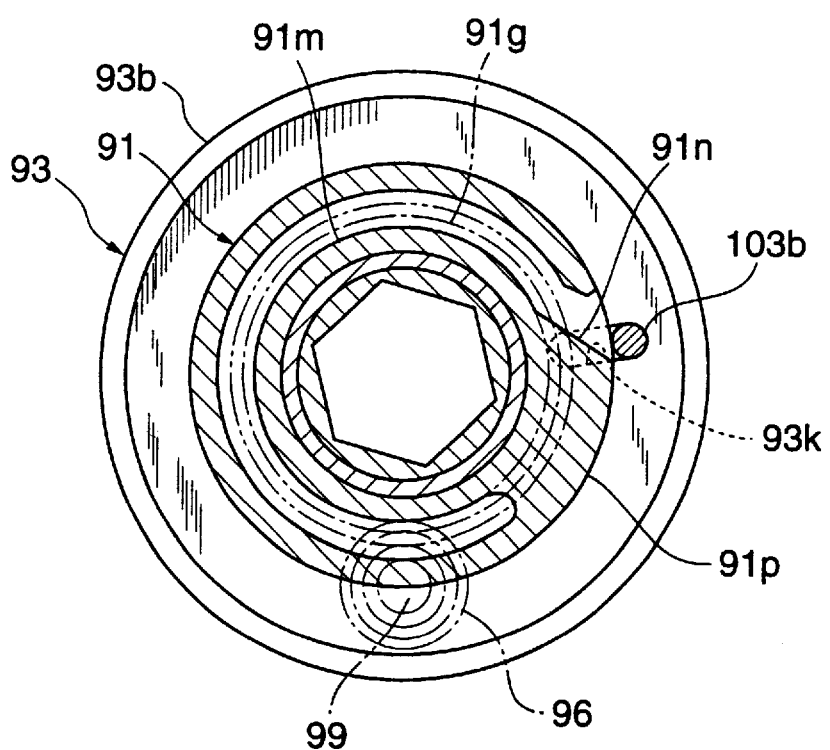
FIG. 44 is an operation diagram showing the bobbin, control gear, lever and planetary gear operated from their respective positions in FIG. 43.

As is illustrated in FIG. 44, further relative rotation causes the end portion 103b of the lever 103 to move from the groove 91m of the control gear to an outer peripheral wall 91p via a connecting part 91n, whereby the lever 103 is guided toward an outer circumference of the flange portion 93b and is caused to fall over the stepped portion 103d as a fulcrum toward the side of an outer circumference of the through-hole 93k. As is shown in FIG. 45, the second pawl 105, which is supported as a stopping member on the other end 103a of the lever 103, then turns about a pin 106 fixed on the flange portion 93a of the bobbin 93 and moves to the position indicated by a phantom. The edge 105g of the second pawl 105 is brought into engagement with the internal teeth 13g of the side plate 10a so that any further withdrawal of the webbing is prevented.

In the seatbelt retractor 90 according to the sixth embodiment, the position where any further rotation of the bobbin 93 is prevented can be easily changed by modifying the shape of the groove 91m of the control gear 91, the number of the external teeth 91g, and/or the like.

With reference to FIG. 46 through FIG. 52, the seatbelt retractor according to the seventh embodiment of the present invention will next be described.

Figure 46:
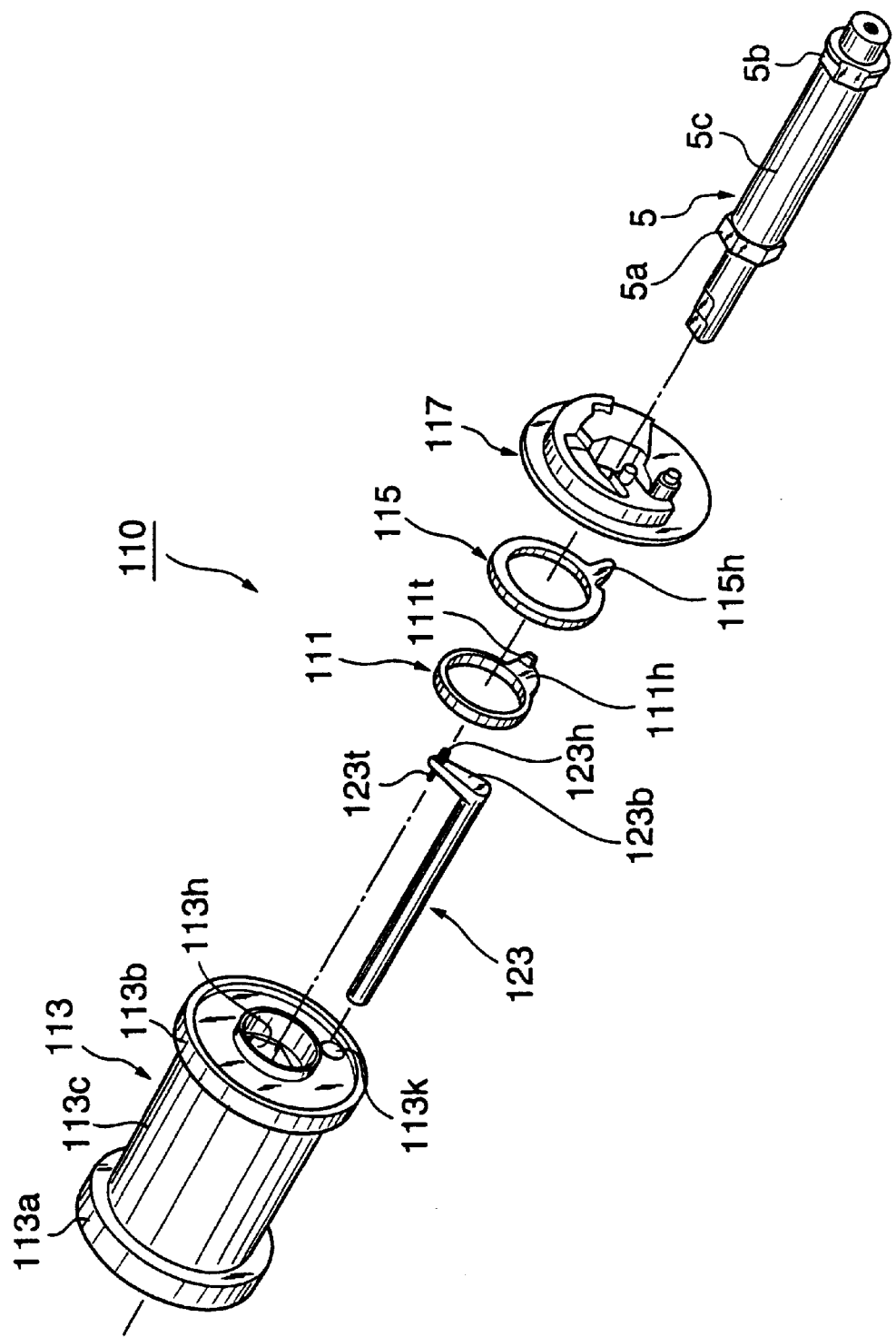
FIG. 46 is an exploded perspective view of a seatbelt retractor according to a seventh embodiment of the present invention.

As is illustrated in FIG. 46, the seatbelt retractor 110 according to the seventh embodiment is provided, as in the above-described first to sixth embodiments, with a bobbin 113, on which a webbing is wound, a torsion bar 5 as an energy absorbing member and a locking base 117 as a locking member. The locking base 117 is fitted on the connected portion 5b of the torsion bar 5.

The bobbin 113 is provided with a barrel portion 113c, on which the webbing is wound, and also with flange portions 113a,113b for preventing the webbing from being retracted out of place. Through the bobbin 113, a torsion bar through-hole 113h through which the torsion bar 5 extends is centrally formed in an axial direction. Arranged between the flange portion 113b and the locking base 117 are a substantially ring-shaped first control ring 111 and a substantially ring-shaped second control ring 115. The first control ring 111 is provided with an outwardly-extending head portion 111h, while the second control ring 115 is likewise equipped with an outwardly-extending head portion 115h.

A lever through-hole 113k through which the lever 123 extends is formed through the bobbin 113. The lever 123 is provided with an arm portion 123b, and a pin 123g formed on the arm portion 123b is fitted in a hole (not shown) formed in the flange portion 113b of the bobbin 113. Further, the arm portion 123b is provided with a pin 123h which can be brought into contact with the head portion 111h of the first control ring 111.

Figure 47:
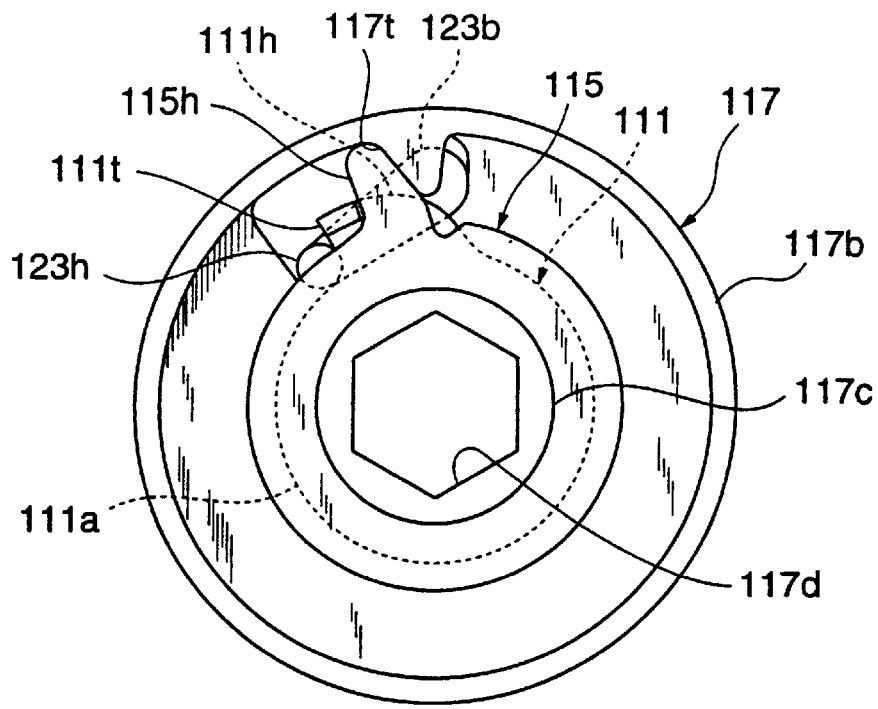
FIG. 47 is a diagram showing a first control ring, a second control ring, a locking base and a lever in their initial positions (in a state that a bobbin has not rotated yet relative to the locking base) in the seatbelt retractor according to the seventh embodiment of the present invention as illustrated in FIG. 46.
Figure 52:
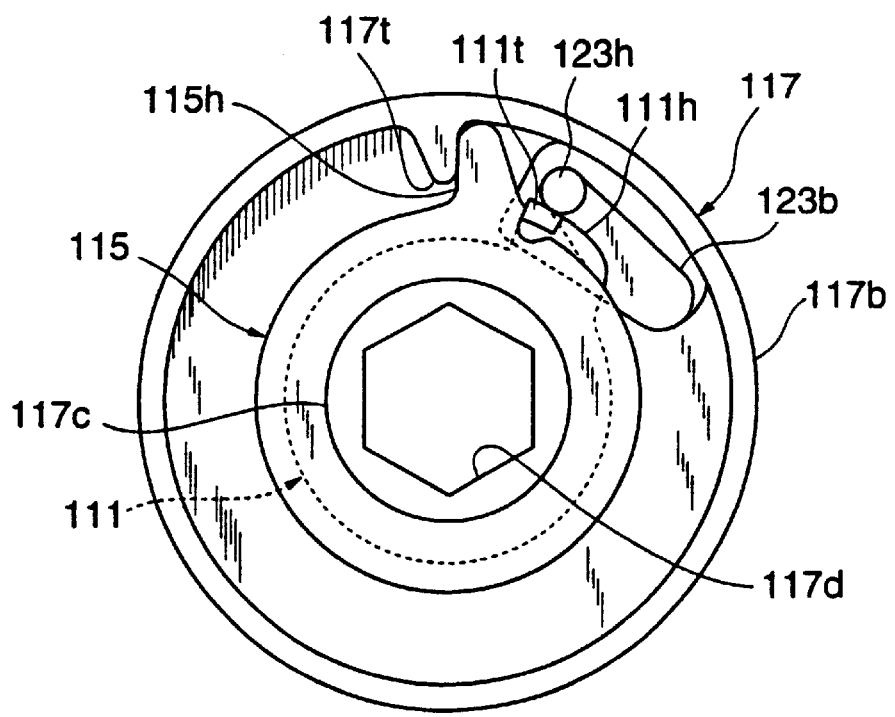
FIG. 52 is an operation diagram showing the first control ring, second control ring, locking base and lever operated from their respective positions in FIG. 51.

With reference to FIG. 47 and FIG. 52, a description will next be made about operation of the seatbelt retractor 110 according to the seventh embodiment of the present invention.

Figure 48:
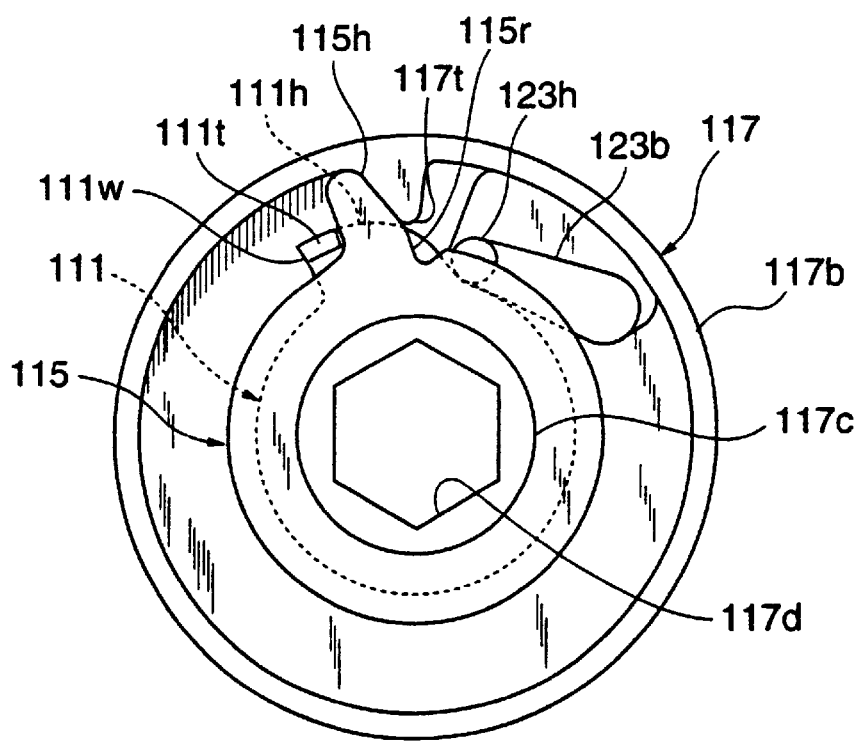
FIG. 48 is an operation diagram showing the first control ring, second control ring, locking base and lever operated from their respective positions in FIG. 47.
Figure 49:
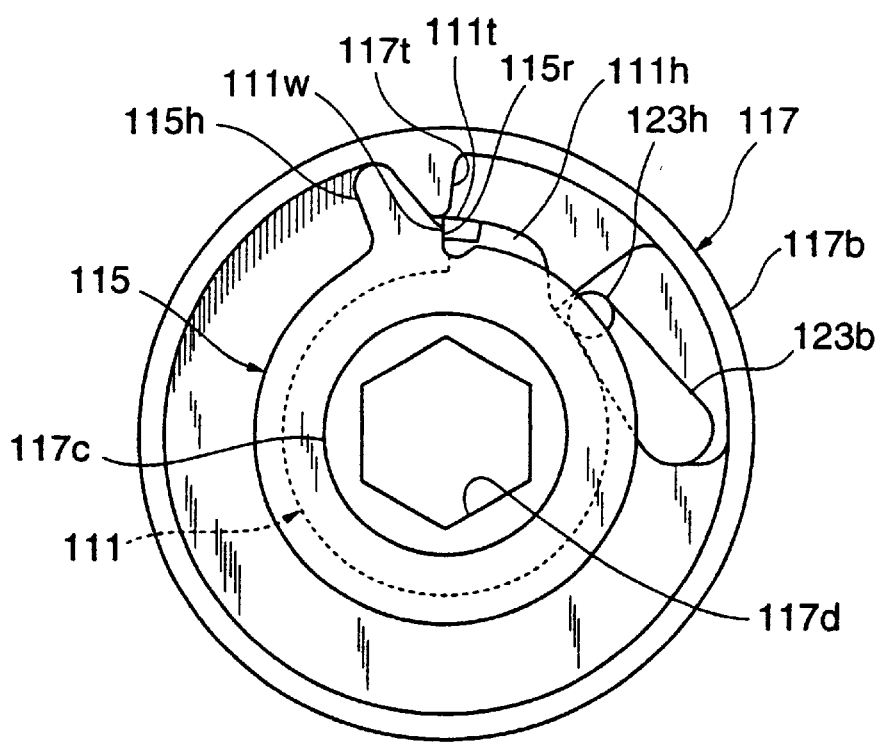
FIG. 49 is an operation diagram showing the first control ring, second control ring, locking base and lever operated from their respective positions in FIG. 48.

When the deformable portion 5c of the torsion bar 5 is twisted, relative rotation takes place between the bobbin 113 and the locking base 117. The pin 123h of the lever 123 supported on the bobbin 113 is then guided by a guide face 111a, so that the lever 123 turns counterclockwise together with the bobbin 113. When the bobbin 113 makes approximately a single turn from its position shown in FIG. 47, the pin 123h formed on the arm portion 123b of the lever 123 is brought into abutment against the head portion 111h of the first control ring 111 as illustrated in FIG. 48. The pin 123h then continues to push the head portion 111h.

When the bobbin 113 substantially makes another single turn while pushing the head portion 111h, a face 111w of a projecting portion 111t formed on the head portion 111h of the first control ring 111, said projecting portion lilt being directed in the webbing-withdrawing direction, is brought into abutment against a face 115r of the head portion 115h of the second control ring 115, said face 115r being directed in the webbing-retracting direction, and then continues to push the head portion 111h.

Figure 50:
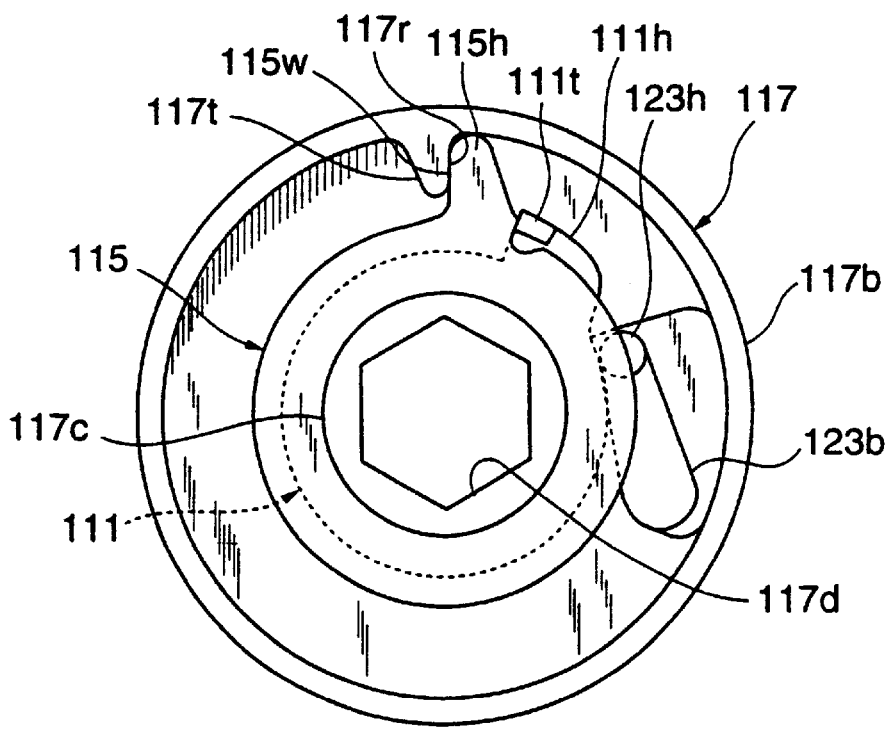
FIG. 50 is an operation diagram showing the first control ring, second control ring, locking base and lever operated from their respective positions in FIG. 49.

When the bobbin 113 then makes a still further single rotation counterclockwise together with the first control ring 111 and the second control ring 115, a face 115w of the head portion 115h of the second control ring 115, said face 115w being directed in the webbing-withdrawing direction, is brought into abutment against a face 117r of a projecting portion 117t formed extending inwardly from the flange portion 117b of the locking base 117, said face 117r being directed in the webbing-retracting direction, as is shown in FIG. 50.

Figure 51:
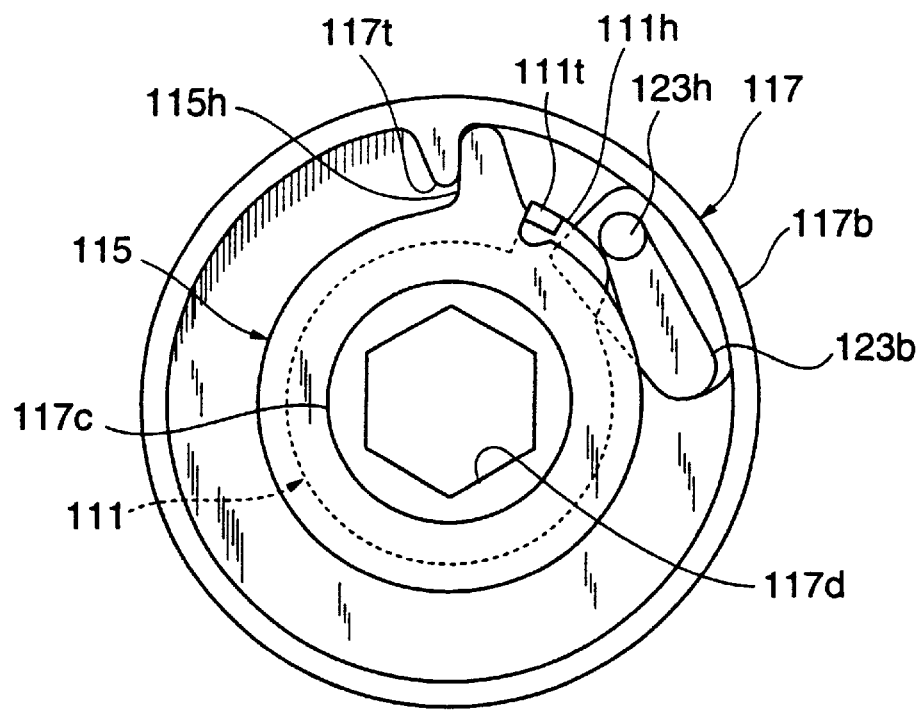
FIG. 51 is an operation diagram showing the first control ring, second control ring, locking base and lever operated from their respective positions in FIG. 50.

When the bobbin 113 further rotates counterclockwise, the pin 123h of the lever 123 rides on the head portion 111h of the first control ring 11 as is illustrated in FIG. 51. By a load which occurs upon riding on the head portion 111h, the pin 123t (see FIG. 46) fitted in the hole of the bobbin 113 is cut off. As is shown in FIG. 52, the arm portion 123b then turns clockwise, and owing to the resulting motion of the lever 123, the edge of the second pawl which is connected as a stopping member with the opposite end portion of the lever 123 is brought into engagement with the internal teeth 13g of the side plate 10a, whereby any further withdrawal of the webbing is prevented.

In the seatbelt retractor 110 according to the seventh embodiment, the position where any further rotation of the bobbin 113 is prevented can be easily changed by adjusting the number of control rings, the sizes of the projecting portions, and/or the like.

With reference to FIG. 53 through FIG. 56, the seatbelt retractor according to the eighth embodiment of the present invention will next be described. This eighth embodiment has a construction similar to that of the above-described second embodiment.

Figure 53:
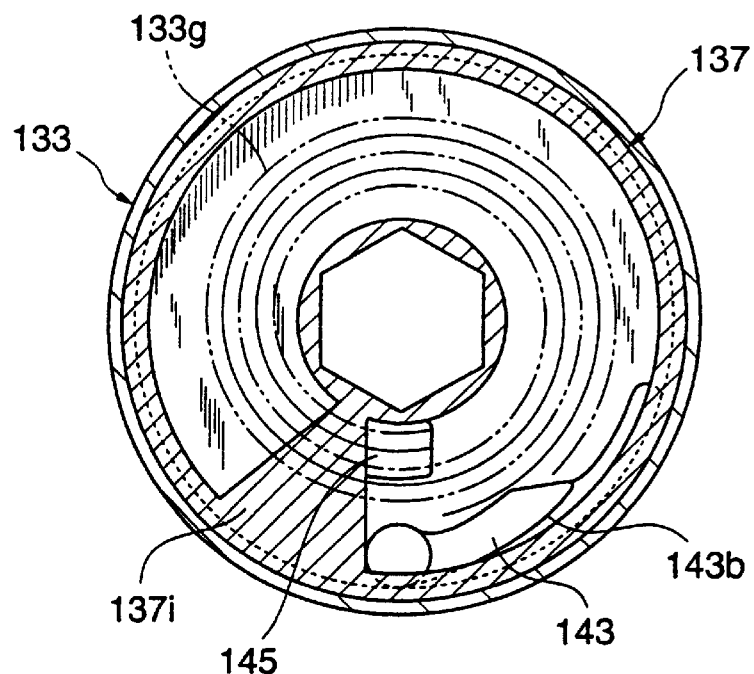
FIG. 53 is a diagram showing a bobbin, a locking base, a lever and a slider in their initial positions (in a state that the bobbin has not rotated yet relative to the locking base) in a seatbelt retractor according to an eighth embodiment of the present invention.

As is illustrated in FIG. 53, the bobbin 133 is provided on a side wall thereof with a V-shaped volute groove 133g as a guide path as indicated by a phantom. The V-shaped volute groove 133g is formed by a ridge portion and a valley portion. A slider 145, as a controller, is provided with ridge portions which are movable along the V-shaped groove 133g. The slider 145 is arranged such that it lies astride two turns of the V-shaped groove 133g and is supported on the bobbin 133.

Similarly to the above-described embodiments, the bobbin 133 is provided with a lever 143 as a transmitting member such that the lever 143 extends through the bobbin 133. The lever 143 is provided with a convex portion (not shown), which is fitted in a hole (not shown) of the bobbin 133. In this fitted state, the lever 143 is therefore prevented from turning. The lever 143 is also provided with an arm portion 143b. As in the above-described embodiments, the lever 143 is also provided at an end portion thereof with a connecting portion in which the second pawl 25 is fitted. On the other hand, a locking base 137 is provided with a substantially sectorial, position-limiting portion 137i which serves to prevent rotation of the slider 145.

With reference to FIG. 53 through FIG. 56, a description will next be made about operation of the seatbelt retractor according to the eighth embodiment of the present invention.

Figure 54:
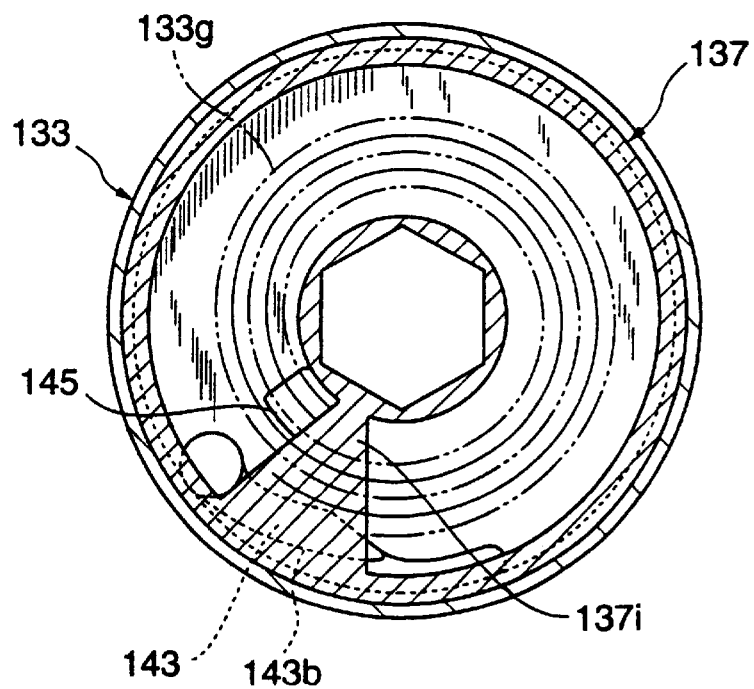
FIG. 54 is an operation diagram showing the bobbin, locking base, lever and slider operated from their respective positions in FIG. 53.
Figure 55:
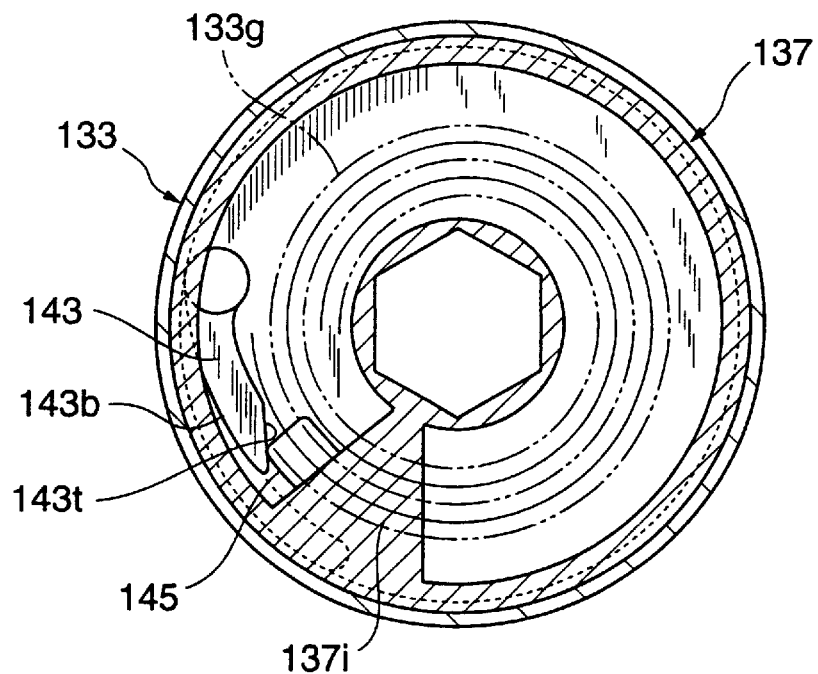
FIG. 55 is an operation diagram showing the bobbin, locking base, lever and slider operated from their respective positions in FIG. 54.

When the bobbin 133 rotates counterclockwise relative to the locking base 137, the lever 143 turns together with the bobbin 33. When the bobbin 133 has made approximately a single turn, the slider 145 comes into contact with the position-limiting portion 137i of the locking base 137 as is illustrated in FIG. 54. As the relative rotation proceeds further, the slider 145 is successively guided toward an outer turn of the V-shaped groove 133g. When the lever 143 and the bobbin 133 rotate together with the slider 145 lying in the outermost turn of the V-shaped groove 133g, a tilted portion 143t formed on a free end of the arm portion 143b of the lever 143 comes into abutment against the slider 145.

Figure 56:
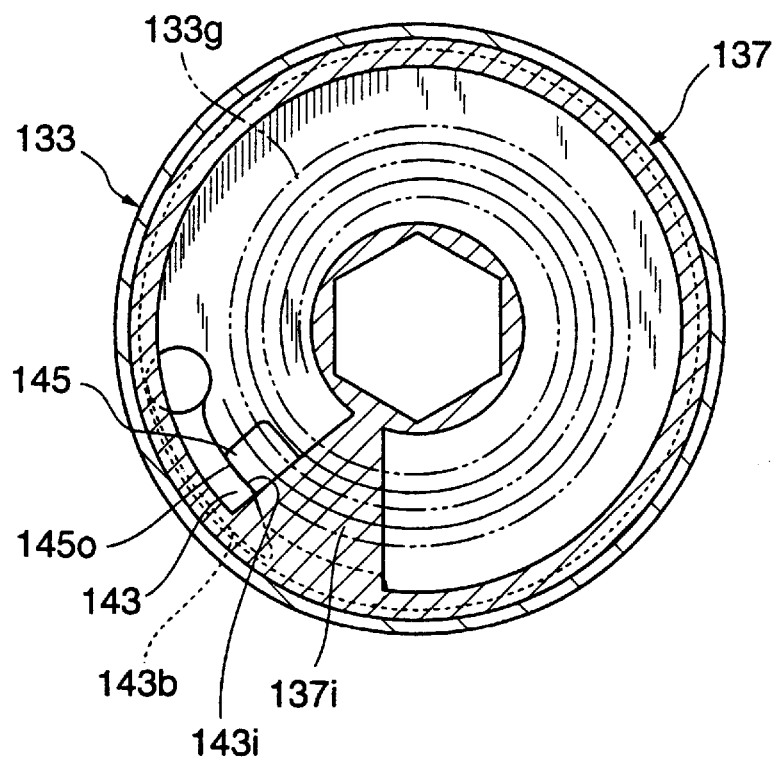
FIG. 56 is an operation diagram showing the bobbin, locking base, lever and slider operated from their respective positions in FIG. 55.

The lever 143 is hence pushed by the slider 145, so that a pin of the lever 143 is cut off. As is shown in FIG. 56, the lever 143 turns clockwise. The second pawl 25 fitted in the connecting portion formed on an end of the lever 143 is hence caused to pivot so that, as is shown in FIG. 11, the edge 25a of the second pawl 25 supported at an end thereof on the sleeve 8 is brought into engagement with the internal teeth 13g formed on the side plate 10a of the retractor base 10. Rotation of the bobbin 133 is therefore prevented.

Even when the second pawl 25 does not engage the internal teeth 13g promptly after the pin is cut off, the second pawl 25 fitted in the connecting portion of the lever 143 is still allowed to remain at its operated position by making a path of a circumferential wall 145o formed on an outer wall of the slider 145 and that of an inner peripheral wall 143i of the arm portion 143b coincide with each other.

In the seatbelt retractor according to the eighth embodiment, the position where any further rotation of the bobbin 133 is prevented can be easily changed by modifying the shape of the V-shaped groove 133g and/or the like.

In each of the above-described first to eighth embodiment, the rod-shaped lever was described as the transmitting member. The transmitting member is not limited to such a rod-shaped transmitting member, and a cord-shaped transmitting member or the like may be used as an alternative.

Referring next to FIG. 57 through FIG. 61, the seatbelt retractor according to the ninth embodiment of the present invention will be described.

Figure 57:
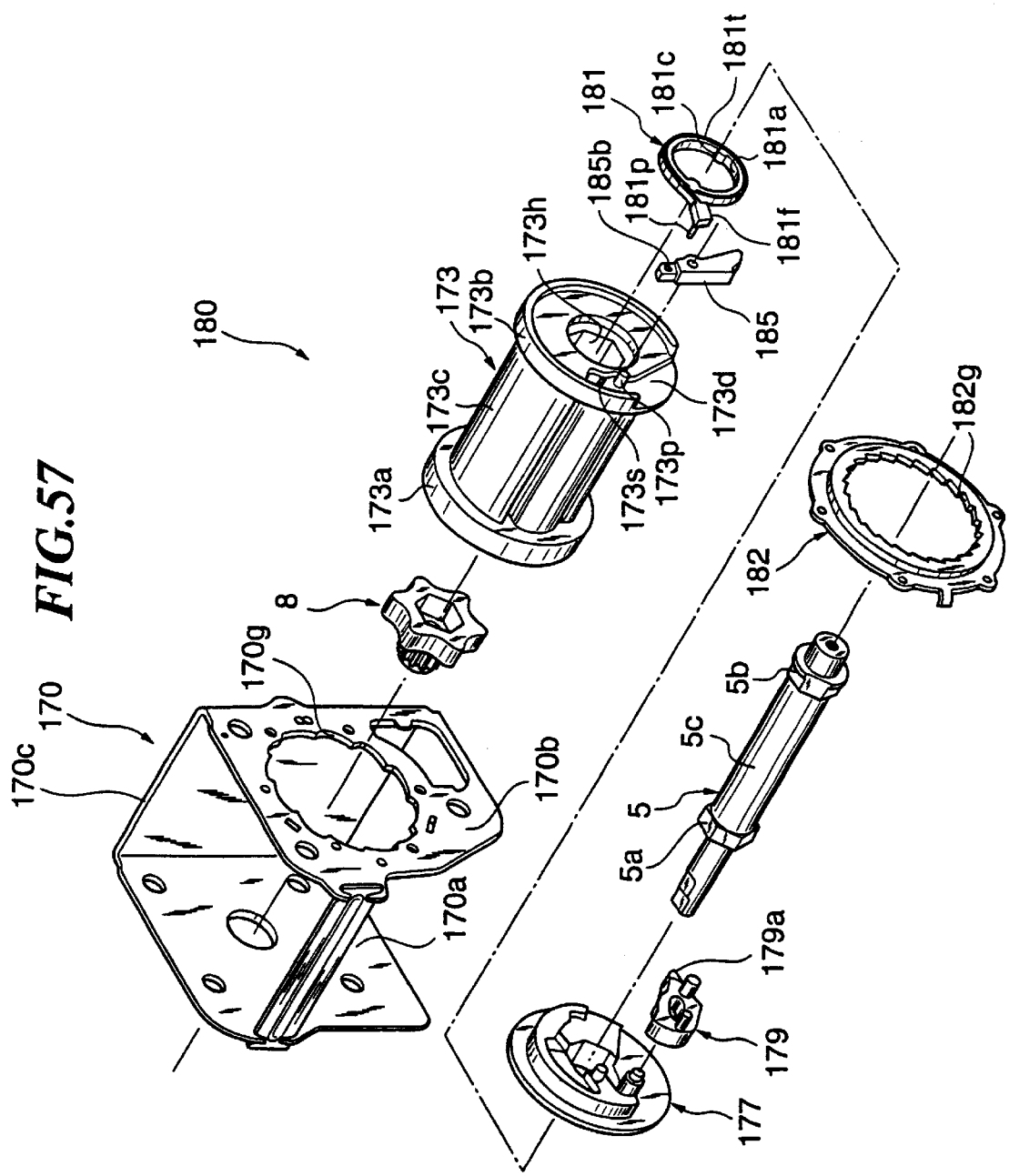
FIG. 57 is an exploded perspective view of a seatbelt retractor according to a ninth embodiment of the present invention.
Figure 58:
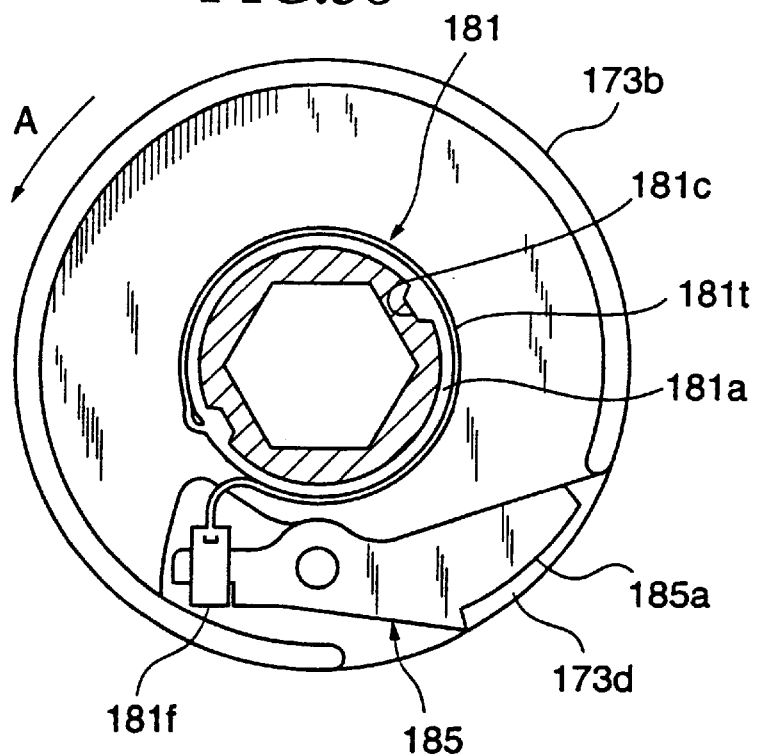
FIG. 58 is a side view showing a locking base, a tape member and a second pawl in their initial positions (in a state that a bobbin has not rotated yet relative to the locking base) in the seatbelt retractor according to the ninth embodiment of the present invention.

As is illustrated in FIG. 57, the seatbelt retractor 180 is provided, as in the above-described first to eighth embodiments, with a substantially cylindrical bobbin 3, on which a webbing is wound, and a torsion bar 5 as a substantially cylindrical energy absorbing member. The torsion bar 5 extends through a bobbin 173 and is rotatably supported on the retractor base 170. On a side of an end of the torsion bar 5 (on a left side as viewed in FIG. 57), a connected portion 5a is integrally connected with the bobbin 173. On a side of an opposite end of the torsion bar 5 (on a right side as viewed in FIG. 57), on the other hand, a connected portion 5b is integrally connected with a disk-shaped locking base 177 as a locking member.

The retractor base 170 has been obtained by pressing a metal plate such that from opposite sides of a rear plate 170c to be fixed on a vehicle body, left and right side plates 170a, 170b extend upright to have a substantially turned square U-shape in cross-section. The torsion bar 5 with the bobbin 173 assembled thereon is rotatably supported extending between the left and right side plates 170a, 170b at mutually opposing positions thereof. The torsion bar 5 inserted through the side plate 170a of the retractor base 170 is provided on the side of the one end thereof (on a left end in FIG. 57) with a known retracting spring device (not shown) which normally biases the bobbin 173 in a webbing-retracting direction via the torsion bar 5. On the side plate 170b of the retractor 170, internal teeth 175g are formed, and a latch plate 182 with internal teeth 182g formed thereon is arranged on a side surface of the side plate 170b.

The bobbin 173 is provided with a substantially cylindrical barrel portion 173c, on which the webbing is wound, and also with flange portions 173a, 173b for preventing the webbing from being retracted out of place. Through the bobbin 173, a torsion bar through-hole 173h through which the torsion bar 5 extends is centrally formed in an axial direction. Arranged between the flange portion 173b and the locking base 177 is a tape member 181.

The tape member 181 is provided with a ring portion 181a made of a resin, a tape portion 181t formed integrally on an outer circumference of the ring portion 181a, and a hook portion 181f formed integrally on a free end of the tape portion. A projection 181c is formed on an inner circumference of the ring portion 181a. This projection 181c is fitted in a concave portion formed in the outer circumference of the boss portion of the locking base 177, whereby the tape member 181 is fixed in place.

The hook portion 181f formed on the end portion of the tape portion 181t is held in a notched portion 185b of a second pawl 185 as a stopping member. The second pawl 185 will be described subsequently herein. A pin 181p is formed on the hook portion 181f, and this pin 181p is inserted in a small hole 173s formed in a recess 173d of the flange portion 173b.

As is shown in FIG. 57, the second pawl 185 is accommodated within the recess 173d formed in the flange 173b of the bobbin 173. The second pawl 185 is pivotally supported on a pin 173p formed in the recess 173d.

Referring next to FIG. 57 through FIG. 61, operation of the seatbelt retractor 180 according to the ninth embodiment of the present invention will be described.

Figure 59:
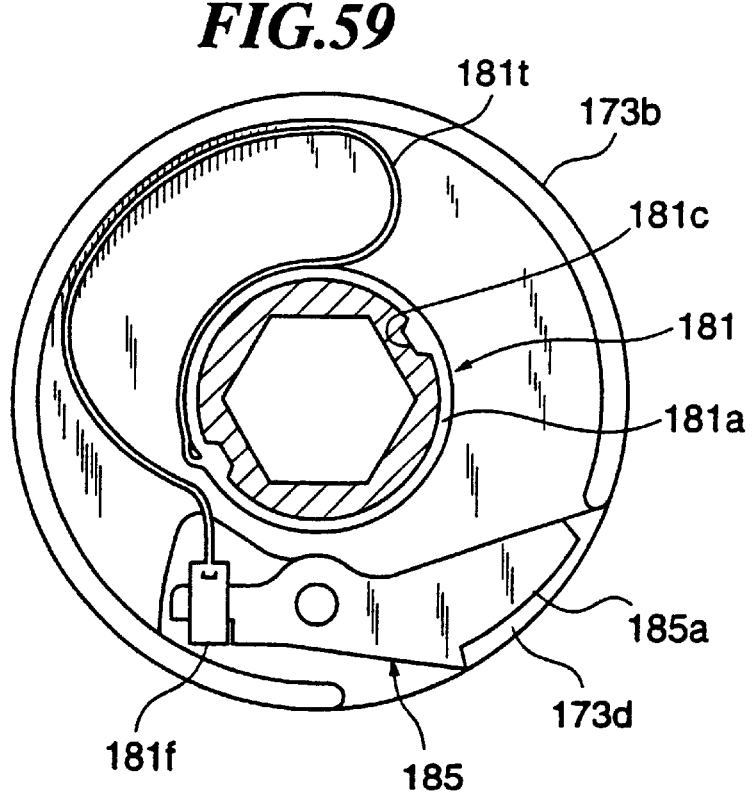
FIG. 59 is an operation diagram showing the bobbin, tape member and second pawl operated from their respective positions in FIG. 58.

In the event of a vehicular emergency, a detection member (not shown) guides a first pawl 179 outwardly in the radial direction of the locking base 177 so that an edge 179a of the first pawl 179 is brought into meshing engagement with the internal teeth 182g of the latch plate 182 fixed on the side plate 170b. As a consequence, any further rotation of the locking base 177 in the webbing-withdrawing direction is prevented. When a load of a predetermined value or greater is then applied in the webbing-withdrawing direction and the deformable portion 5c of the torsion bar 5 is twisted, relative rotation takes place between the bobbin 173 and the locking base 177. As the second pawl 185 turns integrally with the bobbin 173 in a direction A (see FIG. 58), the tape member 181 with the hook portion 181f thereof held in the notch portion 185b (see FIG. 57) is unwound at the tape portion 181t thereof as is shown in FIG. 59, and as is depicted in FIG. 60, the tape portion 181t is wound up in an opposite direction (clockwise) about the ring portion 181a so that the tape portion 181t is tightened.

Figure 60:
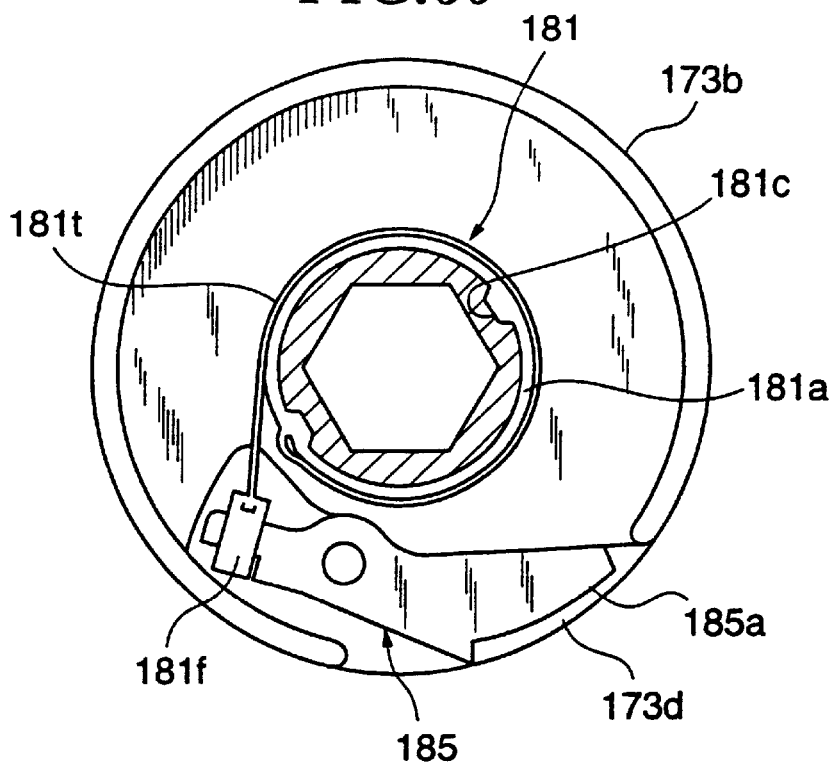
FIG. 60 is an operation diagram showing the bobbin, tape member and second pawl operated from their respective positions in FIG. 59.
Figure 61:
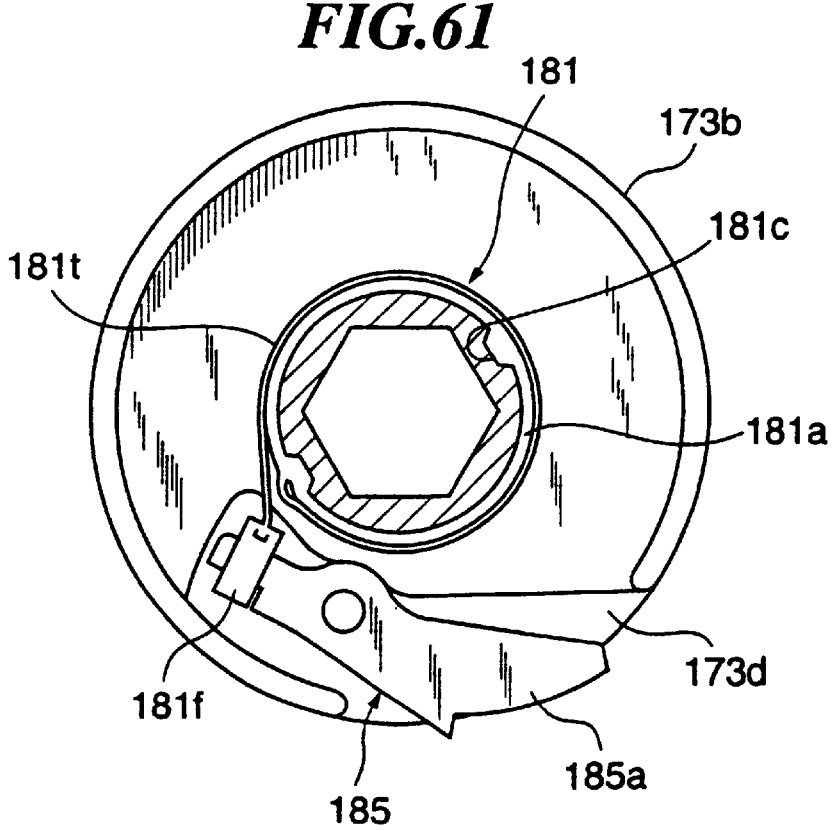
FIG. 61 is an operation diagram showing the bobbin, tape member and second pawl operated from their respective positions in FIG. 60.

When further relative rotation takes place between the bobbin 173 and the locking base 177, the hook portion 181f moves from the position shown in FIG. 60 under a tensile force of the tape portion 181t. As a consequence, the pin 181p on the hook portion 181f is cut off (see FIG. 57). After the pin 181p is cut off, the second pawl 185 is caused to pivot clockwise under a tensile force of the tape portion 181t so that an edge 185a of the second pawl 185 is brought into engagement with the internal teeth 175 formed on the side plate 170b of the retractor base 170 (see FIG. 57). Rotation of the bobbin 173 is therefore inhibited, thereby preventing any further withdrawal of the webbing. The direction in which the second pawl 185 pivots out subsequent to the cut-off of the pin 181p is a direction in which the second pawl 185 pivots out under a centrifugal force applied thereto. Namely, the second pawl 185 can pivot to its operated position even if no tensile force is applied thereto from the tape portion 181g. Incidentally, the ninth embodiment is common to the third and fourth embodiments in that they all include flexible members. The ninth embodiment is however different from the third and fourth embodiments in that the second pawl 185 operates on the side of the side plate 170b located on the side of the locking base 177.

When the second pawl 185 does not engage the internal teeth 175g promptly after the pin 181p is cut off and the second pawl 185 pivots out, the tape portion 171t itself is caused to extend and the second pawl 185 is allowed to remain at its operated position. Even if the phase of the internal teeth 175g in which the second pawl 185 is in engagement is shifted, the operated position of the second pawl 185 can be maintained by the take member 181 until the second pawl 185 engages the next one of the internal teeth 175g.

According to the ninth embodiment, rotation of the bobbin 173 is directly prevented as described above by the side plate 170 of the retractor base 170 via the second pawl 185 as a stopping member. It is therefore sufficient for parts such as the locking base 177 if they can withstand only a force which is applied to deform the torsion bar 5 as an energy-absorbing member arranged between the bobbin 173 and the locking base 177.

It is to be noted that in the above-described first to ninth embodiments, an energy-absorbing member other than the torsion bar can be adopted as an energy-absorbing member.

Figure 62:
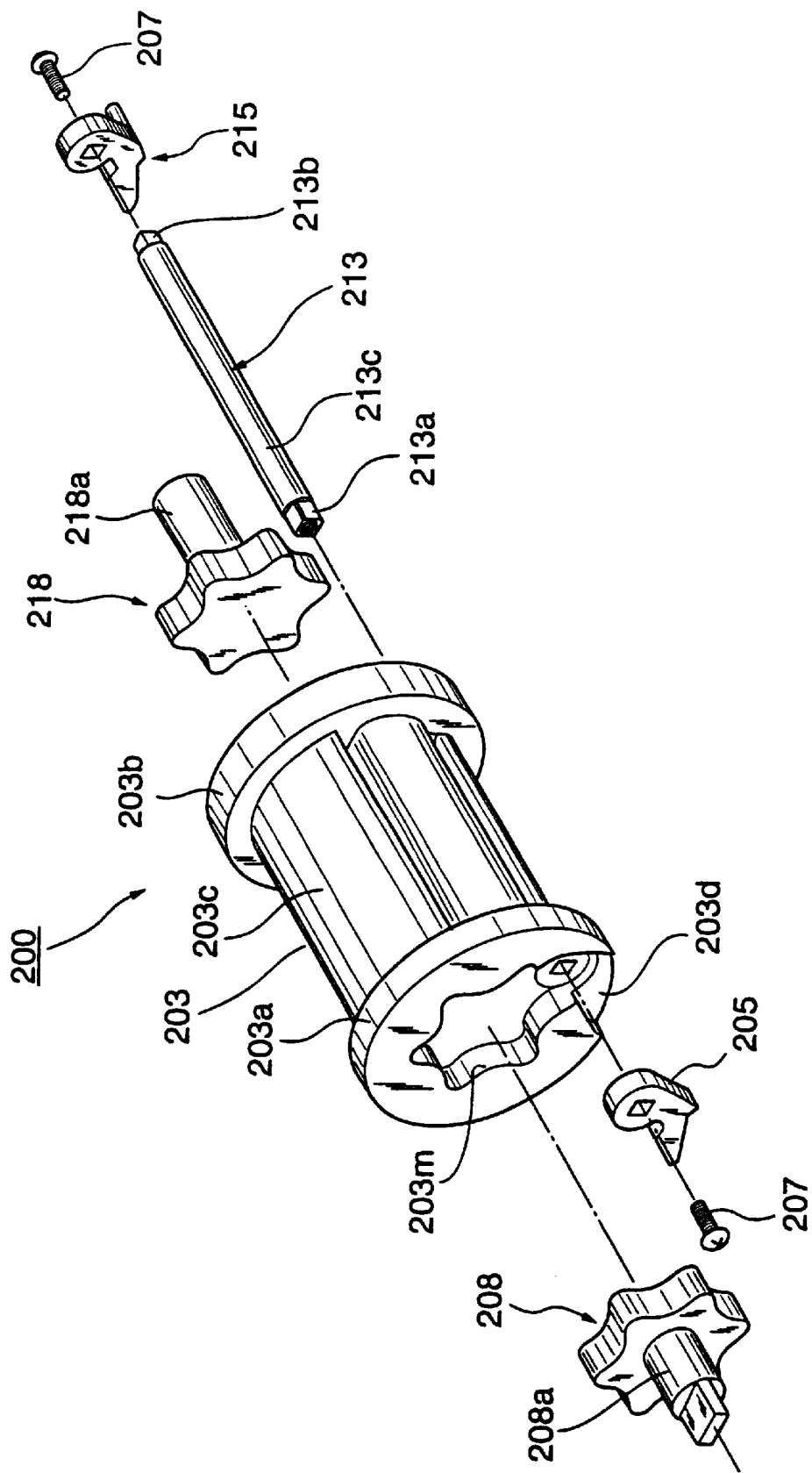
FIG. 62 is an exploded fragmentary view of a seatbelt retractor according to a tenth embodiment of the present invention.

Referring next to FIG. 62, a description will be made about the tenth embodiment of the present invention. Different from the first to ninth embodiment, this tenth embodiment is constructed without an energy-absorbing mechanism equipped with a torsion bar.

As is shown in FIG. 62, a seatbelt retractor 200 is provided with a substantially cylindrical bobbin 203 on which a webbing is wound. The bobbin 203 is a die cast product produced by die casting and made of aluminum, zinc or the like. The bobbin 203 is provided with a substantially cylindrical barrel portion 203c, on which the webbing is wound, and also with flange portions 203a,203b for preventing the webbing from being retracted out of place. Through the bobbin 203, a through-hole through which a substantially cylindrical connecting portion 213 extends.

The connecting bar 213 is provided at opposite ends thereof with connecting portions 213a,213b of a square shape in cross-section, respectively. A central portion 213c of the connecting bar 213 extends through the bobbin 203 such that the connecting bar 213 is rotatably supported by the bobbin 203. Further, the connecting portion 213b on one of the ends of the connecting bar 213 is fitted in a square hole of a first pawl 215 and is fixed by a screw 207. The connecting portion 213a on the opposite end of the connecting bar 213 is fitted in a second pawl 205 and is fixed by another screw 207.

Through the flange portion 203b of the bobbin 203, a hole of a substantially hexagonal shape in cross-section (not shown) is formed. Likewise, a hole 203m of a substantially hexagonal shape in cross-section is formed through the flange portion 203a. Sleeves 208,218 are fitted in their corresponding holes. The sleeves 208,218 are therefore connected with the bobbin 203 such that they can rotate integrally. A shaft portion 208a which serves as a rotary shaft for the bobbin 203 is integrally formed on the sleeve 208, and a shaft portion 218a which serves as another rotary shaft for the bobbin 203 is also integrally formed on the sleeve 218. This tenth embodiment is constructed such that the first pawl 215 and second pawl 205 can be brought into contact with the sleeve 218 and sleeve 208, respectively.

In the tenth embodiment, the emergency locking mechanism connects the retractor base and the bobbin 203 together in the event of a vehicular emergency to prevent any further rotation of the bobbin 203 in the webbing-withdrawing direction. As a specific construction for the emergency locking mechanism, a variety of known constructions can be adopted. In the case of this tenth embodiment, for example, the emergency locking mechanism is constructed such that in the event of a vehicular emergency, an edge of the first pawl 215 and an edge of the second pawl 205 are brought into meshing engagement with internal teeth formed on the corresponding side walls of the retractor base or on the corresponding latch plates arranged in association with the side plates and the bobbin 203 and the retractor base is hence connected together to prevent any further rotation of the bobbin 203 in the webbing-withdrawing direction.

In this tenth embodiment, the edges of the first pawl 205 and second pawl 215 engage the internal teeth formed on the mutually-opposing side plates of the retractor base, respectively, so that loads act on the first and second pawls 205,215. Owing to the provision of the sleeves 218,208, however, portions of loads which would otherwise be applied to the bobbin 203 are borne by the sleeves 218,208 and moreover, the remaining portions of the loads are divided to the convexities and are then applied from the convexities to the bobbin 203. This has made it possible to avoid concentration of such a load on a particular part of the bobbin 203 and hence to simplify reinforcement for the bobbin 203.

In all the embodiments described above, the shape of each sleeve as a connecting member is not limited to such a substantially hexagonal shape. Insofar as a load to be applied to the bobbin can be divided and distributed, it can be in another polygonal shape such as an octagonal shape. Each sleeve can also be in such a construction that a shaft portion, as a discrete member, is fitted in the sleeve instead of forming the shaft portion and the sleeve into an integral single-piece element.

This application claims the priorities of Japanese Patent Applications No. HEI 10-373690 filed Dec. 28, 1998, No. HEI 11-8105 filed Jan. 14, 1999, No. HEI 11-17336 filed Jan. 26, 1999 and No. HEI 11-52914 filed Mar. 1, 1999, all of which are incorporated herein by reference.

What is claimed is:

1. A seatbelt system provided with a retractor, wherein said retractor comprises:
    a retractor base having a pair of side plates;
    a shaft rotatably mounted on said retractor base;
    a bobbin fixed on an end of said shaft and carrying a webbing withdrawably wound thereon;
    a locking member fixed on an opposite end of said shaft;
    an emergency locking mechanism for connecting said locking member and one of said side plates of said retractor base in an event of a vehicular emergency such that said locking member is prevented from rotation in a webbing-withdrawing direction; and
    a bobbin locking mechanism arranged between said retractor base and said bobbin such that, when rotation of said locking member is prevented by said emergency locking mechanism, torsion of said shaft is limited to a predetermined extent and said bobbin is connected to the other side plate of said retractor base; and
    wherein said bobbin locking mechanism comprises:
        an engaging member supported on said bobbin and movable between a first position, where said engaging member is out of engagement with the other side plate of said retractor base, and a second position, where said engaging member is in engagement with the other side plate of said retractor base; and
        a control member for bringing said engaging member from said first position to said second position when the torsion of said shaft has reached said predetermined extent.

2. A seatbelt system according to claim 1, wherein said control member comprises a lever; and said lever extends through said bobbin, is connected at an end thereof with said engaging member and is provided at an opposite end thereof with a control portion for bringing said engaging member from said first position to said second position when the torsion of said shaft has reached said predetermined extent.

3. A seatbelt system according to claim 2, wherein said control member comprises:
    a substantially ring-shaped first control ring provided with a guide face for guiding said control portion and also with a projecting portion having a first face directed in said webbing-withdrawing direction,
    a substantially ring-shaped second control ring having a head portion provided with a first face and a second face, said first face being engageable with said projecting portion of said first control ring and being directed in said webbing-withdrawing direction, and said second face being directed in a webbing-retracting direction, and
    a projecting portion formed on said locking member and provided with a second face engageable with said head portion of said second control ring and directed in said webbing-retracting direction;
    wherein said first control ring is further provided with a third face for guiding said control portion such that said engaging member is brought from said first position to said second position with said first face being maintained in engagement with said second face of said second control ring and also with said first face of said second control ring being maintained in engagement with said second face of said projecting portion.

4. A seatbelt system according to claim 2, wherein said control member comprises:
    a guide path formed on said bobbin;
    a controller which, when said bobbin rotates relative to said locking member, moves along said guide path and is engageable with said control portion; and
    a position-limiting portion formed on said locking member for limiting a motion of said controller in a direction of rotation of said bobbin.

5. A seatbelt system according to claim 4, wherein said control portion is provided with:
    a first control face for causing said engaging member to move from said first position to said second position by said controller; and
    a second control face for allowing said bobbin to rotate in said webbing-withdrawing direction subsequent to a movement of said engaging member to said second position.

6. A seatbelt system according to claim 2, wherein said lever is biased in a direction in which said engaging member takes said second position.

7. A seatbelt system according to claim 2, wherein a through-hole provided with internal teeth, with which said engaging member is engageable, is formed in the other side plate; and said lever is biased in a direction in which a centrifugal force acts on said lever during rotation of said bobbin.

8. A seatbelt system according to claim 2, wherein said control member further comprises:
    a main gear fixed on said bobbin;
    a control gear loosely fitted in said bobbin a n d provided through a central portion thereof with a guide channel for guiding said control portion of said lever and on an outer circumference thereof with teeth different in number from teeth of said main gear; and
    a planetary gear fixed on said locking member and arranged in meshing engagement with said main gear and said control gear.

9. A seatbelt system according to claim 8, wherein said guide channel comprises a first guide path having a constant diameter, a second guide path having a diameter different from said first guide path, and a connecting path connecting said first and second paths together.

10. A seatbelt system according to claim 2, wherein said control member comprises:
    a guide path formed on said locking member; and
    a controller supported on said bobbin such that, when said bobbin has rotated relative to said locking member, said controller is caused to move along said guide path to control a motion of said control portion.

11. A seatbelt system according to claim 10, wherein said controller selectively takes a first state, in which said controller limits a motion of a normal control portion to make said engaging member remain at said first position, or a second state in which said controller does not limit a motion of said control portion; and said controller takes said second state when said torsion of said shaft has reached said predetermined extent.

12. A seatbelt system according to claim 11, wherein said guide path is in a volute form.

13. A seatbelt system according to claim 12, wherein said controller is brought into said second state at a final turn of said volute guide path, and said final turn has a constant diameter.

14. A seatbelt system according to claim 10, wherein said retractor further comprises a holding member arranged between said bobbin and said control portion for holding said control portion at a predetermined position.

15. A seatbelt system according to claim 2, wherein said control member has a tape member which is fixed at an end thereof on said locking member and is connected at an opposite end thereof with said control portion.

16. A seatbelt system according to claim 15, wherein said tape member can normally take an initial state in which said tape member is wound in a first direction, and, when said torsion of said shaft reaches said predetermined extent, can take a second state in which said tape member is wound in a direction opposite to said first direction.

17. A seatbelt system according to claim 15, wherein said retractor further comprises a holding member arranged between said lever and said bobbin for holding said lever until a tensile force is applied from said tape member to said lever.

18. A seatbelt system according to claim 15, wherein said tape member is formed of a stretchable material.

19. A seatbelt system according to claim 15, wherein said tape member has a fixed portion connected to said locking member, a hook portion connected to said control portion, and a tape portion connecting said fixed portion and said hook portion with each other.

20. A seatbelt system according to claim 19, wherein said tape portion, said fixed portion and said hook portion are in a form of an integrally-molded member obtained by molding a resin.

21. A seatbelt system according to claim 19, wherein said tape portion and fixed portion and said tape portion and hook portion are united together by a method selected from the group consisting of welding and adhesion, respectively.

22. A seatbelt system according to claim 15, wherein said tape portion is made of a flexible resin and has been oriented in a longitudinal direction.

23. A seatbelt system according to claim 15, wherein said tape member has a hook portion connected to said control portion and said hook portion can selectively take a first state, in which said hook portion is in engagement with a projection of said bobbin and limits a motion of said control portion to make said engaging member remain at said first position, or a second state, in which said hook portion is out of engagement with said projection and does not limit a motion of said control portion; and, when the torsion of said shaft reaches said extent, said hook portion takes said second state.

24. A seatbelt system according to claim 15, wherein said tape member has a hook portion connected to said control portion and said hook portion is arranged o n said control portion; and a holding member is arranged between said hook portion and said control portion such that said hook portion is held until a tensile force acts on said lever from said tape member.

25. A seatbelt system according to claim 15, wherein said tape member has a leaf spring member made of a metal.

26. A seatbelt system provided with a retractor, wherein said retractor comprises:
   a retractor base having a pair of side plates;
   a shaft rotatably mounted on said retractor base;
   a bobbin fixed on an end of said shaft and carrying a webbing withdrawably wound thereon;
   a locking member fixed on an opposite end of said shaft;
   an emergency locking mechanism for connecting said locking member and one of said side plates of said retractor base in an event of a vehicular emergency such that said locking member is prevented from rotation in a webbing-withdrawing direction; and
   a bobbin locking mechanism arranged between said retractor base and said bobbin such that, when rotation of said locking member is prevented by said emergency locking mechanism, torsion of said shaft is limited to a predetermined extent and said bobbin is connected to the other side plate of said retractor base;
   wherein a position where said locking member is connected with said retractor base at the one side plate thereof and a position where said bobbin is connected with said retractor base at the other side plate thereof are substantially in phase as viewed in the direction of rotation of said bobbin.

27. A seatbelt system provided with a retractor, wherein said retractor comprises:
   a retractor base having a pair of side plates;
   a shaft rotatably mounted on said retractor base;
   a bobbin fixed on an end of said shaft and carrying a webbing withdrawably wound thereon;
   a locking member fixed on an opposite end of said shaft;
   an emergency locking mechanism for connecting said locking member and one of said side plates of said retractor base in an event of a vehicular emergency such that said locking member is prevented from rotation in a webbing-withdrawing direction; and
   a bobbin locking mechanism arranged between said retractor base and said bobbin such that, when rotation of said locking member is prevented by said emergency locking mechanism, torsion of said shaft is limited to a predetermined extent and said bobbin is connected to the other side plate of said retractor base;
   wherein a plurality of engaged portions are formed in the other side plate of said retractor base, and said engaging member has plural engaging teeth engageable with said engaged portions, respectively.

28. A seatbelt system according to claim 12, wherein said bobbin has a first guide portion, which extends outwardly in a radial direction from a side of a center of said bobbin to guide said controller, and a second guide portion, which extends in a circumferential direction from an end of said first guide portion and allows said controller to engage said control portion in a vicinity of an end of said second guide portion.

29. A seatbelt system according to claim 28, wherein said second guide portion is provided at said end thereof with a nose portion for pushing said controller outwardly of said bobbin.

30. A seatbelt system according to claim 29, wherein said guide path is provided at an end thereof with an auxiliary guide path extending in a circumferential direction of said locking member so that said outwardly-pushed controller is guided in a state as pushed outwardly.

31. A seatbelt system provided with a retractor, wherein said retractor comprises:
   a retractor base,
   a shaft rotatably mounted on said retractor base,
   a bobbin fixed on an end of said shaft and carrying a webbing withdrawably wound thereon, a locking member fixed on an opposite end of said shaft, an emergency locking mechanism for connecting said locking member and said retractor base in an event of a vehicular emergency such that said locking member is prevented from rotation in a webbing-withdrawing direction, and a bobbin locking mechanism arranged between said retractor base and said bobbin such that, when rotation of said locking member is prevented by said emergency locking mechanism, torsion of said shaft is limited to a predetermined extent and said bobbin is connected to said retractor base;

wherein said bobbin locking mechanism has an engaging member and a control member, said engaging member is supported on said bobbin and is movable between a first position, where said engaging member is out of engagement with said retractor base, and a second position, where said engaging member is in engagement with said retractor base, and said control member has flexibility, connects said locking member and said engaging member with each other, and, when torsion of said shaft has reached a predetermined extent, brings said engaging member from said first position to said second position.

32. A seatbelt system according to claim 31, wherein said control member comprises a tape member connecting said locking member and said engaging member with each other; and said tape member can normally take an initial state, in which said tape member is wound in a first direction, or when the torsion of said shaft has reached said predetermined extent, can take a second state in which said tape member is wound in a direction opposite to said first position.

33. A seatbelt system provided with a retractor, wherein said retractor comprises:

a retractor base with an engaged portion formed thereon;

a bobbin rotatably supported on said base and having a fitted hole of a substantially polygonal shape in cross-section;

a sleeve having a fitting face, which is of a complementary, substantially polygonal shape in cross-section and is maintained in engagement with said fitted hole, and a shaft portion forming a spindle for said bobbin; and a pawl supported in contact with said fitting face of said sleeve and engageable with said engaged portion of said base.

34. A seatbelt system according to claim 33, wherein said fitting face is formed with recesses between mutually adjacent vertices; and said pawl can be supported in contact with said fitting face in one of said recesses thereof.

* * * * *